(12) United States Patent  
Johnson et al.

(10) Patent No.: US 7,718,943 B2
(45) Date of Patent: May 18, 2010

(54) MOISTURE SENSOR FOR OPTICALLY DETECTING MOISTURE

(75) Inventors: Ryan D. Johnson, Grand Haven, MI (US); Joseph S. Stam, Holland, MI (US); Jon H. Bechtel, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/239,191

(22) Filed: Sep. 29, 2005

(65) Prior Publication Data

US 2006/0076478 A1 Apr. 13, 2006

Related U.S. Application Data

(60) Provisional application No. 60/614,164, filed on Sep. 29, 2004.

(51) Int. Cl.
*H01L 27/00* (2006.01)
*G01N 15/06* (2006.01)

(52) U.S. Cl. .............................. 250/208.1; 250/573

(58) Field of Classification Search ............ 250/227.25, 250/227.2, 573–575, 208.1, 222.2, 214 AL, 250/221; 340/600–604, 583; 318/483, 444; 73/170.16, 170.17, 170.21
See application file for complete search history.

(56) References Cited

U.S. PATENT DOCUMENTS

| 4,798,956 | A | 1/1989 | Hochstein |
| 4,859,867 | A | 8/1989 | Larson et al. |
| 4,867,561 | A | 9/1989 | Fujii et al. |
| 4,871,917 | A | 10/1989 | O'Farrell et al. |
| 4,916,374 | A | 4/1990 | Schierbeek et al. |
| 4,973,844 | A | 11/1990 | O'Farrell et al. |
| 5,276,389 | A | 1/1994 | Levers |
| 5,313,072 | A * | 5/1994 | Vachss ........................ 250/573 |
| 5,386,111 | A | 1/1995 | Zimmerman |
| 5,498,866 | A | 3/1996 | Bendicks et al. |
| 5,661,303 | A | 8/1997 | Teder |
| 5,796,094 | A | 8/1998 | Schofield et al. |
| 5,796,106 | A | 8/1998 | Noack |
| 6,084,519 | A * | 7/2000 | Coulling et al. ............. 340/602 |
| 6,118,383 | A * | 9/2000 | Hegyi ......................... 340/602 |
| 6,307,198 | B1 * | 10/2001 | Asakura et al. ......... 250/227.25 |
| 6,376,824 | B1 * | 4/2002 | Michenfelder et al. .. 250/214 R |

(Continued)

FOREIGN PATENT DOCUMENTS

| JP | 08-029325 | 2/1996 |
| JP | 2001-028746 | 1/2001 |
| JP | 2001-206201 | 7/2001 |

OTHER PUBLICATIONS

Patent Abstracts of Japan, "Rainfall Detector and Automatic Wiper Device for Car," Publication No. 08-029325, p. 1 of 1, Feb. 2, 1996).

(Continued)

*Primary Examiner*—Thanh X Luu
*Assistant Examiner*—Pascal M Bui-Pho
(74) *Attorney, Agent, or Firm*—James E. Shultz, Jr.

(57) ABSTRACT

The present invention provides various improvements in components for optical based moisture sensing systems and to moisture sensing systems incorporating the components. In at least one embodiment an imager sensor based moisture sensing system is provided that is capable of detecting a moisture pattern.

9 Claims, 39 Drawing Sheets

U.S. PATENT DOCUMENTS

| | | | |
|---|---|---|---|
| 6,404,490 B2 * | 6/2002 | Blasing | 356/239.8 |
| 6,573,490 B2 * | 6/2003 | Hochstein | 250/227.25 |
| 6,596,978 B2 * | 7/2003 | Hochstein | 250/208.1 |
| 6,614,043 B2 * | 9/2003 | Hochstein | 250/573 |
| 6,768,099 B1 * | 7/2004 | Cheng et al. | 250/227.24 |
| 6,865,197 B2 * | 3/2005 | Sugitatsu et al. | 372/29.02 |
| 7,208,723 B2 * | 4/2007 | Takenaga et al. | 250/227.25 |
| 2002/0190231 A1 * | 12/2002 | Kobayashi et al. | 250/573 |

OTHER PUBLICATIONS

Patent Abstracts of Japan, "External Monitoring Device Having Fail/Safe Function," Publication No. 2001-028746, p. 1 of 1, (Jan. 30, 2001).

Patent Abstracts of Japan, "Raindrop Detecting Device for Vehicle," Publication No. 2001-206201, p. 1 of 1, (Jul. 31, 2001).

* cited by examiner

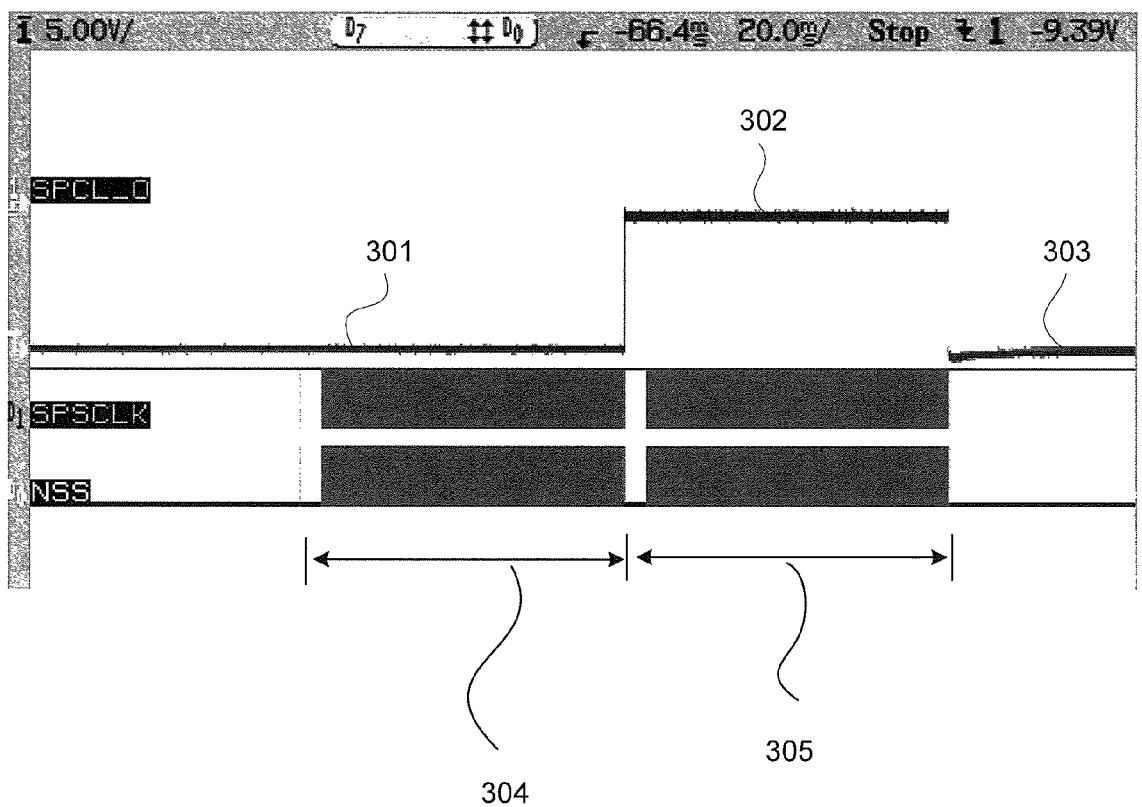

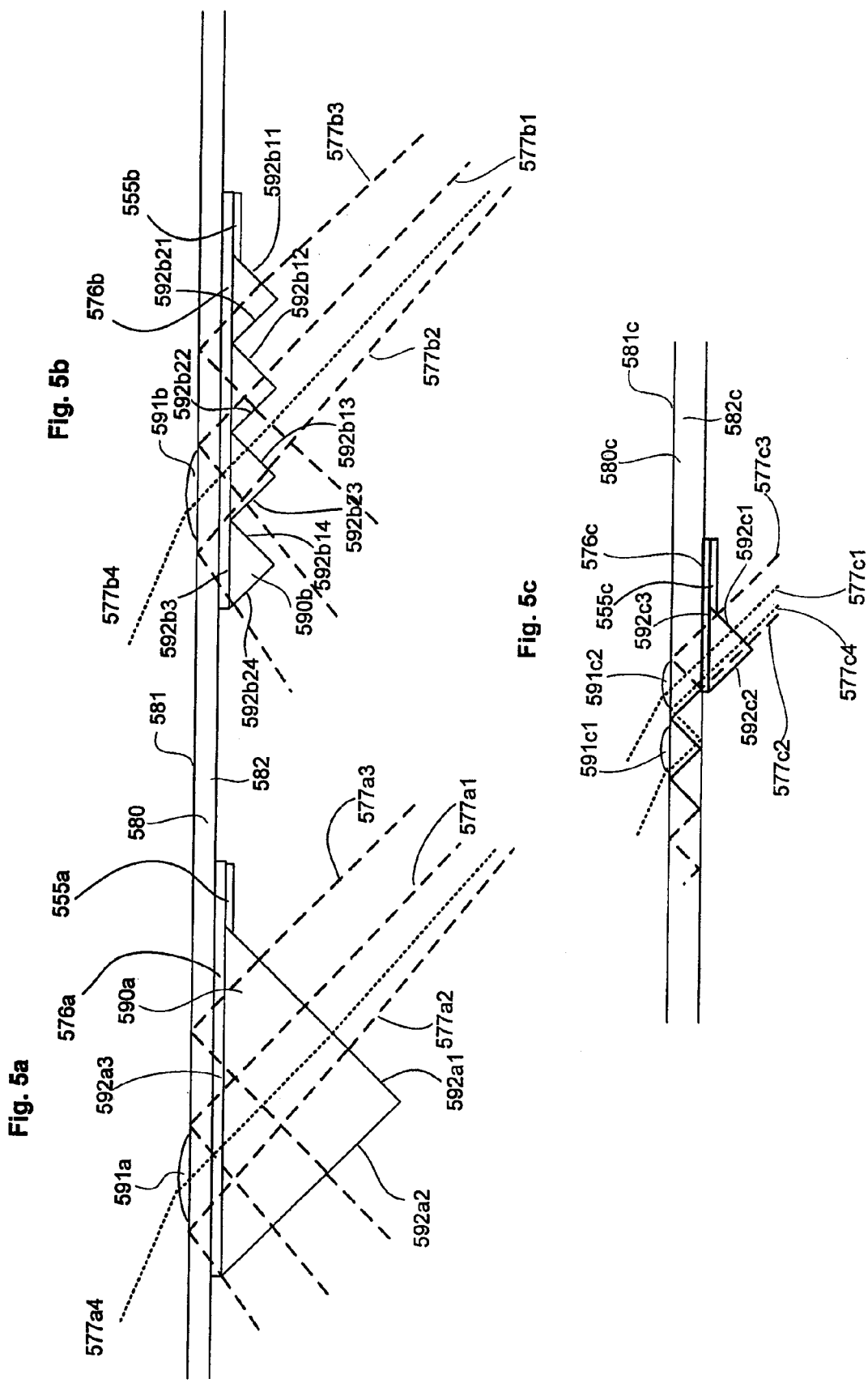

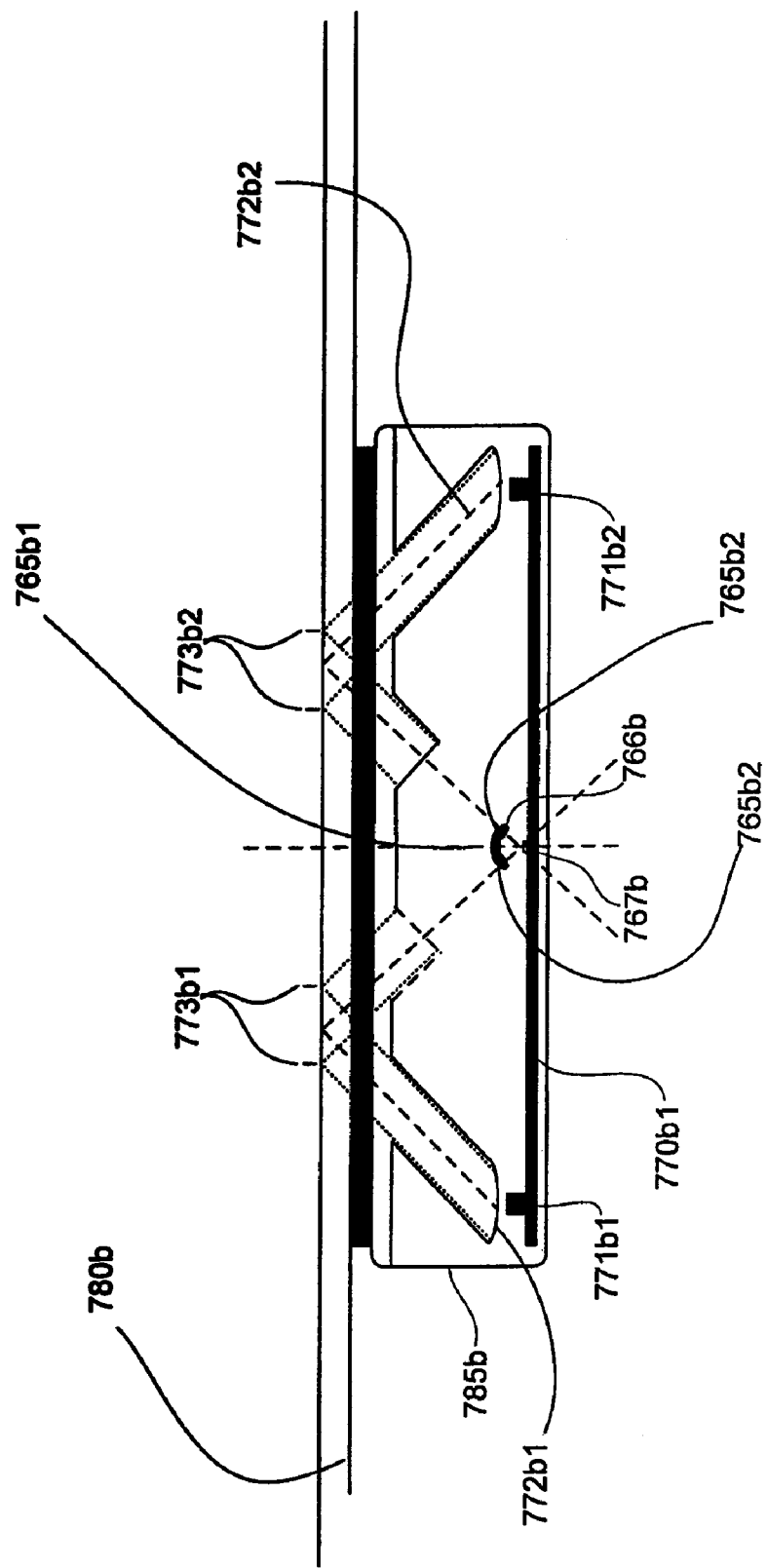

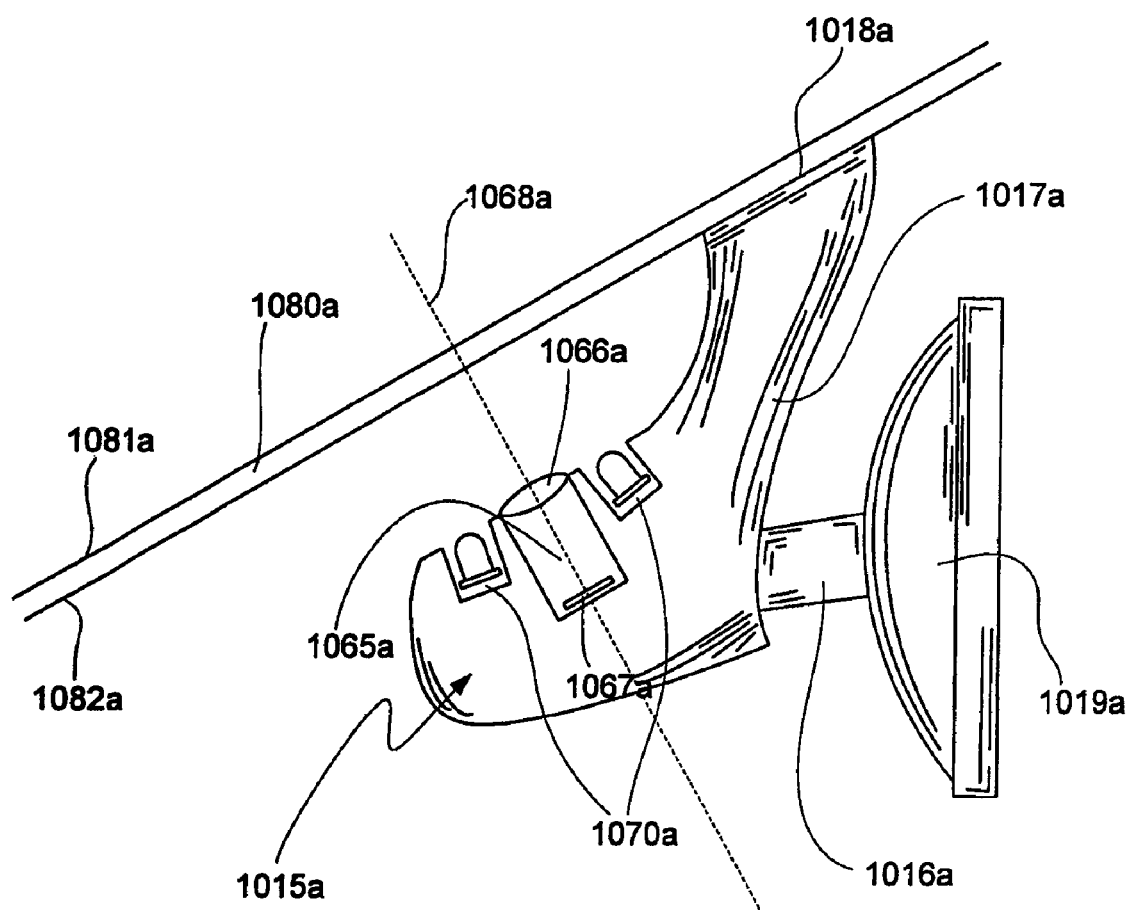

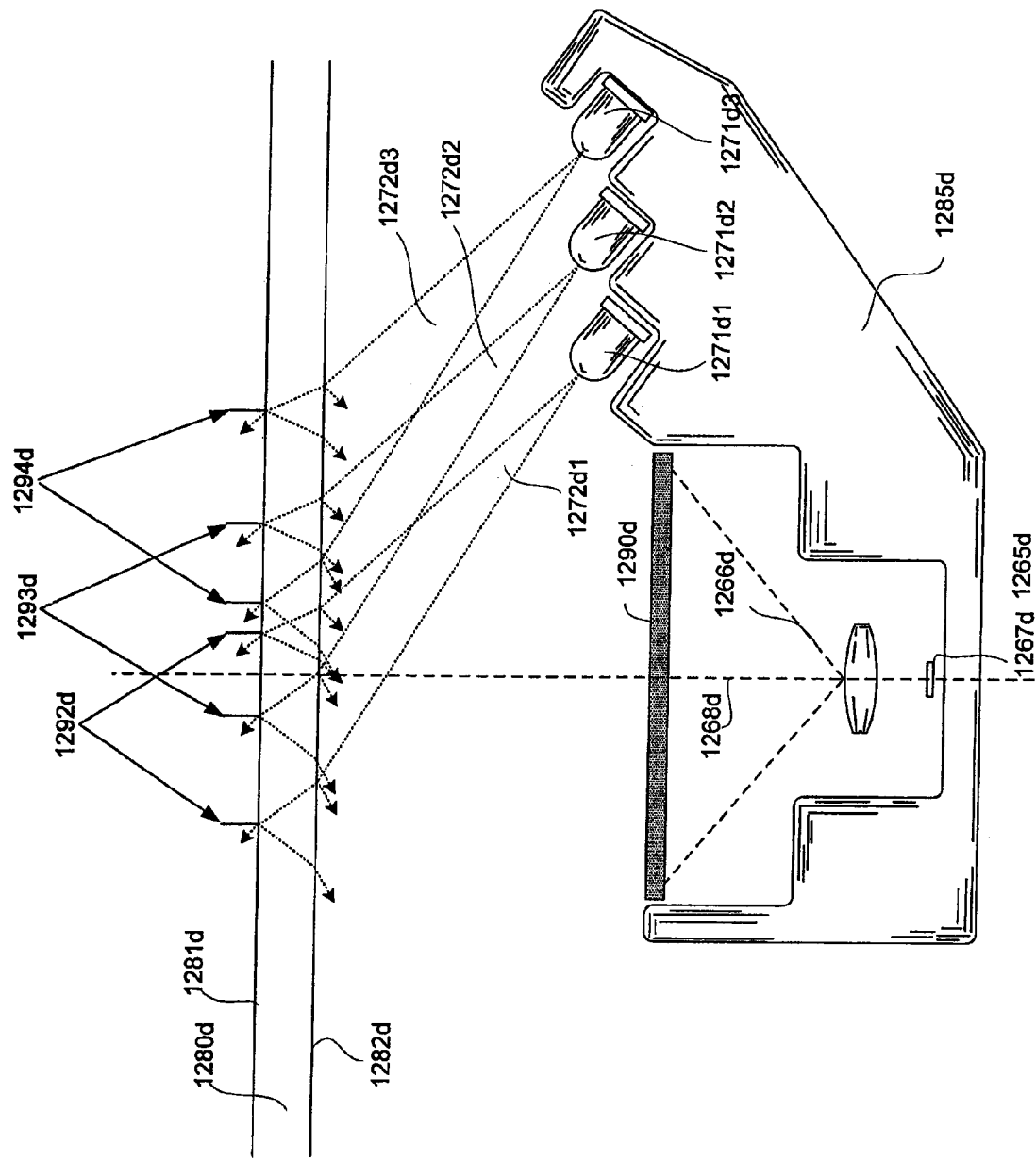

MOISTURE SENSOR FOR OPTICALLY DETECTING MOISTURE

CROSS REFERENCE TO RELATED APPLICATIONS

This application claims priority under U.S.C. 119(e)(1) of U.S. Provisional Patent Application Ser. No. 60/614,164, filed Sep. 29, 2004, entitled MOISTURE SENSOR, the entire disclosure of which is incorporated herein by reference.

BACKGROUND OF THE INVENTION

Various optical based moisture sensing systems are known for detecting moisture on a surface of a substantially transparent substrate. Improvements in the ability of such systems to distinguish the presents of moisture from nuisance irregularities are needed.

SUMMARY OF THE INVENTION

The present invention provides improved components for optical based moisture sensing and various systems incorporating these components. At least one embodiment of the present invention provides improvement in the ability of a moisture sensing system to distinguish the presents of moisture from nuisance irregularities.

BRIEF DESCRIPTION OF THE FIGURES

FIG. 5 depicts light ray tracings associated with an embodiment of a moisture sensor in proximity of a piece of substrate;

DETAIL DESCRIPTION OF THE INVENTION

Figure 1:
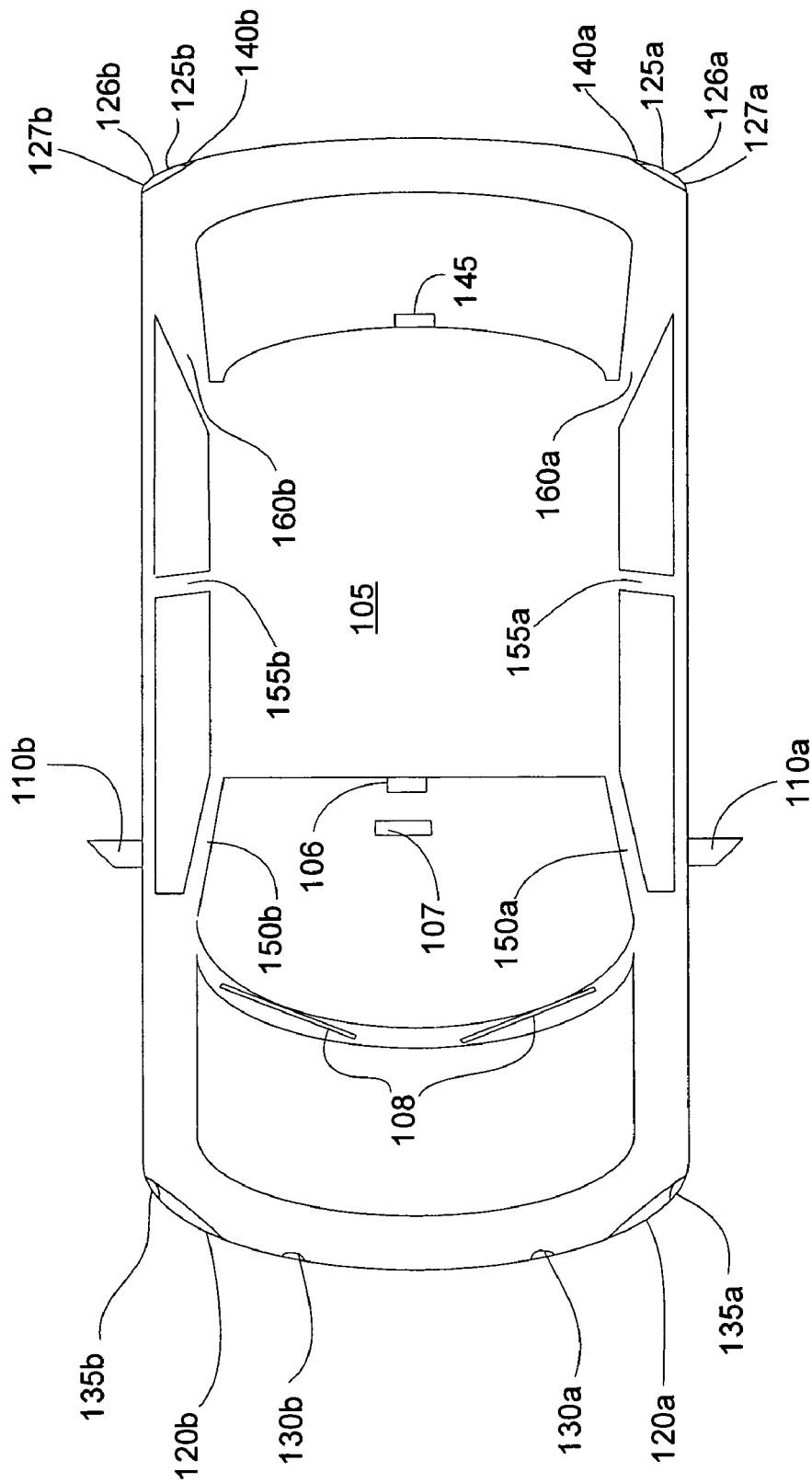
FIG. 1 depicts a plan view of a vehicle.

Turning now to FIG. 1 there is shown a controlled vehicle 105 comprising a driver's side rearview mirror 110a, a passenger's side rearview mirror 110b and rearview mirror assembly 106. In a preferred embodiment, these rearview mirrors are configured to provide a driver of a controlled vehicle a view of substantially all of a scene generally rearward looking direction. In at least one embodiment, the rearview mirror assembly comprises a moisture sensor 107. It should be understood that the moisture sensor 107 may be, at least partially, separate from the rearview mirror assembly. The controlled vehicle preferably comprises windshield wipers 108, a windshield and a heating, ventilating and air conditioning (HVAC) system (not shown). The HVAC system preferably comprises a windshield defogger and, or, a windshield defroster. In at least one embodiment, the controlled vehicle comprises a windshield washer system (not shown).

With additional reference to FIG. 1, the controlled vehicle is depicted to comprise taillight assemblies 125a, 125b; break lights 126a, 126b; rear turn signals 127a, 127b; backup lights 140a, 140b; headlight assemblies 120a, 120b; foul weather lights 130a, 130b; front turn signals 135a, 135b and a center high mounted stop light (CHMSL) 145. It should be understood that the controlled vehicle may comprise various combinations of the exterior lights described with respect to FIG. 1. It should also be understood that the controlled vehicle may comprise additional exterior lights or may even comprise individual assemblies that provide combined functionality. Such as a headlight assembly that functions as a daytime running light, a low beam headlight, a high beam headlight, any one thereof, a subcombination thereof or a combination thereof. Continuously variable, bi-xenon, headlights are a specific example.

As additionally shown in FIG. 1, the controlled vehicle may comprise A-pillars 150a, 150b; B-pillars 155a, 155b and C-pillars 160a, 160b. Any of these locations, along with the rearview mirrors and exterior light assemblies, provide suitable locations for at least one imager, at least one indicator, at least one illuminator, at least one information display, any one thereof, a subcombination thereof or a combination thereof. In at least one embodiment, a moisture detection system is provided that is at least partially in contact with the windshield of a vehicle. In these embodiments, only the outermost surface of the windshield functions as a flat reflective mirror. The light rays emitted by the light sources of the supplemental illumination are configured to pass through a lens having an optical adhesive or optical coupler between the lens and an inner surface of the windshield. Therefore, the inner surface of the windshield does not function as a flat reflective mirror. The light rays emitted from the light sources are directed such that corresponding reflections from the outer windshield surface impinge upon an image sensor lens assembly. The image sensor lens assembly is configured to direct the light rays to the image sensor. When moisture is present on the outer surface of the windshield the light rays are diverted away from the image sensor lens assembly, thereby, moisture is detectable.

Figure 2:
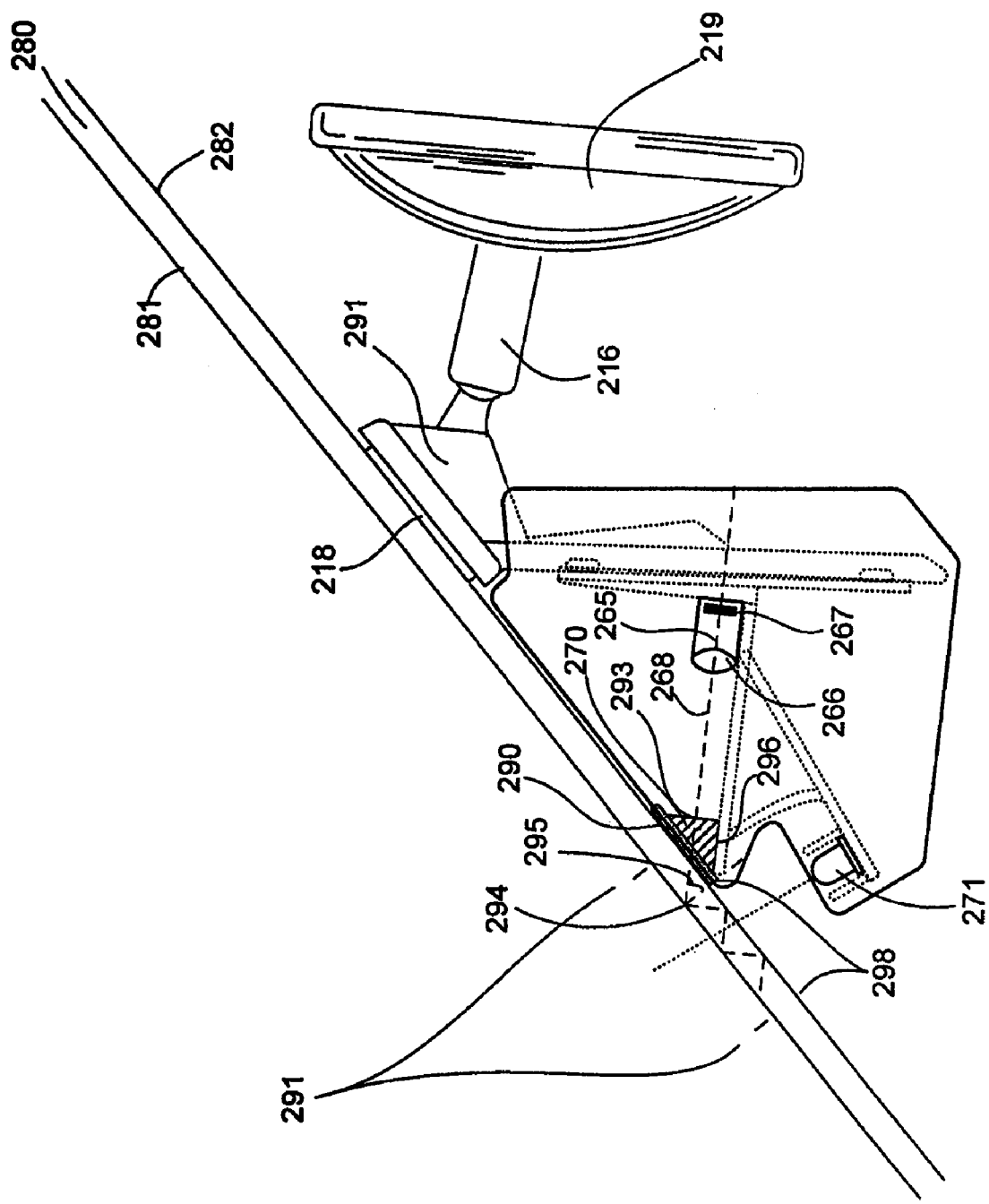
FIG. 2 depicts a profile view of an embodiment of a moisture sensor incorporated in a rearview mirror assembly proximate a windshield.
Figure 2A:
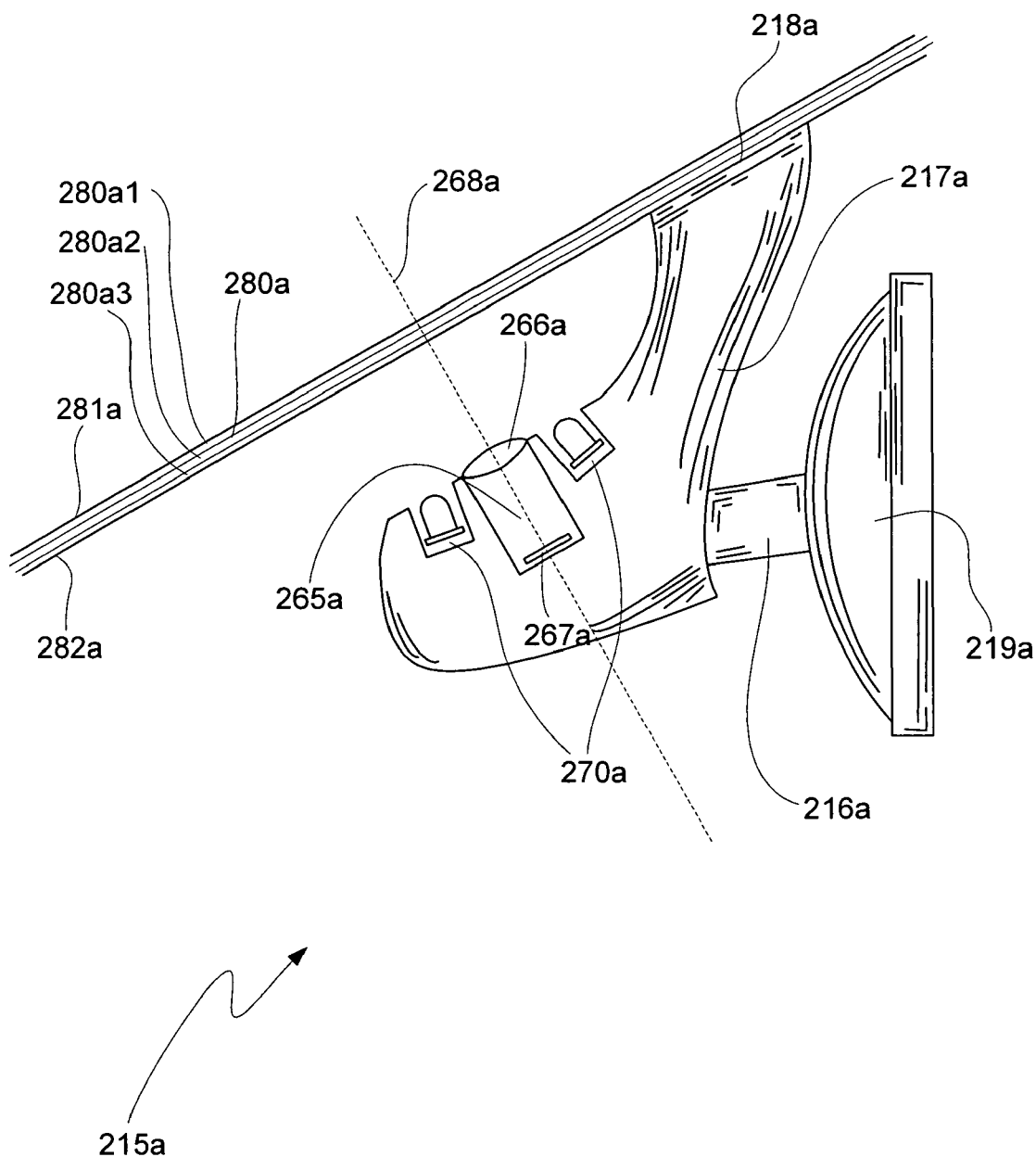
Figure 2B:
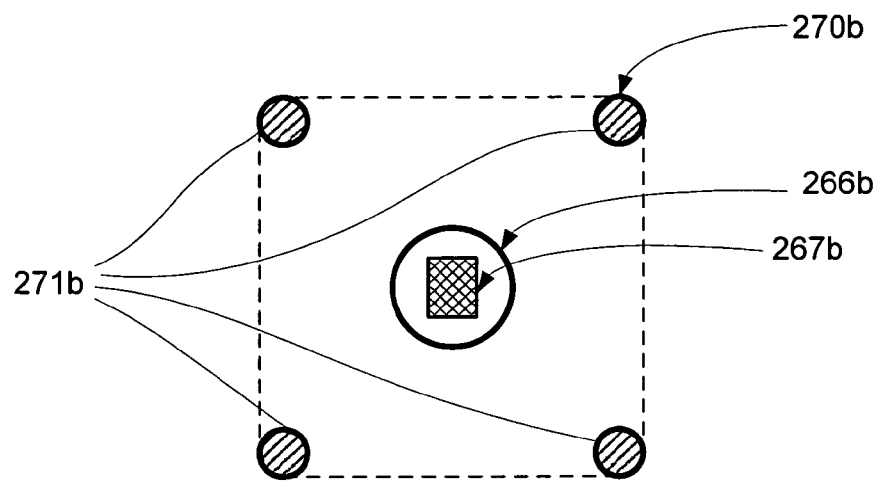
Figure 2C:
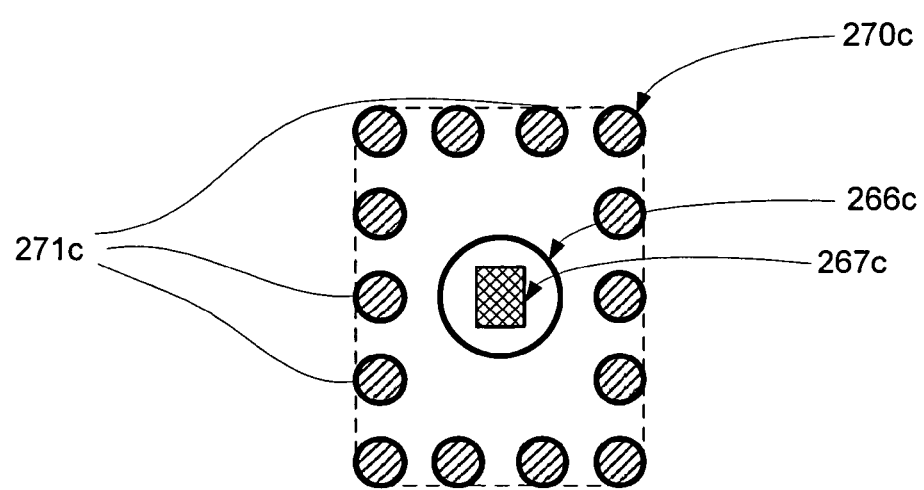
Figure 2D:
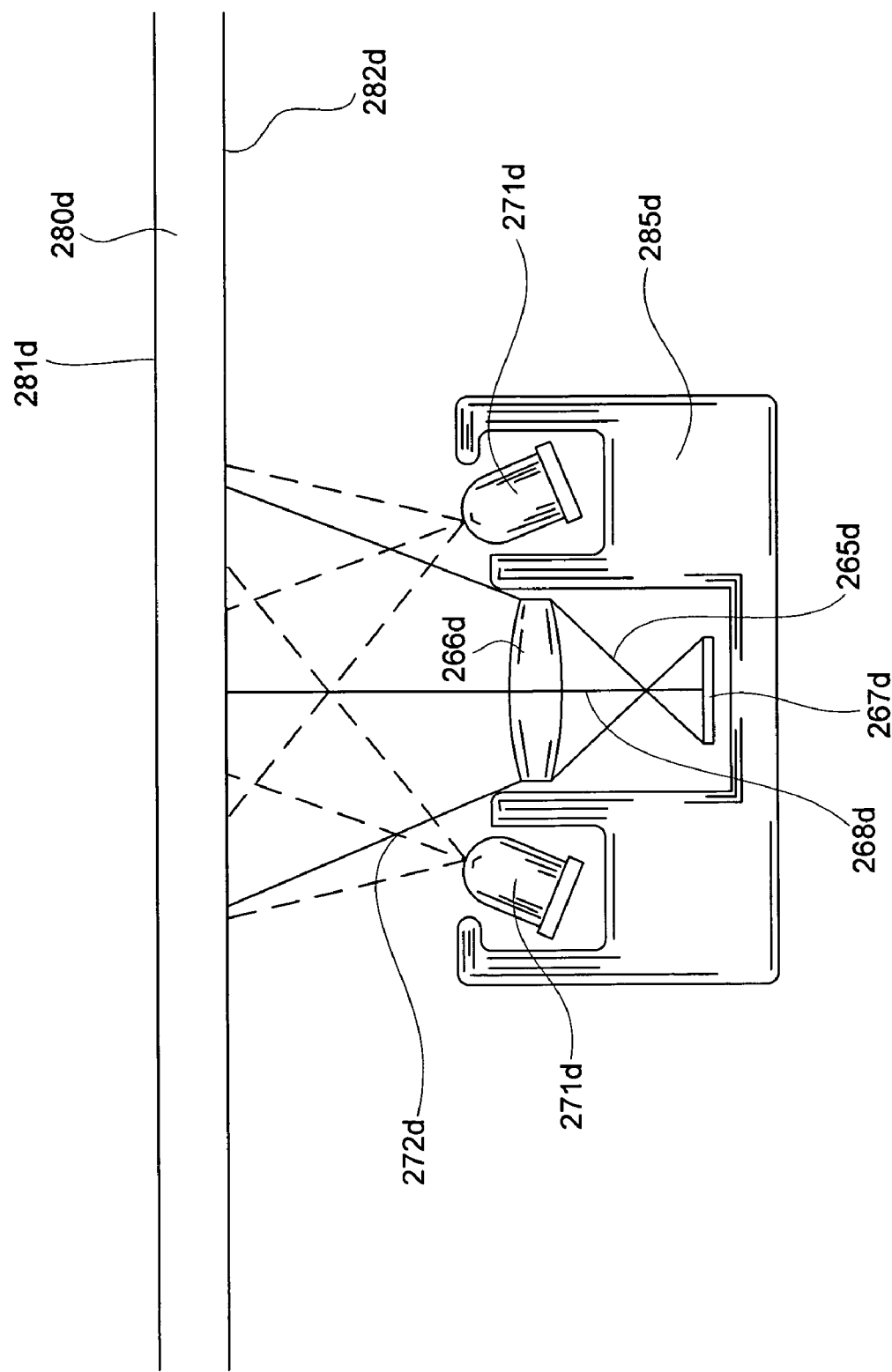
Figure 3A:
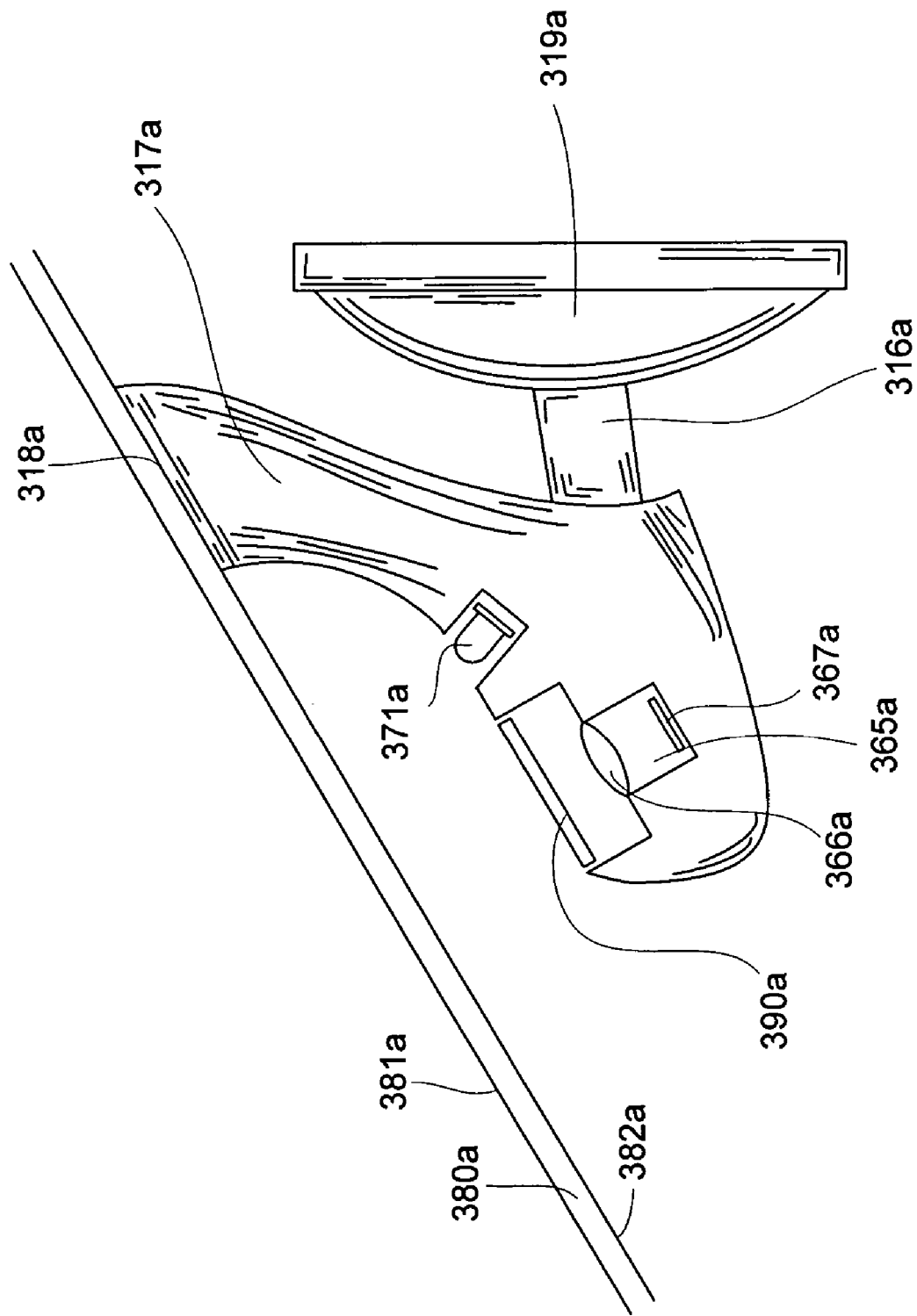
FIG. 3 depicts a timing diagram.
Figure 3B:
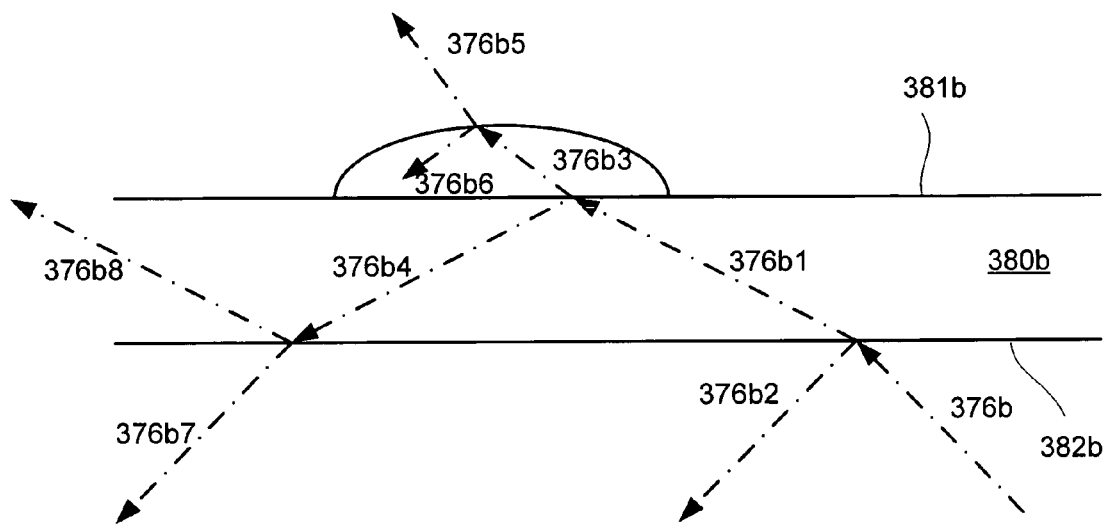
Figure 3C:
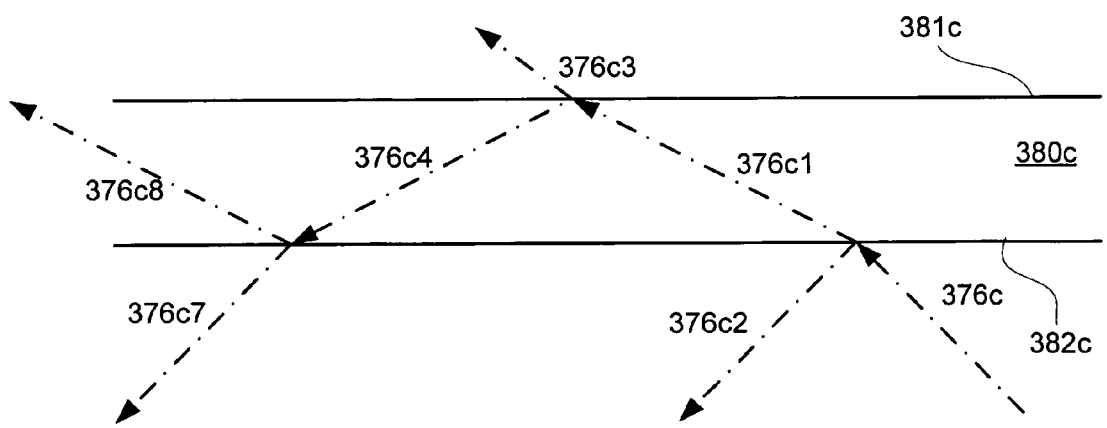
Figure 3D:
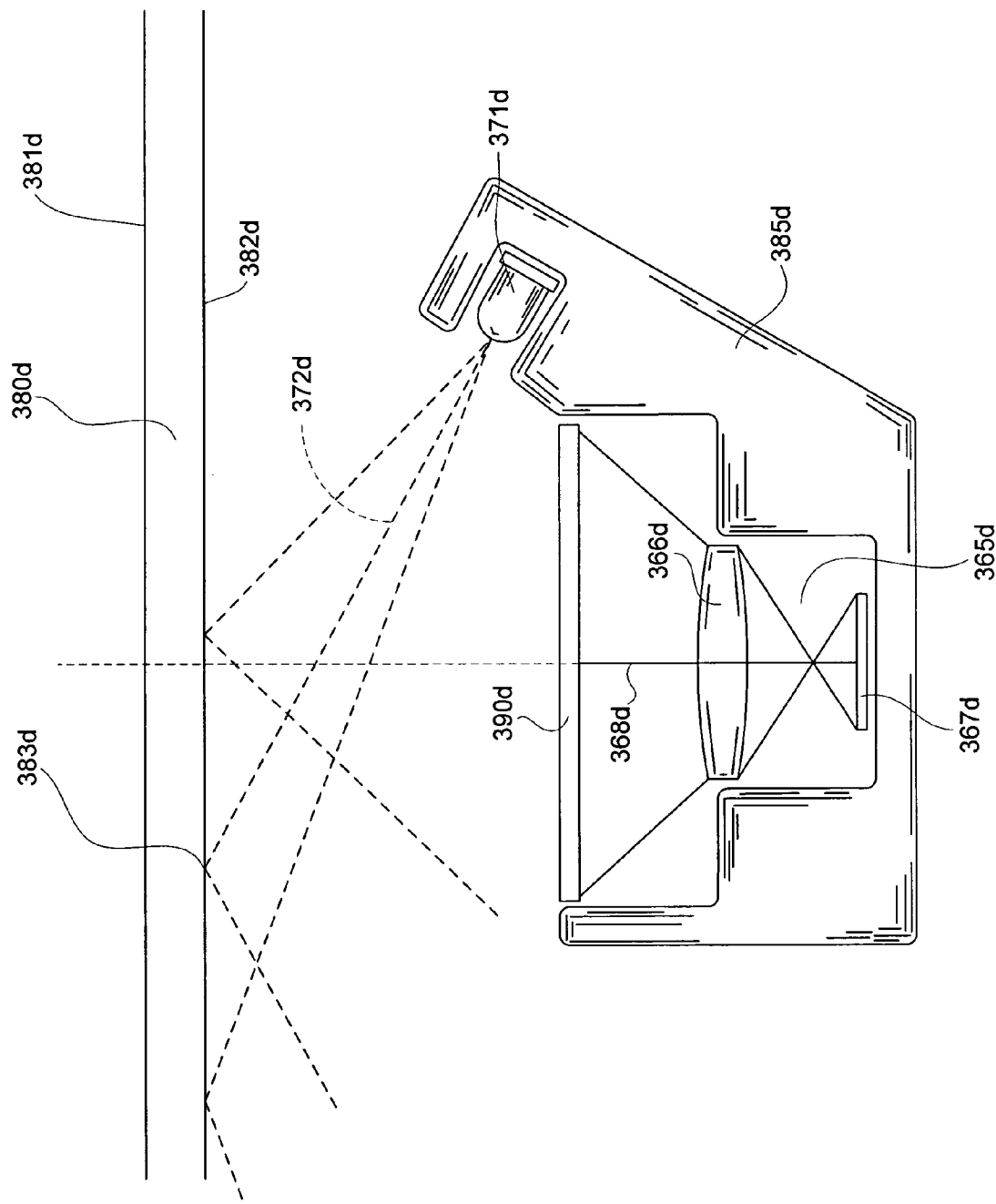
Figure 3E:
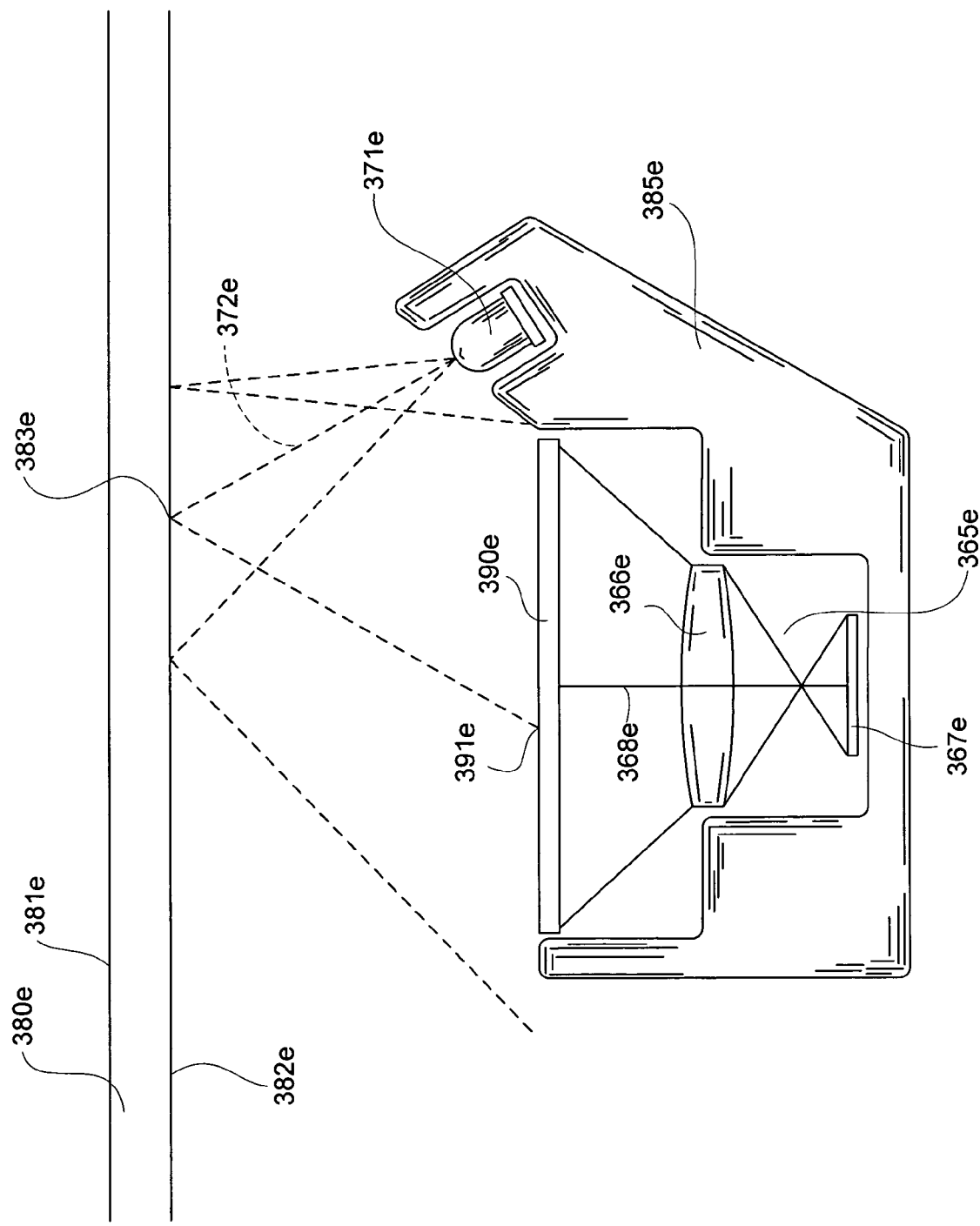

Referring now to FIG. 2, an embodiment of a moisture sensor is depicted incorporated in a rearview mirror assembly. The rearview mirror assembly is attached to an inner surface 282 of a windshield 280 via a mount 218 and support structure 217. The windshield also comprises an outer surface 281. A rearview mirror 219 is pivotally attached via a stem 216 to the support structure. In at least one embodiment, the moisture sensor comprises an optical system 265 having a lens 266, an image sensor 267 and a primary optical axis. In at least one embodiment, the moisture sensor is configured such that the primary optical axis 268 is optically aligned and normal to a first lens 293 of an optics element 270 as is described below in FIG. 5c such that the field of view is substantially centered at 294 with a working distance equaling a plurality of reflections internal the windshield 280. In at least one embodiment, the amount of reflections internal to windshield 280 that are visible to image sensor 267 dictate the detection area 291 of the moisture sensor. In at least one embodiment, the optics element is optically coupled to the inner surface via optical coupling material 290. In at least one embodiment a moisture sensor comprises a means for compensating for individual laminates 280a1, 280a2, 280a3 of a vehicle windshield.

In at least one embodiment a supplemental illumination assembly having at least one light source 271 emits light rays generally toward at least a portion of the windshield at 298 located behind optics element 270. In another embodiment, when moisture is present on the outer surface 281 of windshield 280, the moisture drops at least partially replicate the optical characteristics of concave mirrors is advantageously used to reflect light rays emitted by a supplemental illumination system toward image sensor 267 through optics element 270.

In at least one embodiment, the optics element such as optics element 270 contains an additional transparent diffuse surface 555c as shown in FIG. 5c allowing the moisture sensor to obtain information about the ambient light situation outside windshield 280. The transparent diffuse surface gives the moisture sensor added sun loading functionality as its illuminated gradient can be studied. In another embodiment, the diffuse surface is located above optics element 270 and within the viewing area of the moisture sensor.

In at least one embodiment, a moisture sensor is depicted that incorporates a mounting structure with a slidably configured module. In at least one embodiment, the moisture sensor is configured such that the module is slid downward away from the mirror mount while the mirror mount is placed on a windshield button. Then the module is slid upward on the mounting structure such that the optics block is held firmly against the windshield such that optical coupling between the optics block and the windshield is established and maintained. In another embodiment, the optical coupling material is preferably cleanable via a cleaning method, preferably does not yellow with time, is preferably IR and UV stable, preferably contains no air bubbles and will preferably not tear when force is applied to it.

In at least one embodiment, an optical system is provided and is operative to image a windshield area of interest. In at least one embodiment, the optical system preferably comprises a focal length such that the area of interest associated with the moisture will be in focus while objects beyond the windshield will be blurred. An optical system may comprise a simple lens design or a complex lens system. A complex lens system may comprise multiple elements, aspheric elements, detractive objects, a subcombination thereof or a combination thereof. Complex lens systems may be beneficial when a shorter distance from the windshield is desired. It should be understood that a complex lens system is not necessary in all embodiments of the present invention.

This invention may take advantage of current CMOS active pixel sensor technology. Other image sensors are also suitable for the present invention. An example image sensor is a 144× 176 active pixel array with 15.0 μm pixel size. Suitable image sensors are disclosed in commonly assigned U.S. Pat. Nos. 5,837,994, 5,990,469, 6,130,421, 6,008,486, 6,130,448 and U.S. patent application Ser. No. 10/783,431.

In at least one embodiment, a supplemental illumination system is provided to illuminate an area of a windshield associated with moisture detection. The light sources within the supplemental illumination system may be light emitting diodes (LEDS). The light sources may comprise a lens having a focal length such that "hot spots" from the light sources are minimized while maintaining overall efficiency of the supplemental illumination system. The light sources may be near-infrared emitting and emit any wavelength above the visible cut-off wavelength. More specifically, a near-infrared emitting light source will preferably emit light rays of approximately 850 nm to approximately 940 nm wavelength. These wavelength light sources are readily available. Using a near-infrared emitting light source is desirable because the associated light rays are not detectable by the human eye, therefore, the supplemental illumination system will not cause a distraction for other vehicle drivers or the driver of the vehicle containing the moisture detection system.

When near-infrared light sources are used, the efficiency of the illumination system should be a consideration. Each windshield will have different IR-cut characteristics. A windshield often blocks as much of the solar infrared rays from getting into the car usually for thermal reasons. Since each configuration mentioned above has light that travels through the windshield at least twice (once as it travels to the moisture and once as it reflects back toward the image sensor or in another embodiment, once as it travels to the external surface of the windshield and once as it reflects back to the internal surface of the windshield), the efficiency of the illumination system is very important. A typical windshield spectral response steadily falls off around the 700 nm wavelength mark. From this perspective, an 850 nm or 880 nm wavelength light source is preferred and are readily available in the LED market today. Each image sensor has a specific spectral response. Typical silicon spectral response begins to steadily fall off around 700 nm. From this perspective, an 850 nm wavelength light source is preferred. The solar spectrum has a large dip around 940 nm and a smaller dip around 840 nm. These dips in the solar spectrum can be an advantage when trying to use supplemental illumination during intense ambient lighting conditions. From this perspective, a 940 nm wavelength light source is preferred. Efficiency loss will also occur as the light travels through each optical component. There are many ways to make sure that adequate light gets back to the image sensor. A lens system specific to each illumination system can be used to focus the light where it needs to be. When triggered to illuminate the area of interest of the windshield, the illumination system can be pulsed very quickly to achieve short and very intense bursts of light without jeopardizing the lifespan of the light source and its controlling components. The illumination system can be optically coupled to the windshield to reduce reflection lose when traveling between surfaces. Further, the triggering of the illumination system should occur as close as possible to the triggering of image acquiring. This way, light is getting to the imager for as long as possible.

In at least one configuration mentioned above a moisture sensing system with an effective detection area of at least 1 sq. inch is provided. The size of this detection area is a large improvement over present day contact type moisture sensors.

The detection area of the windshield for each configuration is preferably chosen such that it is included in the area of the windshield that is wiped by the windshield wipers.

In at least one embodiment, the supplemental illumination system is initially turned off and an image is taken. As soon as practical thereafter, the supplemental illumination system is turned on and a second image is taken. In at least one embodiment, a supplemental illumination assembly is configured to be energized only when an image is being acquired. FIG. 3 shows timing diagrams wherein a supplemental illumination assembly is in the off state at 301, transition state at 302 and on state at 303. Coinciding therewith with respect to time 304, an image is acquired with the optical system in the off state. Coinciding therewith with respect to time 305, an image is acquired with the optical system in the on state. In at least one embodiment, the subtracted difference between these images is then used to for moisture detection. Alternatively, moisture detection may be accomplished by counting the number of illumination system reflections in the image taken with the supplemental illumination turned on. In at least one embodiment, a processing system will be in communication with a supplemental illumination system and an image sensor. The processing system will preferably control the supplemental illumination system. As described above, the supplemental illumination system is initially turned off and an image is taken. The supplemental illumination system is turned on and a second image is taken. In at least one embodiment, the difference between these images is used to for moisture detection. Subtraction eliminates the presents of background or foreign objects in the resulting image. Subtraction will leave only the objects illuminated by the illumination system. An edge detection algorithm may be used to detect moisture appearing in at least one image. An edge detection algorithm makes use of spatial frequency composition analysis techniques. Another suitable detection algorithm counts the number of reflections found in at least one image. Suitable detection systems and algorithms are disclosed in commonly assigned U.S. Pat. Nos. 5,923,027, 6,617,564 and U.S. patent application Ser. No. 09/970,728.

In at least one embodiment, when moisture is present on the outer surface that portion of the outer surface will become refractive. In at least one embodiment, the moisture sensor is configured to detect moisture on an outer surface, an inner surface or both surfaces of a substantially transparent substrate having an index of refraction greater than the index of refraction of air (i.e. approximately 1.0). In at least one embodiment, the moisture sensor is configured to detect moisture on an outer surface, an inner surface or both surfaces of a substantially transparent substrate having an index of refraction greater than the index of refraction of water (i.e. approximately 1.33). In at least one embodiment, the moisture sensor is configured to detect moisture on an outer surface, an inner surface or both surfaces of a substantially transparent piece of glass having an index of refraction of approximately 1.52.

When light is incident upon a medium of lesser index of refraction, the ray is bent away from the normal, such that the exit angle is greater than the incident angle. The exit angle will approach 90° for some critical incident angle ("critical angle") and for incident angles greater than the critical angle there is total internal reflection (TIR). The critical angle can be calculated from Snell's law by setting the refraction angle equal to 90° as is known in the art. For any angle of incidence less than the critical angle, part of the incident light will be transmitted and part will be reflected. For non-normal incidence, the transmission and reflection coefficients can be calculated from the Fresnel equations.

In at least one embodiment, a moisture sensor is configured such that the presence of moisture on a given surface will increase the amount of light that is reflected by the given surface toward an associated image sensor. In at least one embodiment, a moisture sensor is configured such that the presence of moisture on a given surface will decrease the amount of light that is reflected by the given surface toward an associated image sensor. In at least one embodiment, at least one optical system is optically coupled to a piece of glass such that a central optical axis of the optical system defines an angle greater than or equal to a critical angle between glass and air with respect to the outer surface of the piece of glass such that a viewing phenomenon is achieved similar to TIR experienced by light rays having an angle of incidence exceeding a critical angle. In at least one embodiment, at least one optical system is optically coupled to a piece of glass such that a central optical axis of the optical system defines an angle less than or equal to a critical angle between glass and water with respect to the outer surface of the piece of glass such that TIR does not happen with light rays having an angle of incidence less than this critical angle. In at least one embodiment, a light source optical axis is angled with respect to normal to the windshield between approximately 42 degrees and approximately 61 degrees.

In at least one embodiment, the fact that moisture drops often at least partially replicate the optical characteristics of concave mirrors is advantageously used to reflect light rays emitted by a supplemental illumination system. The supplemental illumination system illuminates an area of the windshield associated with moisture detection. When moisture is present on the windshield, an image of at least a portion of the supplemental illumination system is obtainable. An image sensor focused on the moisture detection area of the windshield will see reflections of the supplemental illumination system when moisture is present.

Figure 4A:
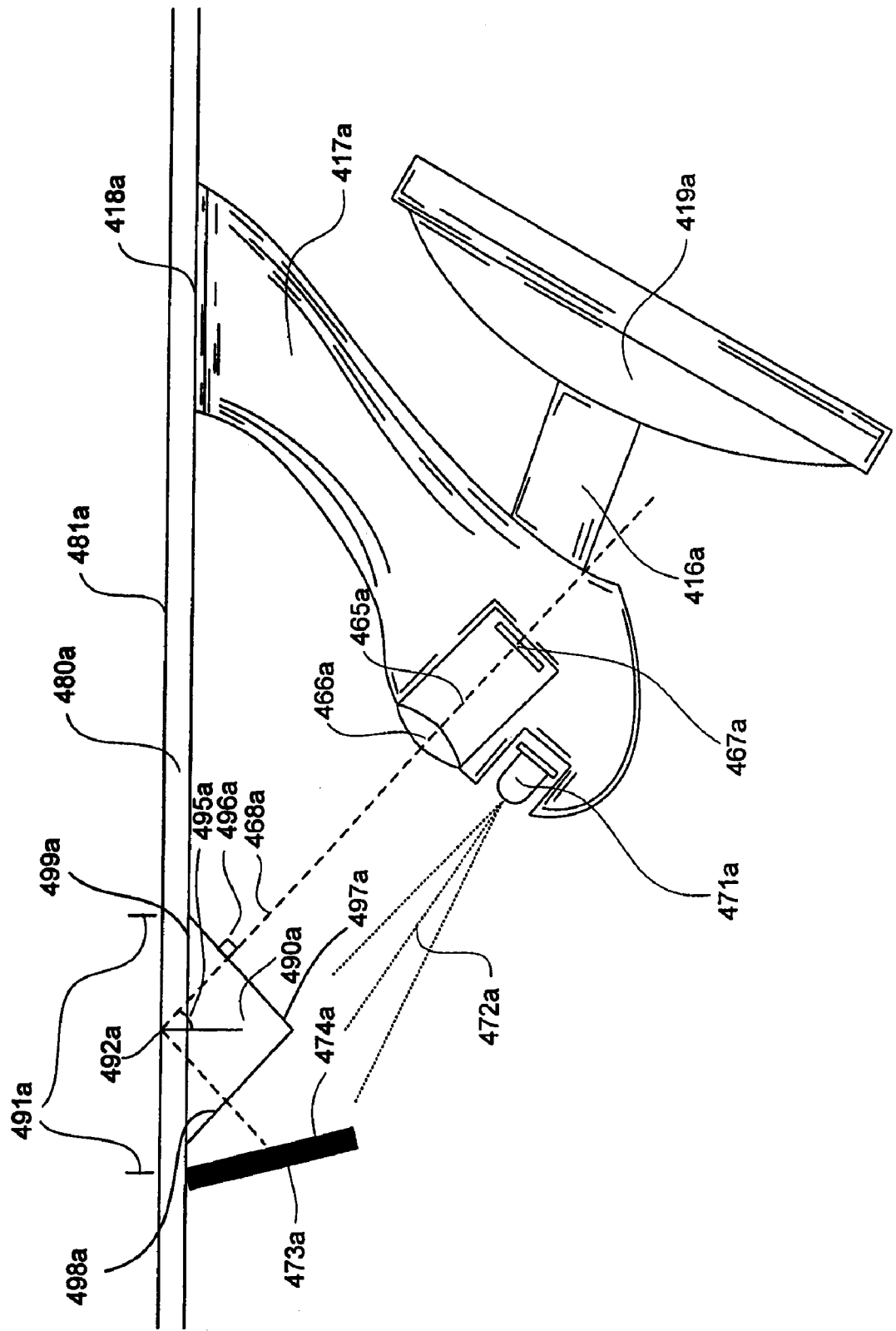
FIG. 4a depicts a profile view of an embodiment of a moisture sensor partially incorporated in a rearview mirror assembly proximate a windshield.

Turning to FIG. 4a, an embodiment of a moisture sensor is depicted incorporated in a rearview mirror assembly. The rearview mirror assembly is attached to an inner surface 482a of a windshield 480a via a mount 418a and support structure 417a. The windshield also comprises an outer surface 481a. A rearview mirror 418a is pivotally attached via a stem 416a to the support structure. In at least one embodiment, the moisture sensor comprises an optical system 465a having a lens 466a, an image sensor 467a and a primary optical axis 468a. In at least one embodiment, the moisture sensor is configured such that the primary optical axis is optically aligned with an optics element 490a as is described below in FIG. 5a at a position normal to the first optics element lens 497a such that the field of view 491a is substantially centered on point 492a. In at least one embodiment, the size of base lens 498a of optics element 490a dictates the rain sensor detection area 491a. In at least one embodiment, the optics element 490a is optically coupled to the inner surface via optical coupling material.

In at least one embodiment a supplemental illumination assembly having at least one light source 471a emits light rays 472a generally toward a dark colored backdrop 473a such that at least a portion of the light rays illuminate the windshield and second optics element lens 498a. In at least one embodiment, the backdrop is provided with a reflective material 474a on a surface facing toward the optics element. In another embodiment, when moisture is present on the outer surface 481a of windshield 480a, the moisture drops at least partially replicate the optical characteristics of concave mirrors is advantageously used to reflect light rays emitted by a supplemental illumination system toward image sensor 467a through optics element 490a after it has reflected off backdrop 473a.

In at least one embodiment, the optics element such as optics element 490a contains an additional transparent diffuse surface 555a as shown in FIG. 5a allowing the moisture sensor to obtain information about the ambient light situation outside windshield. In another embodiment, the diffuse surface is located above optics element and within the viewing area of the moisture sensor. The transparent diffuse surface gives the moisture sensor added sun loading functionality as its illuminated gradient can be studied. In another embodiment, the diffuse surface is located above optics element 490a and within the viewing area of the moisture sensor.

Figure 4B:
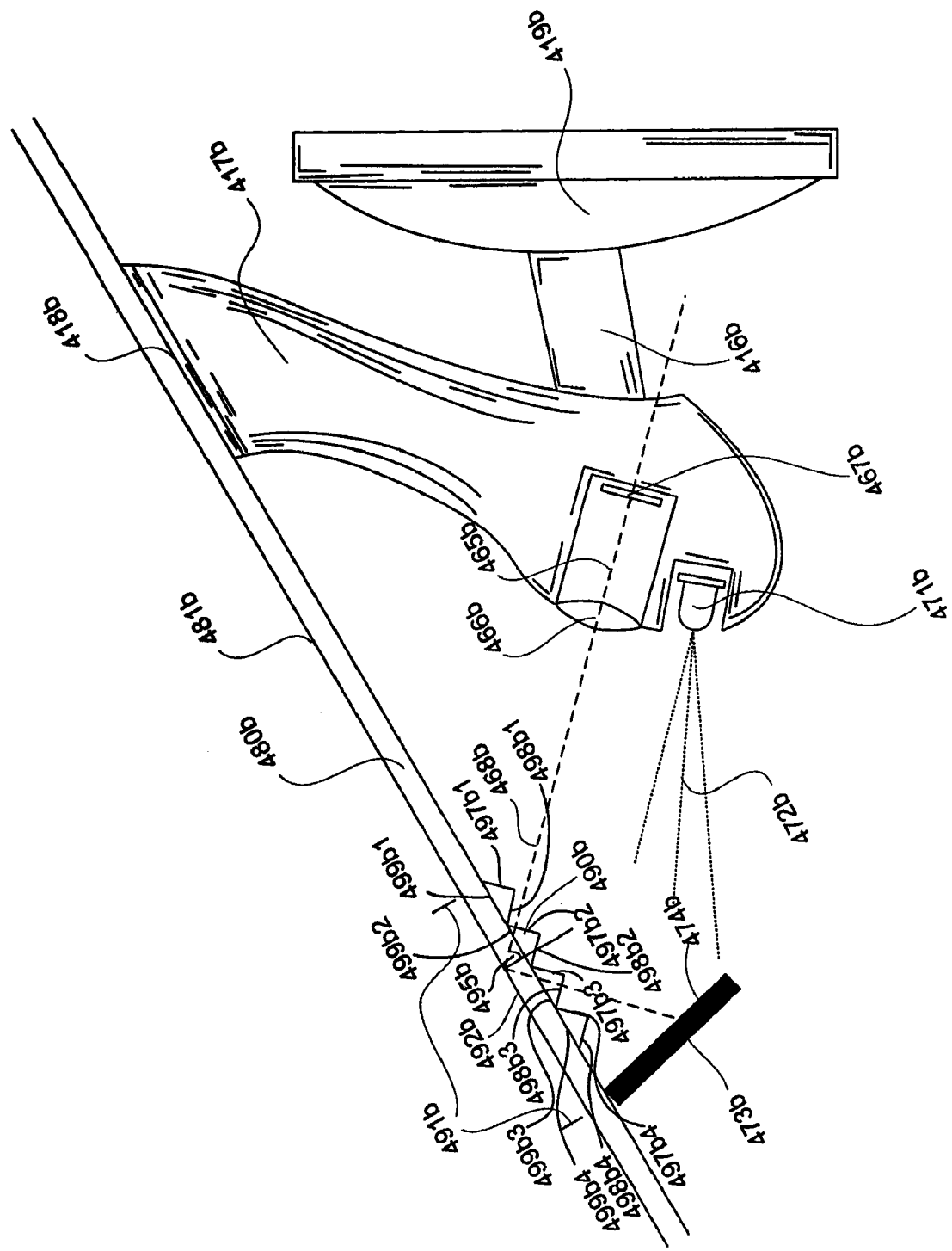
FIG. 4b depicts a profile view of an embodiment of a moisture sensor partially incorporated in a rearview mirror assembly proximate a windshield.

Turning to FIG. 4b, an embodiment of a moisture sensor is depicted incorporated in a rearview mirror assembly. The rearview mirror assembly is attached to an inner surface 482b of a windshield 480b via a mount 418b and support structure 417b. The windshield also comprises an outer surface 481b. A rearview mirror 419b is pivotally attached via a stem 416b to the support structure. In at least one embodiment, the moisture sensor comprises an optical system 465b having a lens 466b, an image sensor 467b and a primary optical axis 468b. In at least one embodiment, the moisture sensor is configured such that the primary optical axis is optically aligned with a plurality of small optics elements combined together to form single optics element 490b as described below in FIG. 5b at a position normal to any of the first optics element lens 497b1, 497b2, 497b3, 497b4 such that the field of view 491b is substantially centered on point 492b. In at least one embodiment, the size of base lens 499b of optics element 490b dictates the rain sensor detection area 491b. In at least one embodiment, the optics element 490b is optically coupled to the inner surface via optical coupling material.

In at least one embodiment a supplemental illumination assembly having at least one light source 471b emits light rays 472b generally toward a dark colored backdrop 473b such that at least a portion of the light rays illuminate the windshield and second optics element lens 498b. In at least one embodiment, the backdrop is provided with a reflective material 474b on a surface facing toward the optics element. In another embodiment, when moisture is present on the outer surface 481b of windshield 480b, the moisture drops at least partially replicate the optical characteristics of concave mirrors is advantageously used to reflect light rays emitted by a supplemental illumination system toward image sensor 467b through optics element 490b after it has reflected off backdrop 473b.

In at least one embodiment, the optics element such as optics element 490b contains an additional transparent diffuse surface 555b as shown in FIG. 5b allowing the moisture sensor to obtain information about the ambient light situation outside windshield. In another embodiment, the diffuse surface is located above optics element and within the viewing area of the moisture sensor. The transparent diffuse surface gives the moisture sensor added sun loading functionality as its illuminated gradient can be studied. In another embodiment, the diffuse surface is located above optics element 490b and within the viewing area of the moisture sensor.

Turning now to FIGS. 5a, 5b, and 5c, image sensor viewing paths are depicted associated with three optics elements. First, in FIG. 5a an optics element 590a is optically coupled to an inner surface 582a of a substrate 580. Moisture droplet 591a is present on an outer surface 581a. In at least one embodiment, optics element 590a has a first surface 592a1, a second surface 592a2, and a base surface 592a3 such that the intersection of first lens 592a1 and second lens 592a2 form a right angle and base lens 592a3 intersects both first lens 592a1 and second lens 592a2 with angle smaller than a right angle forming a triangular shape. In another embodiment, the intersection of first lens 592a1 and second lens 592a2 do not need to form a right angle. The viewing area of a given image sensor is defined by primary optical axis 577a1 and boundary axes 577a2 and 577a3. The angle of first lens 592a1 with respect to normal to the windshield allows the viewing path, shown with primary optical axis 577a1, that is normal to first lens 592a1 to experience TIR at outer surface 581a at least once. In at least one embodiment, optics element 590a is optically coupled to the inner surface via optical coupling material 576a. The size of base lens 592a3 dictates the detection area of the moisture sensor on substrate 580a. In at least one embodiment, a moisture sensor is configured such that the associated optical system views the outer surface of a windshield at an angle that results in the image being that of a scene substantially internal to the vehicle when moisture is not present; when moisture is present, at least a portion of the scene exterior of the vehicle is imaged.

In at least one embodiment, the primary optical axis 577a1 enters optics element 590a and substrate 580a through first lens 592a1 and experiences TIR at outer surface 581a and exits substrate 580a and optics element 590a at second lens 592a2 resulting in an image of any object that is beyond second lens 592a2. When moisture is present on outer surface 581a, primary optical axis 577a1 enters the optics element 590a and substrate 580a through first lens 592a1 and at least a portion of the viewing path will exit substrate 580a through moisture as shown with viewing path ray 577a4 resulting in an image of any object beyond the outer surface 581a in this portion of the viewing path. The moisture acts, at least in part, to convert the outer surface from reflective to refractive.

In FIG. 5b an optics element 590b is optically coupled to an inner surface 582b of a substrate 580b. Moisture droplet 591b is present on an outer surface 581b. In at least one embodiment a plurality of small optics elements are combined to form a single optics element 590b which has a plurality of first lenses 592b11, 592b12, 592b13, and 592b14, a plurality of second surfaces 592b21, 592b22, 592b23, 592b24, and a single base lens 592b3 such that the intersection of each successive first lens with each successive second lens form a right angle and base lens 592b3 intersects each first lens and each second lens with angle smaller than a right angle forming a plurality of triangular shapes. In another embodiment, the intersection each successive of first lens and each successive second lens do not need to form a right angle. The viewing area of a given image sensor is defined by primary optical axis 577b1 and boundary axes 577b2 and 577b3. The angle of each first lens with respect to normal to the windshield allows the viewing path, shown with primary optical axis 577b1, that is normal to first lens 592b12 to experience TIR at outer surface 581b at least once. In at least one embodiment, optics element 590b is optically coupled to the inner surface via optical coupling material 576b. The size of base lens 592b3 dictates the detection area of the moisture sensor on substrate 580b.

In at least one embodiment, the primary optical axis 577b1 enters optics element 590b and substrate 580b through first lens 592b12 and experiences TIR at outer surface 581b and exits substrate 580b and optics element 590b at second lens 592b23 resulting in an image of any object that is beyond second lens 592b2. When moisture is present on outer surface 581b, primary optical axis 577b1 enters the optics element 590b and substrate 580b through first lens 592b12 and at least a portion of the viewing path will exit substrate 580b through moisture as shown with viewing path ray 577b4 resulting in an image of any object beyond the outer surface 581b in this portion of the viewing path. The moisture acts, at least in part, to convert the outer surface from reflective to refractive.

In FIG. 5c an optics element 590c is optically coupled to an inner surface 582c of a substrate 580c. Moisture droplet 591c is present on an outer surface 581c. In at least one embodiment a single small optics elements 590c, which has a first lens 592c1, a second lens 592c2, and a base lens 592c3 such that the intersection of the first lens with the second lens form a right angle and base lens 592c3 intersects the first lens and second lens with angle smaller than a right angle forming a triangular shape. In another embodiment, the intersection each successive of first lens and each successive second lens do not need to form a right angle. If the angle between the first lens and second lens is a right angle, the size of base lens 592c3 is related to the angle of first lens 592c1 and the thickness of substrate 580c by the following equation:

$$L = 2 \cdot \left( \frac{\sin\theta_1 \cdot t}{\sin(90° - \theta_2)} \right)$$

where L is the length of the base lens, $\theta_1$ is the desired reflection angle of the primary optical axis with reference to normal to the outer surface, and t is the thickness of the substrate. This will allow the entire viewing path to repeatedly reflect inside the substrate upon entering through optics element 590c. The viewing area of a given image sensor is defined by primary optical axis 577c1 and boundary axes 577c2 and 577c3. The angle of first lens 592c1 with respect to normal to the windshield allows the viewing path, shown with primary optical axis 577c1, that is normal to first lens 592c1 to experience a repetition of TIR at outer surface 581c and inner surface 582c a plurality of times. In at least one embodiment, optics element 590c is optically coupled to the inner surface via optical coupling material 576c. The size of base lens 592c3 and the number of reflections acquired before attenuation dictate the detection area of the moisture sensor on substrate 580c.

In at least one embodiment, the primary optical axis 577c1 enters optics element 590c and substrate 580c through first lens 592c1 and experiences TIR at outer surface 581c and then experiences TIR at inner surface 582c. This repeats a plurality of times resulting in an image the inside of the windshield.

When moisture is present on outer surface 581c, primary optical axis 577c1 enters the optics element 590c and substrate 580c through first lens 592c1 and at least a portion of the viewing path will exit substrate 580c through moisture as shown with viewing path ray 577c1 and 577c4 resulting in an image of any object beyond the outer surface 581c in this portion of the viewing path. It is important to note that the exit may happen after one or several reflections between the outer and inner surfaces. The moisture acts, at least in part, to convert the outer surface from reflective to refractive.

It is important to note that, the entire moisture sensor system does not have to be oriented such that the optics element is parallel with the bottom of the windshield. The moisture sensor system can be oriented at a different angle about normal to the windshield such that the optics element is parallel either side of the windshield or not parallel at all to any side of the windshield. The moisture sensor will still function properly as long as it is outside any fringe or shading associated with the windshield and as long as it is within the path of the wiper system.

Figure 6A:
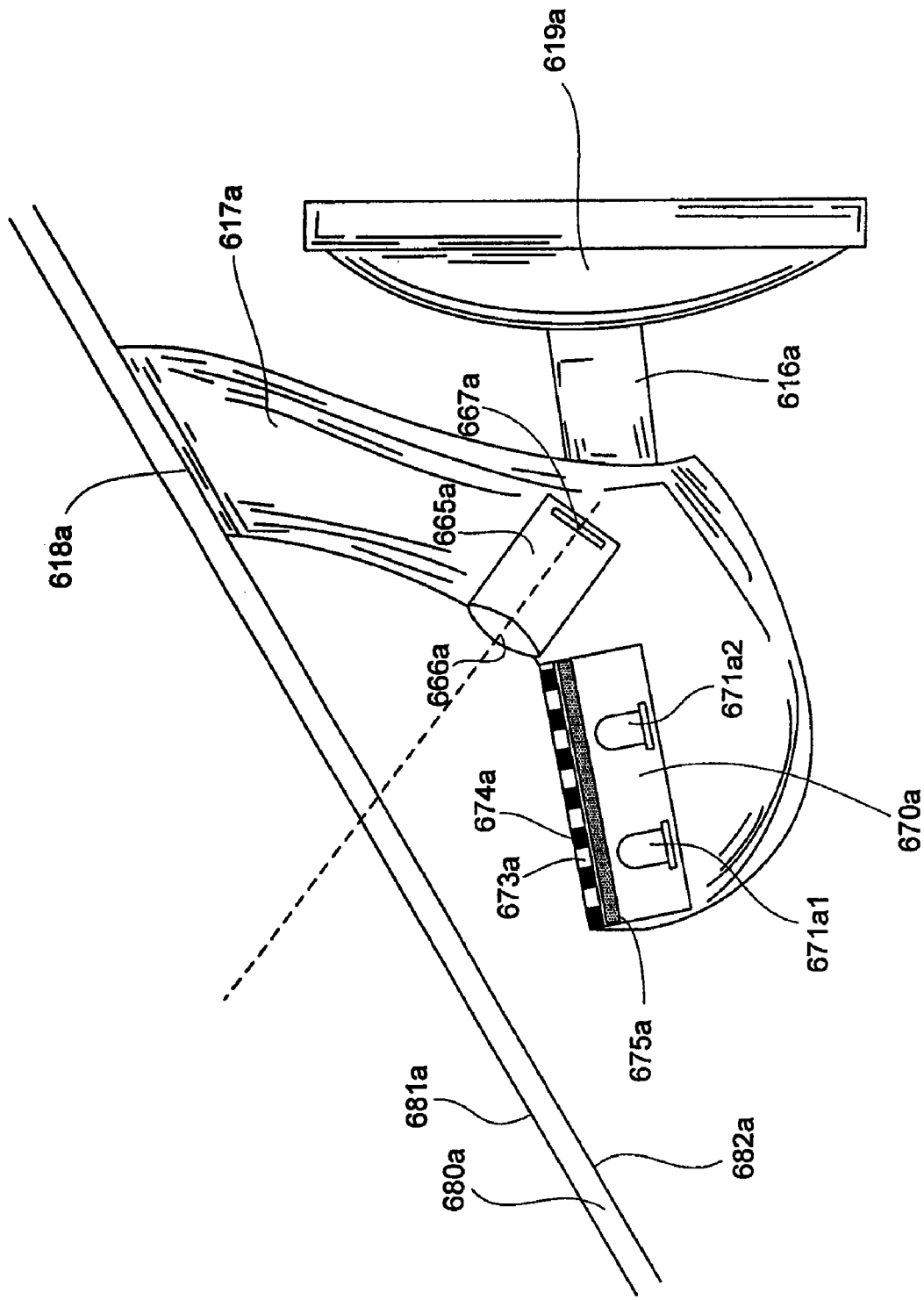
FIG. 6 depicts a profile view of an embodiment of a moisture sensor incorporated in a rearview mirror assembly.

With reference now to FIG. 6a, an embodiment of a moisture sensor is depicted incorporated in a rearview mirror assembly. The rearview mirror assembly is attached to an inner surface 682a of a windshield 680a via a mount 618a and support structure 617a. The windshield also comprises an outer surface 681a. A rearview mirror is pivotally attached via a stem 616a to the support structure. In at least one embodiment, the moisture sensor comprises a patterned supplemental illumination assembly 670a comprising a first light sources 671a1, a second light source 671a2 and a spatial patterned target having substantially transparent areas 673a and substantially opaque areas 674a as described below in FIGS. 6b, 6c, and 6d. In another embodiment, the moisture sensor comprises a patterned supplemental illumination assembly 670a comprising of a plurality of light sources and a spatial patterned target having substantially transparent areas 673a and substantially opaque areas 674a. In at least one embodiment, an optical system 665a comprising a lens 666a and an image sensor 667a is provided. In at least one embodiment, a diffuse surface, or optic 675a, produces a uniform, collimated, optically efficient pattern of lines which make up the patterned supplemental illumination assembly. In at least one embodiment, diffuse surface, or optic 675a, comprises a series of light pipes to produce a uniform, collimated, optically efficient pattern of lines which make up the supplemental illumination assembly.

Figure 6B:
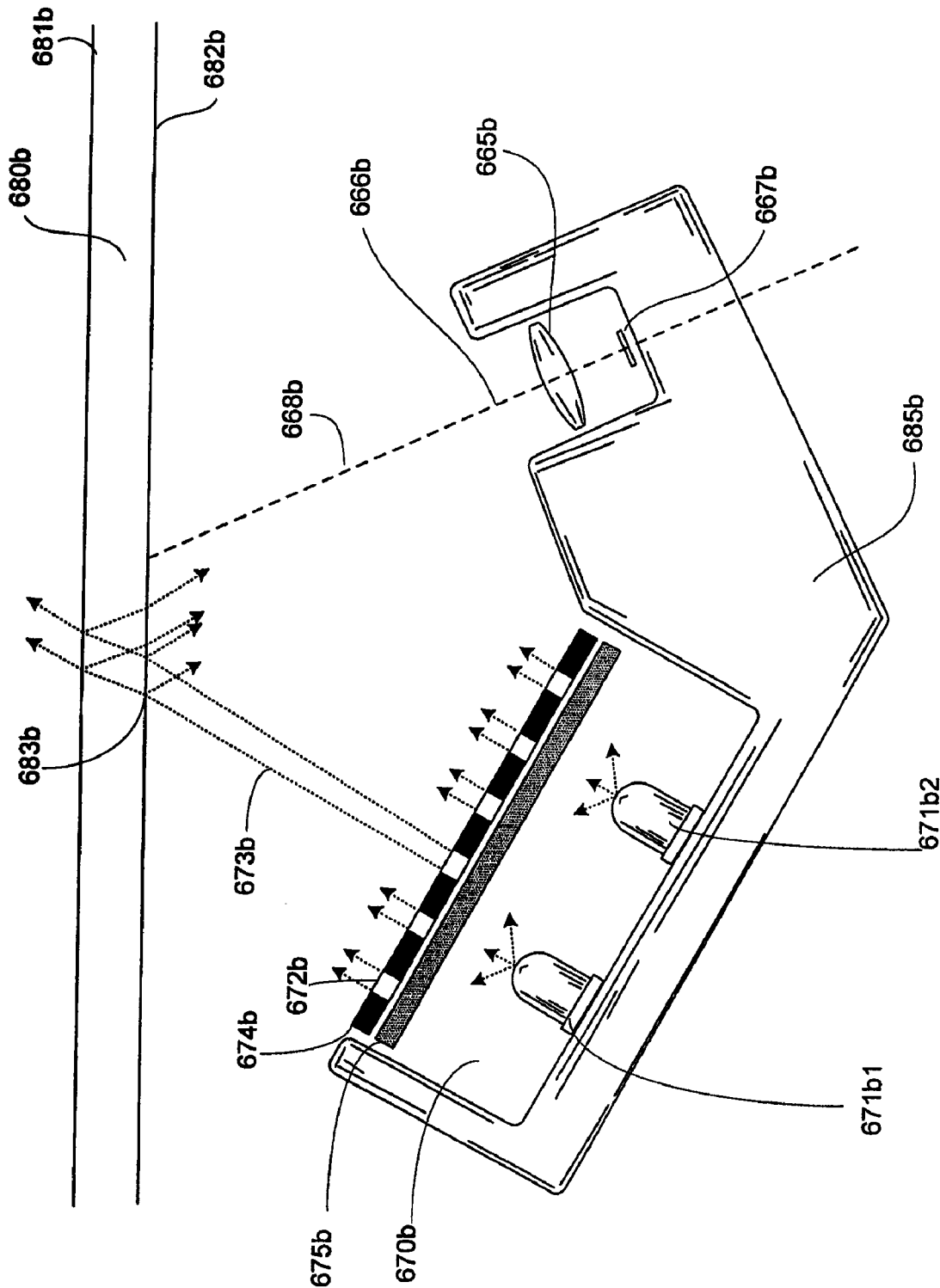

With reference now to FIG. 6b, an embodiment of a moisture sensor is depicted proximate a substrate 680b having an outer surface 681b and an inner surface 682b. In at least one embodiment, the moisture sensor comprises a patterned supplemental illumination assembly 670b comprising a first light source 671b1, a second light source 671b2 or a plurality of light sources and a spatial patterned target having substantially transparent areas 672b and substantially opaque areas 674b. In at least one embodiment, an optical system 665b comprising a lens 666b and an image sensor 667b is provided. In at least one embodiment, the moisture sensor is configured with an optical system primary optical axis 668b aligned such that the optical system field of view is substantially equal to a pattern 683b defined by light rays 673b and aligned such that the optical system field of view is able to see a substantial separation 685b of pattern 683b first reflection 683b on inner surface 682b and second reflection 684b on outer surface 681b. This separation can be controlled, at least in part, by the width of the transparent areas 672b and the opaque areas 674b, described further below in FIGS. 6c and 6d, as well as the angle between the optical system primary optical axis 668b and the patterned supplemental illumination assembly 670b. In at least one embodiment, the optical system must be positioned such that it is located along the length of the patterned supplemental illumination rather than the width so that reflection separation can take place. In at least one embodiment, a diffuse surface, or optic 675b, to produces a uniform, collimated, optically efficient pattern of lines which make up the patterned supplemental illumination assembly. In at least one embodiment, diffuse surface, or optic 675b, comprises a series of light pipes to produce a uniform, collimated, optically efficient pattern of lines which make up the supplemental illumination assembly.

Figure 6C:
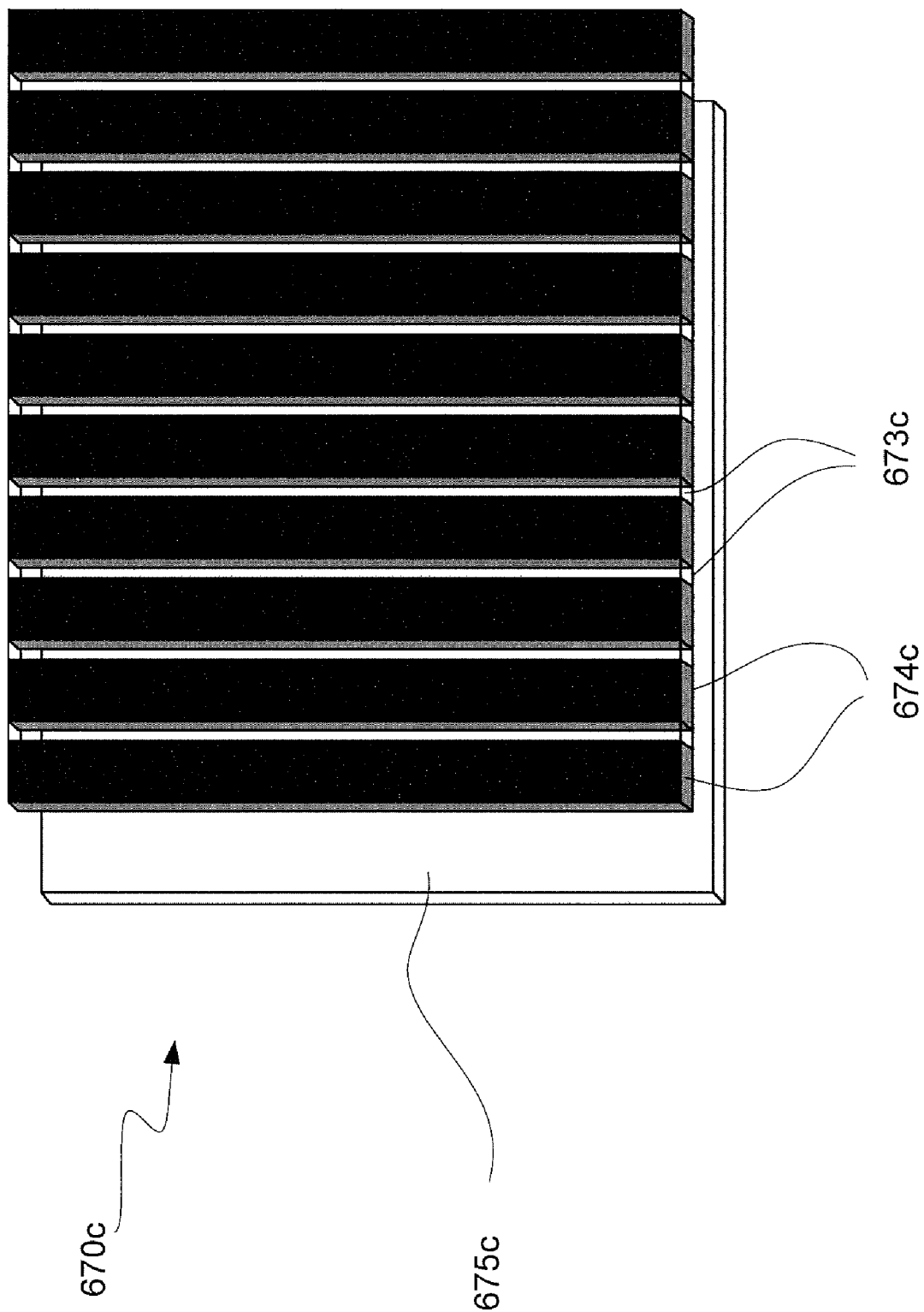
Figure 6D:
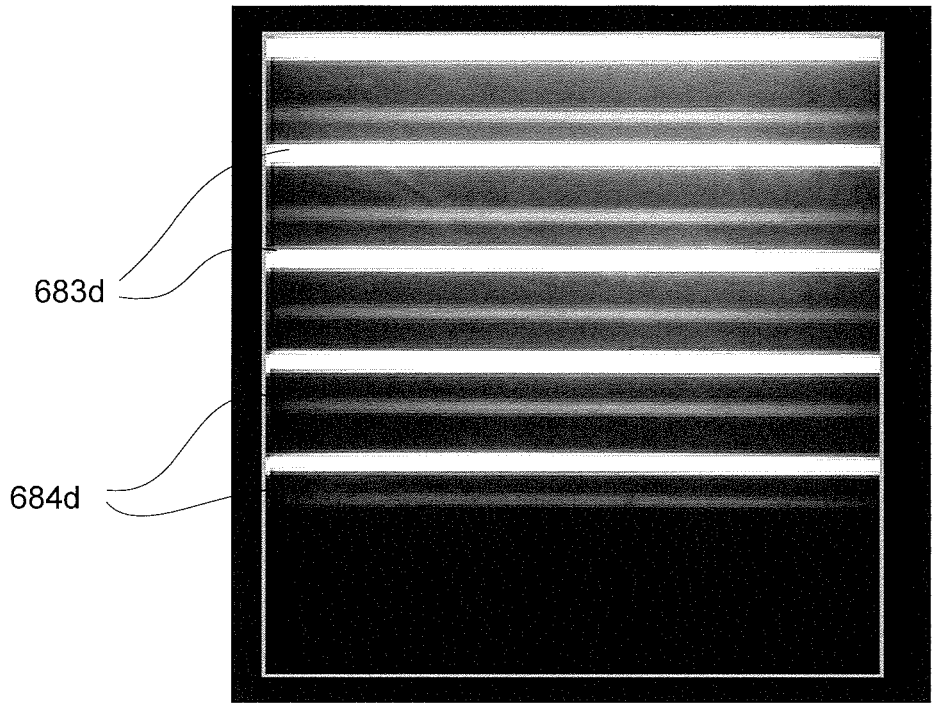

FIG. 6c depicts a plan view of an embodiment of a light ray pattern 670c that may be used to emit a pattern from the patterned supplemental illumination assembly. As can be seen there are relatively narrow transparent strips, or strips of illumination, stratified with relatively wide non-illuminated, or opaque strips. In at least one embodiment, a diffuse surface, or optic 675c, to produces a uniform, collimated, optically efficient pattern of lines which make up the patterned supplemental illumination assembly. For example, to increase the efficiency of the supplemental illumination system a cylindrical lens array positioned parallel with the thin lines may be used. The focal length of the cylindrical lens array is preferably determined to culminate the output light rays from the supplemental illumination system. A diffuse surface 675c on the cylindrical lens array may be used to minimize hot spots; the diffuse surface will create more uniformly illuminated lines. A holographic diffuser with a 0.20×400 light shaping diffuser angle positioned such that the directional diffuse light is parallel with the thin lines may be use to accomplish this. In at least one embodiment, diffuse surface, or optic 675c, comprises a series of light pipes to produce a uniform, collimated, optically efficient pattern of lines which make up the supplemental illumination assembly. FIG. 6d depicts a plan view of an image of reflected light rays associated with a moisture sensor configured with a patterned supplemental illumination assembly with no moisture present. As can be seen relatively brighter reflected light rays 683d result from reflection from an inner surface and relatively dimmer reflected light rays 684d result from reflection from an outer surface.

Figure 6E:
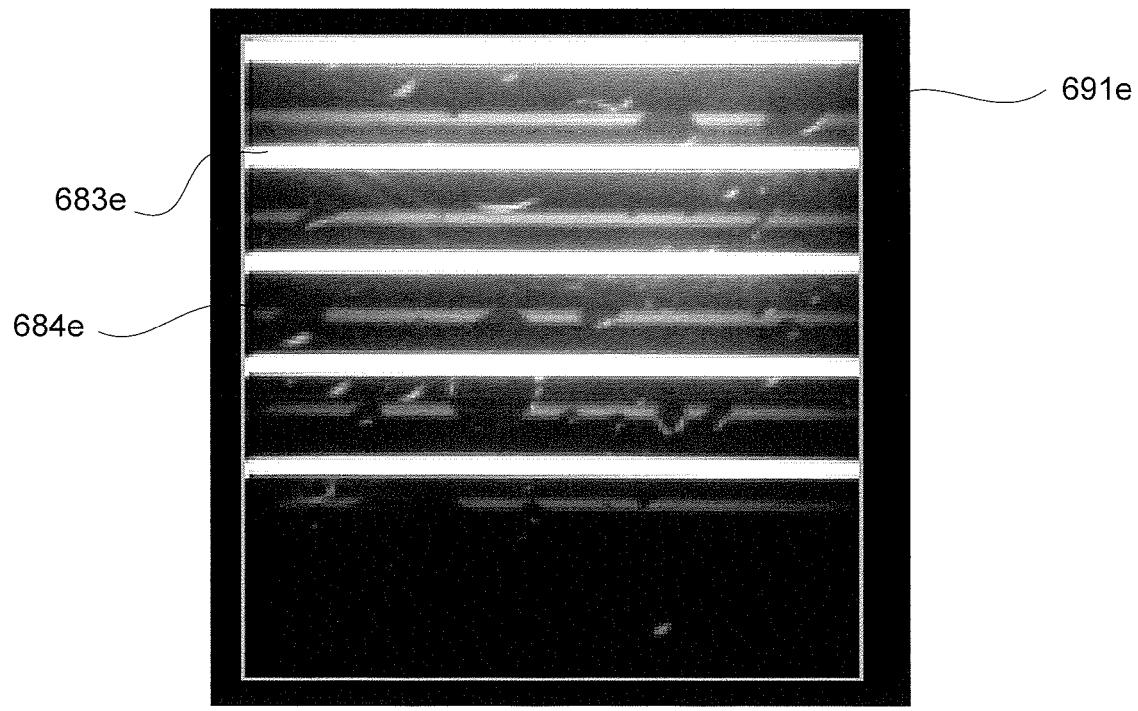

FIG. 6e depicts a plan view of an image of reflected light rays associated with a moisture sensor configured with a patterned supplemental illumination assembly as in FIG. 6d, however, moisture 691e is present. As can be seen, the reflections 684e are now discontinuous, reveling the moisture. In at least one embodiment, discontinuities from moisture can be considered voids or valleys as one travels along the length of the reflection. The reflections 683e remain substantially similar to those of FIG. 6d. In at least one embodiment, each surface of the windshield functions as a flat reflective mirror. A windshield consists of two surfaces, a primary surface (interior of the vehicle) and a secondary surface (exterior of the vehicle). Because there is a space between each surface (the thickness of the windshield), two reflections of an object separate from one another are produced when viewed at an angle with reference to normal to the windshield. The separation of the two reflections is dependent, at least in part, on the angle at which the reflections are viewed and the angle at which the light source is positioned with respect to the windshield as well as the width of the transparent and opaque strips. When the patterned supplemental illumination is composed of a series of thin straight lines or markings positioned such that they are viewed from the length of the markings, the primary and secondary reflections are substantially isolated such that there is substantially no overlap. When there is moisture on the windshield the secondary reflection becomes distorted with voids or discontinuities, thereby, the moisture on the windshield is detectable.

A supplemental illumination system preferably projects thin straight lines onto the windshield where moisture detection is to take place. It is preferred that the supplemental illumination system be positioned such that it is tilted toward the top of the windshield and the image sensor is positioned such that it is parallel to the length of the corresponding reflections. Preferably, the supplemental illumination system comprises a lens, markings and at least one light source. The markings of the supplemental illumination system may be thin parallel lines running parallel with the horizontal direction of the windshield. The illuminated lines are preferably very thin and the substantially non-illuminated lines that separate these illuminated lines are preferably thicker to ensure substantially complete separation between the primary and secondary reflections. The thickness of the projected thin lines is preferably approximately 0.02 inches or thinner and the thickness of the spacing between these lines is preferably approximately 0.198 inches depending on how many thin lines are to be projected from the object system and, or, the tilt of the supplemental illumination system with respect to the windshield and, or, the image sensor. The number of lines in the supplemental illumination system defines how thorough the area of interest on the windshield is inspected for moisture. The size of the supplemental illumination system, at least in part, defines the size of the detection area of the windshield. The supplemental illumination system's total size is preferably approximately 30 mm×40 mm creating about a square inch of effective windshield detection area depending, at least in part, on the distance the supplemental illumination system is from the windshield. In at least one embodiment, the patterned supplemental illumination can be composed of different shapes than straight lines such as semi-circles, arcs, or circles.

In another embodiment, the orientation of the entire moisture sensor system can be oriented at any angle with reference to normal to the windshield to produce desired packaging characteristics.

Figure 6F:
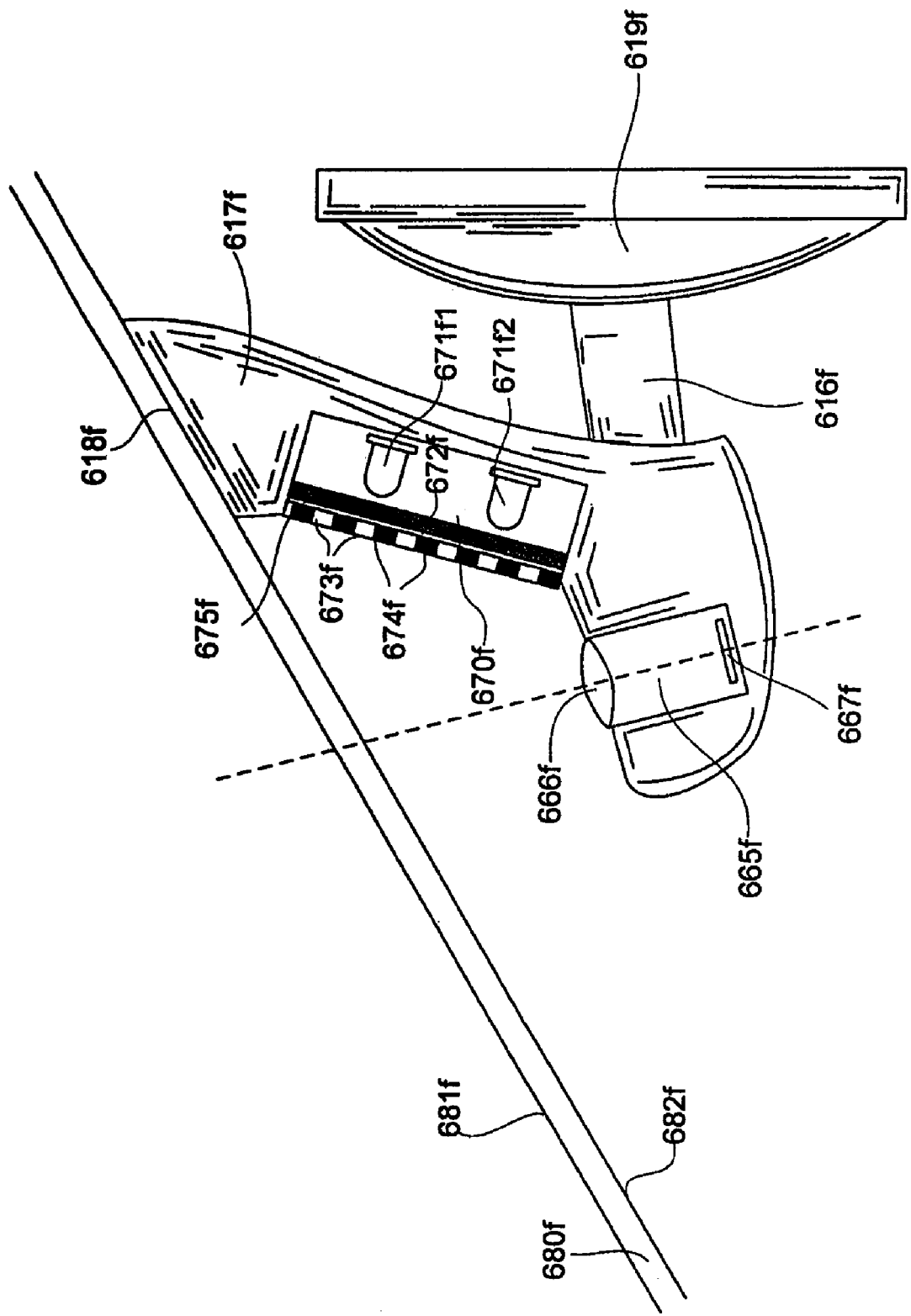

With reference now to FIG. 6f, an embodiment of a moisture sensor is depicted incorporated in a rearview mirror assembly. The rearview mirror assembly is attached to an inner surface 682f of a windshield 680f via a mount 618f and support structure 617f. The windshield also comprises an outer surface 681f. A rearview mirror is pivotally attached via a stem 616f to the support structure. In at least one embodiment, the moisture sensor comprises a patterned supplemental illumination assembly 670f comprising a first light sources 671f1, a second light source 671f2, or a plurality of light sources, and a spatial patterned target having substantially transparent areas 673f and substantially opaque areas 674f. In at least one embodiment, an optical system 665f comprising a lens 666f and an image sensor 667f is provided. In at least one embodiment, a diffuse surface, or optic 675f, is provided to produce a uniform, collimated, optically efficient pattern of lines which make up the patterned supplemental illumination assembly. In at least one embodiment, diffuse surface, or optic 675f, comprises a series of light pipes to produce a uniform, collimated, optically efficient pattern of lines which make up the supplemental illumination assembly. In at least one embodiment as depicted in FIG. 6f, it is preferable that the image sensor is positioned such that it is tilted toward the sky and that the supplemental illumination system is positioned such that it is facing toward the front of the vehicle. With these configurations, the image sensor may also function as a sky detector by supplying atmospheric information to other systems in the vehicle.

Figure 6G:
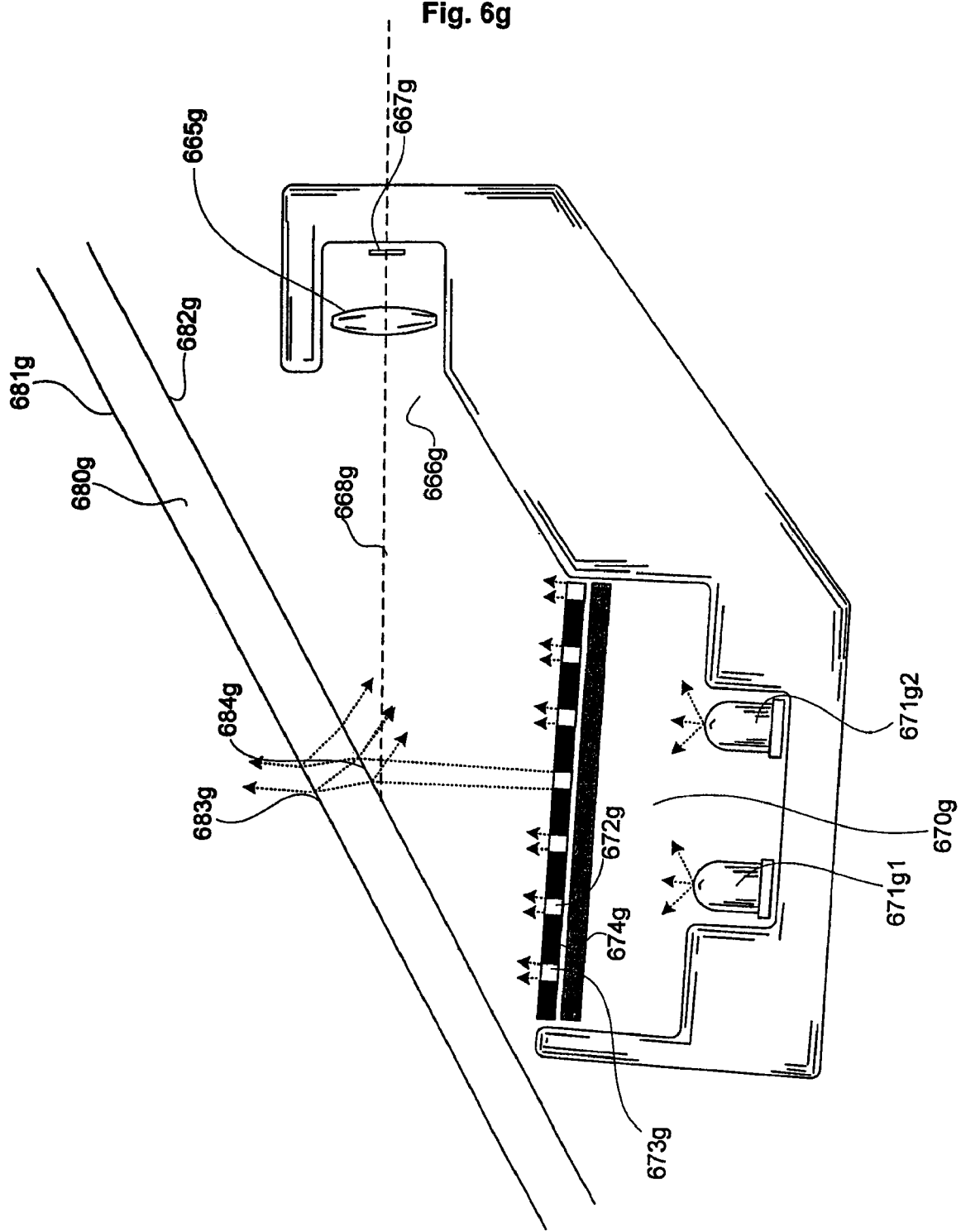

With reference now to FIG. 6g, an embodiment of a moisture sensor is depicted proximate a substrate 680g having an outer surface 681g and an inner surface 682g. In at least one embodiment, the moisture sensor comprises a patterned supplemental illumination assembly 670g comprising a first light sources 671g9, a second light source 671g2, or a plurality of light sources, and a spatial patterned target having substantially transparent areas 672g and substantially opaque areas 874g. In at least one embodiment, an optical system 665g comprising a lens 666g and an image sensor 667g is provided. In at least one preferred embodiment, substrate 680g is a windshield positioned at some angle with reference to normal to the ground and the moisture sensor is configured with an optical system primary optical axis 668g aligned such that the optical system field of view is parallel to the ground. In at least one embodiment is preferred that image sensor 667g is contained on the same plane as an exterior light control image sensor. In at least one preferred embodiment, the moisture sensor as depicted in FIG. 6g, is to function in tandem with exterior light control.

Figure 6H:
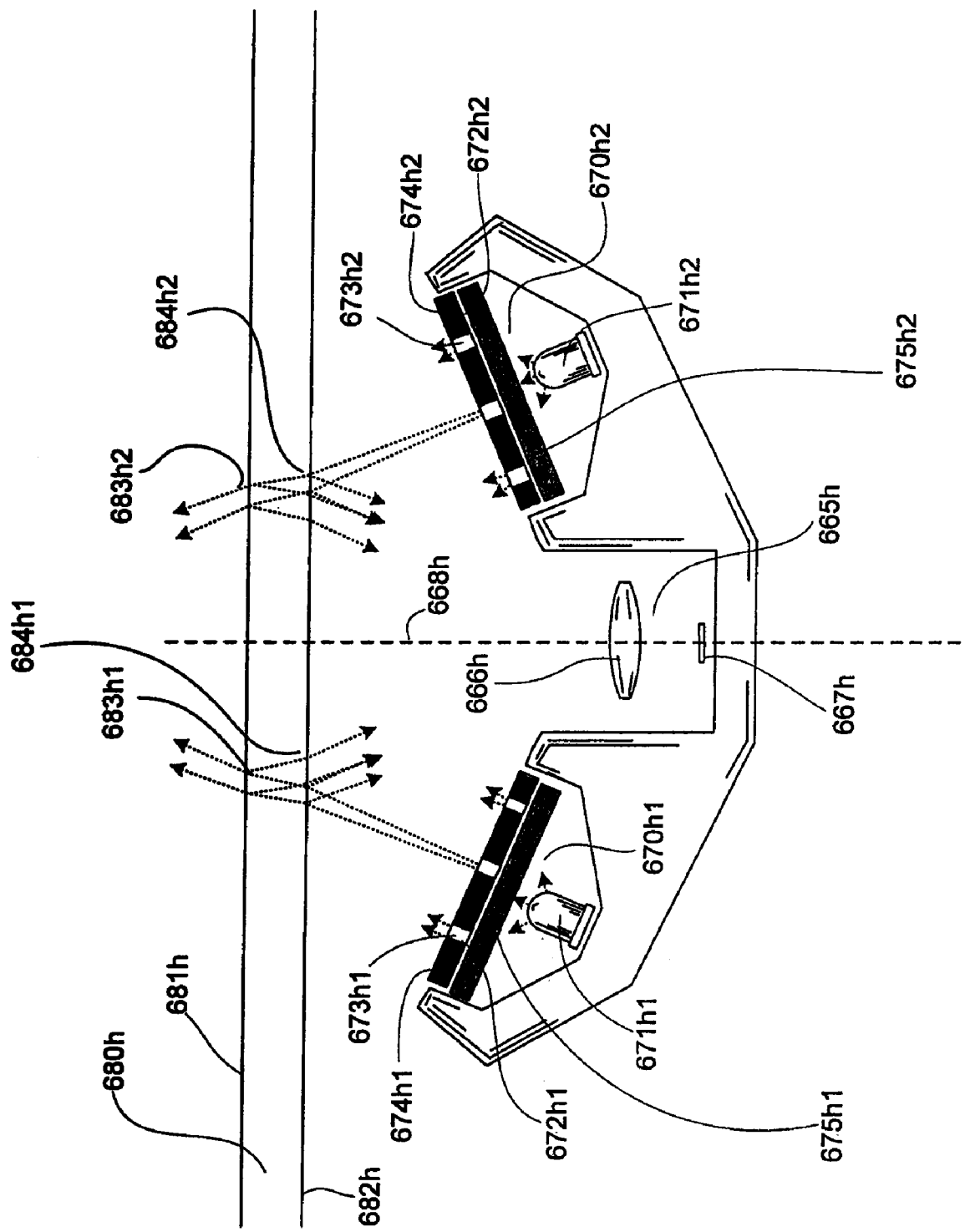

Turning now to FIG. 6h, an embodiment of a moisture sensor is depicted proximate a substrate 680h having an outer surface 681h and an inner surface 682h. In at least one embodiment, the moisture sensor comprises a first patterned supplemental illumination assembly 670$h$1 having a first light source 671$h$1 and a first spatial patterned target having substantially transparent areas 672$h$1, substantially opaque areas 674$h$1 and associated light rays 673$h$1. In at least one embodiment, a diffuse surface, or optic 675$h$1, is provided to produce a uniform, collimated, optically efficient pattern of lines which make up the patterned supplemental illumination assembly. The moisture sensor comprises a second patterned supplemental illumination assembly 670$h$2 having a second light source 671$h$2 and a second spatial patterned target having substantially transparent areas 672$h$2, substantially opaque areas 674$h$2 and associated light rays 673$h$2. In at least one embodiment, an optical system 665$h$ comprising a lens 666$h$ and an image sensor 667$h$ is provided and positioned between patterned supplemental illumination assembly 670$h$1 and 670$h$2 and angled such that optical system primary optical axis 668$h$ is normal to substrate 680$h$. In at least one embodiment, a diffuse surface, or optic 675$h$2, is provided to produce a uniform, collimated, optically efficient pattern of lines which make up the patterned supplemental illumination assembly. In at least one embodiment, the moisture sensor is configured with an optical system primary optical axis 668$h$ aligned such that the optical system field of view is substantially equal to a pattern 684$h$1, 684$h$2 defined by light rays emitted from the supplemental illumination assembly. In at least one embodiment, patterned supplemental illumination assembly 670$h$1 and 670$h$2 are angled with reference to image sensor 667$h$ such at that reflections 683$h$1 and 684$h$1 are separated when viewed by optical system 665$h$.

Figure 7A:
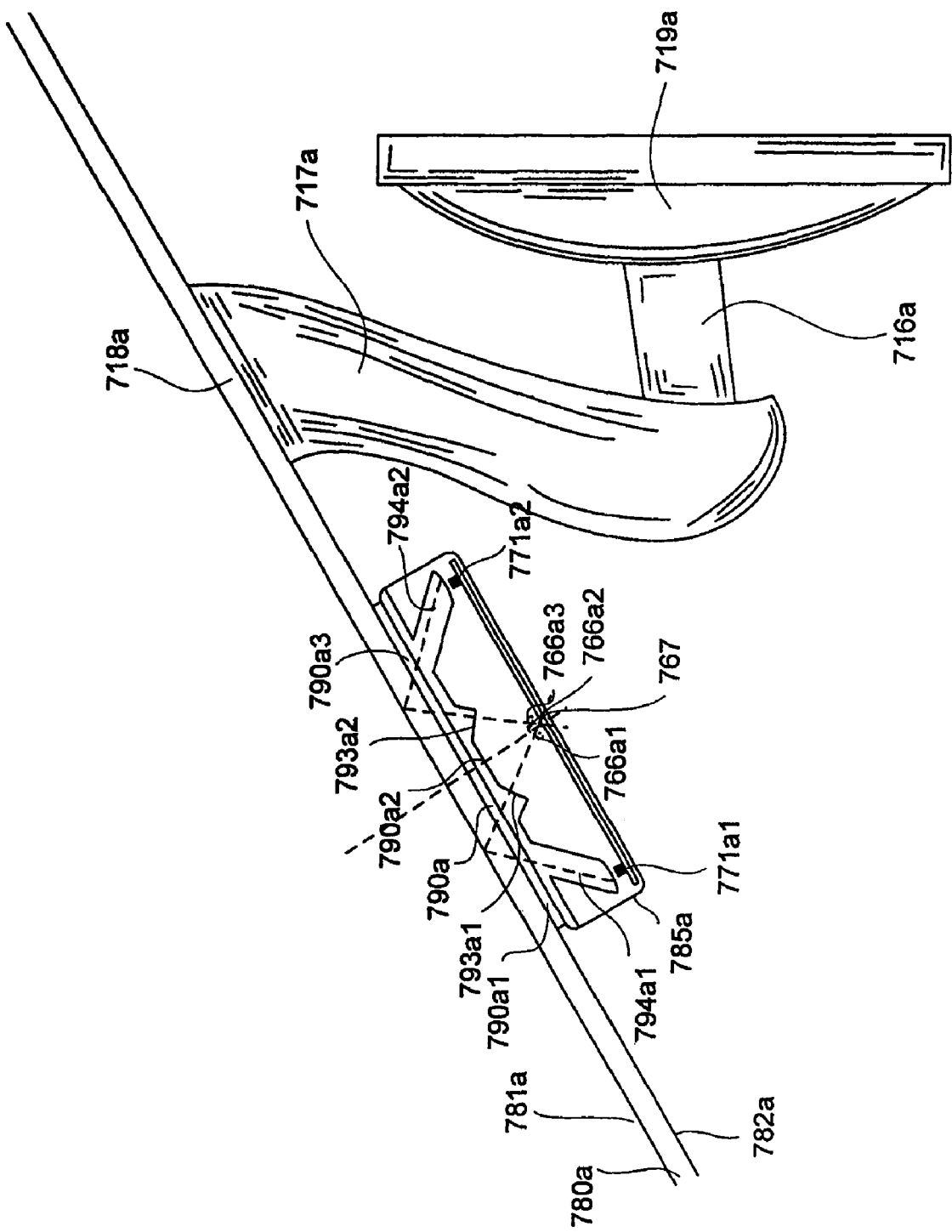
FIG. 7 depicts a profile view of an embodiment of a moisture sensor proximate a windshield and a rearview mirror assembly.

With reference to FIGS. 7$a$ and 7$b$, an embodiment of a moisture sensor 785$a$, 785$b$ is depicted proximate a windshield 780$a$ having an outer surface 781$a$ and an inner surface 782$a$. As can be seen, the moisture sensor is depicted relative a rearview mirror assembly attached to the windshield with mount 718$a$, support structure 717$a$ and a rearview mirror 718$a$ pivotally attached via a stem 716$a$. In at least one embodiment, the moisture sensor is located proximate the windshield with an optical portion 794$a$ optically coupled to the inner surface via a coupling material 790$a$. In at least one embodiment optical portion 794$a$ contains a first supplemental illumination lens 772$a$1, 772$b$1 and a second supplemental illumination lens 772$a$2, 772$b$2 where both are angled with reference to normal to windshield 780 such that an optical path through the center of each will experience TIR on outer surface 781. In at least one embodiment, the moisture sensor comprises a printed circuit board 770$b$1, a first light source 771$a$1, 770$b$1 optically aligned with the supplemental illumination lens 772$a$1, 772$b$1, an image sensor 767$a$, 767$b$ and a lens 766$a$, 766$b$ optically aligned with the first supplemental illumination lens 771$a$1, 771$b$1, and a second light source 771$a$2, 771$b$2 optically aligned with second supplemental illumination lens 772$a$2, 772$b$2. In at least one embodiment, first and second supplemental illumination lens take the light from first and second light sources and create an illuminated line that experiences TIR on outer surface 781$a$, 781$b$. The illuminated line has width 973$b$1 and 973$b$2 as shown in FIG. 7$b$ and length corresponding to image sensor 767$a$, 767$b$, and lenses 766$a$1 and 766$a$3. The detection area on windshield 780$a$ is dictated by the width and length of the reflected line. In at least one embodiment, image sensor 767$a$, 767$b$ is a linear image sensor with width smaller than length. For example, image sensor 767$a$, 767$b$ may comprise of an 8×512 active pixel array with 15.0 μm pixel size. In at least one embodiment, the lens 766$a$, 766$b$ comprises at least three lenses 766$a$1, 766$a$2, 766$a$3. Lens 766$a$1 and 766$a$3 focus on out surface 781$a$, 781$b$ and the reflection of the line created by light sources 771$a$2 and 771$b$2. Lens 766$a$2 gathers ambient light information from between the first and second optical portions and, in at least one embodiment, can be used as a sky sensor or sun loading sensor by analyzing the light gradient across image sensor 767$a$, 767$b$. In another embodiment, it is preferred that light sources 771$a$2 and 771$b$2 be turned on at separate times, one after the other. An image of the reflected line appears on image sensor 767$a$, 767$b$ when each light source is turned on. When moisture is present on outer surface 781$a$, 781$b$, the line will experience distortion from voids and discontinuities.

Figure 8:
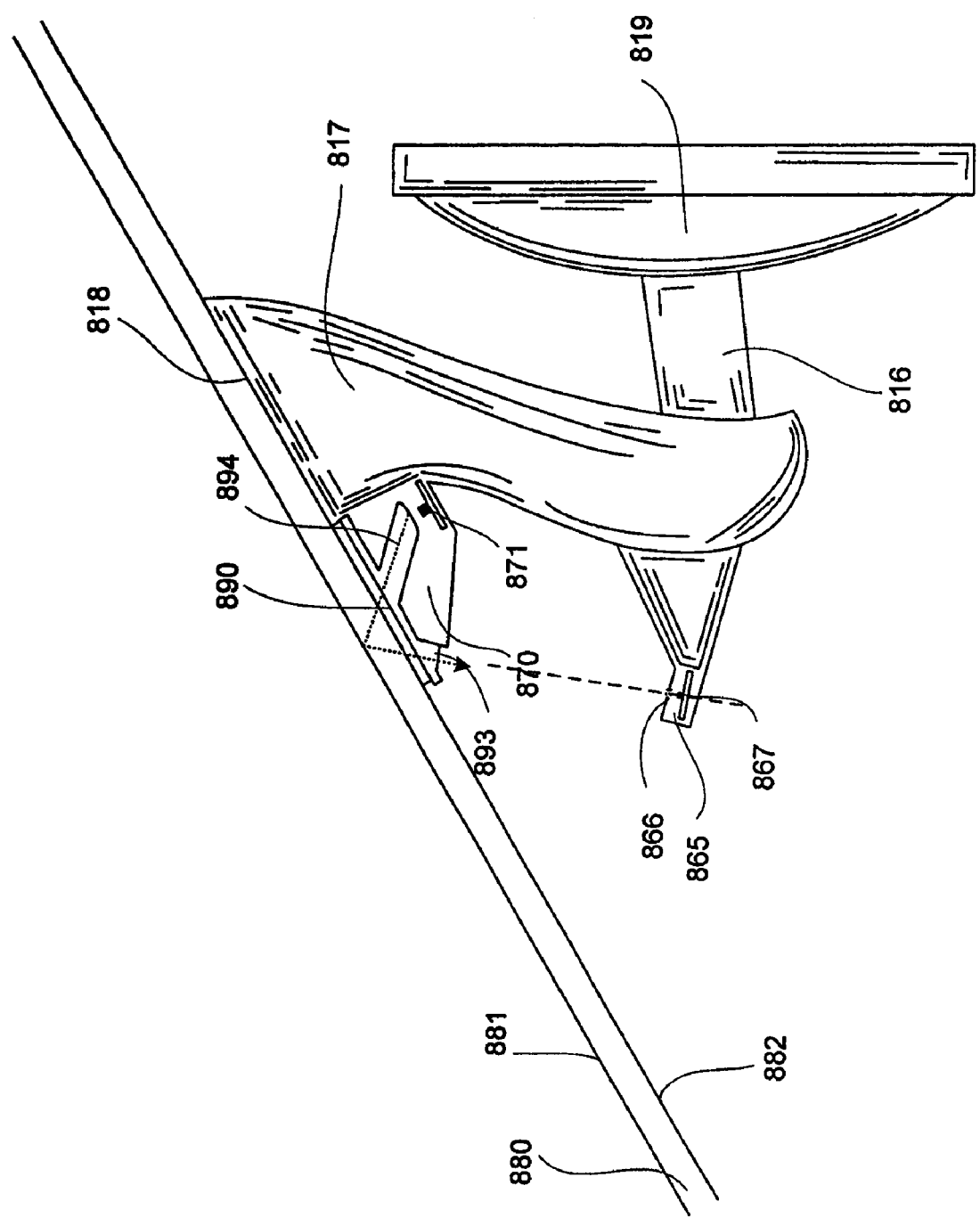
FIG. 8 depicts a profile view of an embodiment of a moisture sensor incorporated in a rearview mirror assembly proximate a windshield.

Referring now to FIG. 8, an embodiment of a moisture sensor is depicted incorporated in a rearview mirror assembly. The rearview mirror assembly is attached to an inner surface 882 of a windshield 880 via a mount 818 and support structure 817. The windshield also comprises an outer surface 881. A rearview mirror 819 is pivotally attached via a stem 816 to the support structure. In at least one embodiment, the supplemental illumination portion of the moisture sensor is optically coupled to inner surface 882 with optical coupling material 890 while the image sensor portion of the moisture sensor is not optically coupled to inner surface 882 but is positioned substantially below the supplemental illumination portion and attached to support structure 817. In at least one embodiment, the moisture sensor comprises an optical system 865 having a lens 866, an image sensor 867 and a primary optical axis. In at least one embodiment, the moisture sensor is configured such that the primary optical axis is optically aligned with a first lens 893 of an optics element 870 such that the field of view is substantially centered. In at least one embodiment first lens 893 and second lens 894 are both angled with reference to normal to windshield 880 such that an optical path through the center of each will experience TIR on outer surface 881. In at least one embodiment a supplemental illumination assembly having at least one light source 871 generates light line much like that described above in FIGS. 7$a$ and 7$b$ that experiences TIR on outer surface 831. When moisture is not present on outer surface 881, an image of a light line is seen on image sensor 871. When moisture is present on outer surface 881, an image of a distorted light line due to voids and discontinuities is seen on image sensor 871. In another embodiment, lens 866 extends the field of view of the image sensor 871 to include ambient light beyond the supplemental illumination portion of the moisture sensor.

Figure 9:
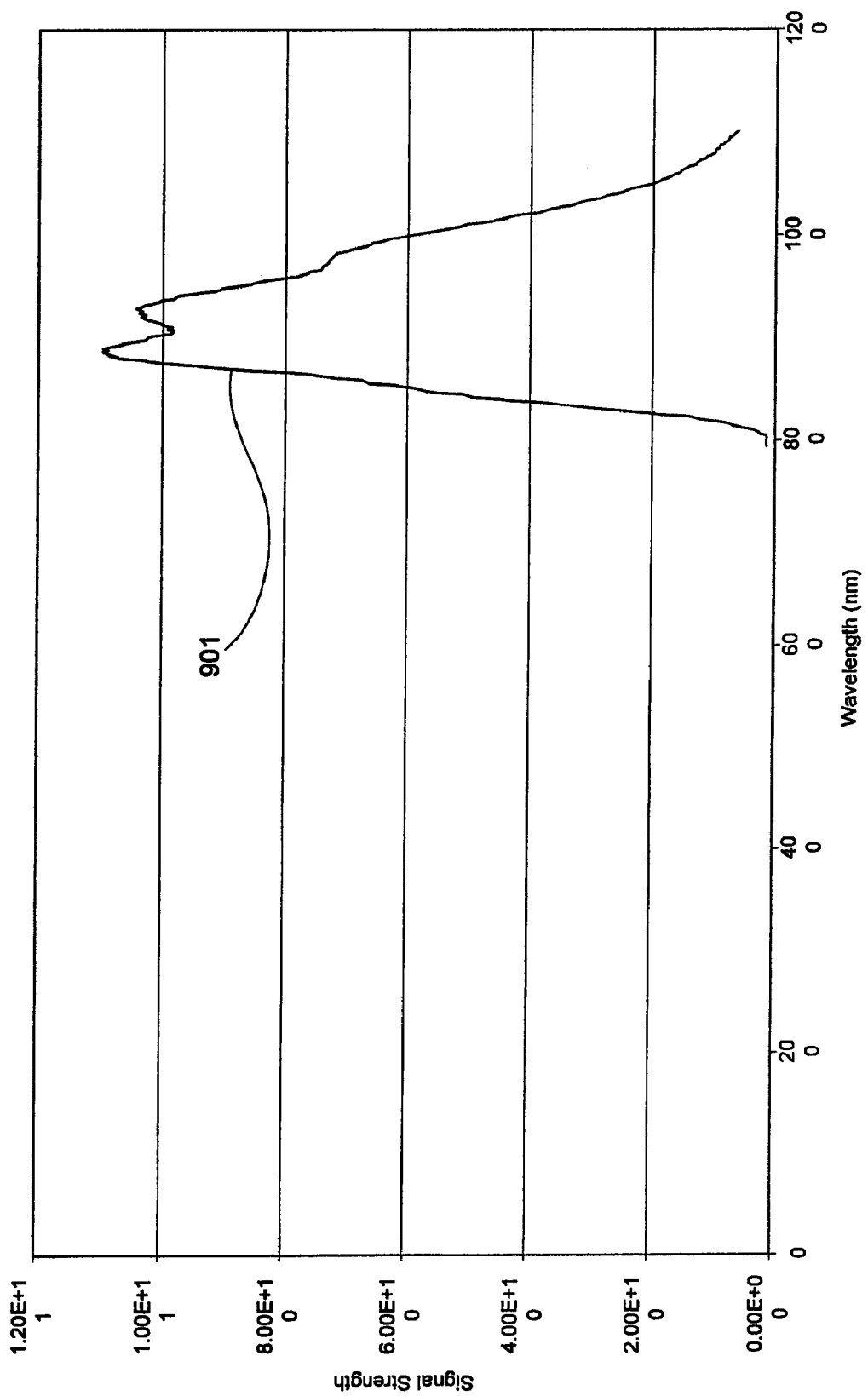
FIG. 9 depicts a chart of image sensor signal strength versus wavelength for the visible and NIR spectrum with a visible cut filter in place.

In at least one embodiment, a filter such as a visible cut filter when using near-infrared light sources with the supplemental illumination or a band pass filter with pass band aligned with the wavelength of the supplemental illumination can be included as part of the optical system and image sensor to reduce the effects of ambient light on the moisture sensor system. FIG. 9 depicts a graph 901 of typical imager signal strength when associated light rays pass through a visible cut optical filter.

Turning to FIG. 10$a$ there is shown a profile view of a rearview mirror assembly 1015$a$ mounted proximate a windshield 1080$a$ via a mount 1018$a$. In at least one embodiment, the rearview mirror assembly comprises a moisture sensor having an optical system 1065$a$ and a supplemental illumination system 1070$a$. In at least one embodiment, the optical system comprises at least one image sensor 1067$a$ and at least one lens 1066$a$. In at least one embodiment, the moisture sensor is carried upon a support structure 1017$a$ along with a stem 1016$a$ pivotally attached to a rearview mirror 1018$a$.

In at least one embodiment, the optical system is mounted such that an optical axis 1068$a$ is normal with respect to the windshield and light sources within the supplemental illumination system positioned around the optical axis are angled such that associated light rays are substantially centered on the intersection of the optical axis 1068a and the windshield 1080a. In at least one embodiment, the light sources are angled such that associated light rays reflecting off of the outer surface 1081a produce a first reflection within the field of view of the imager sensor and light rays reflecting off of the inner surface 1082a produce a second reflection within the field of view of the image sensor.

Figure 10B:
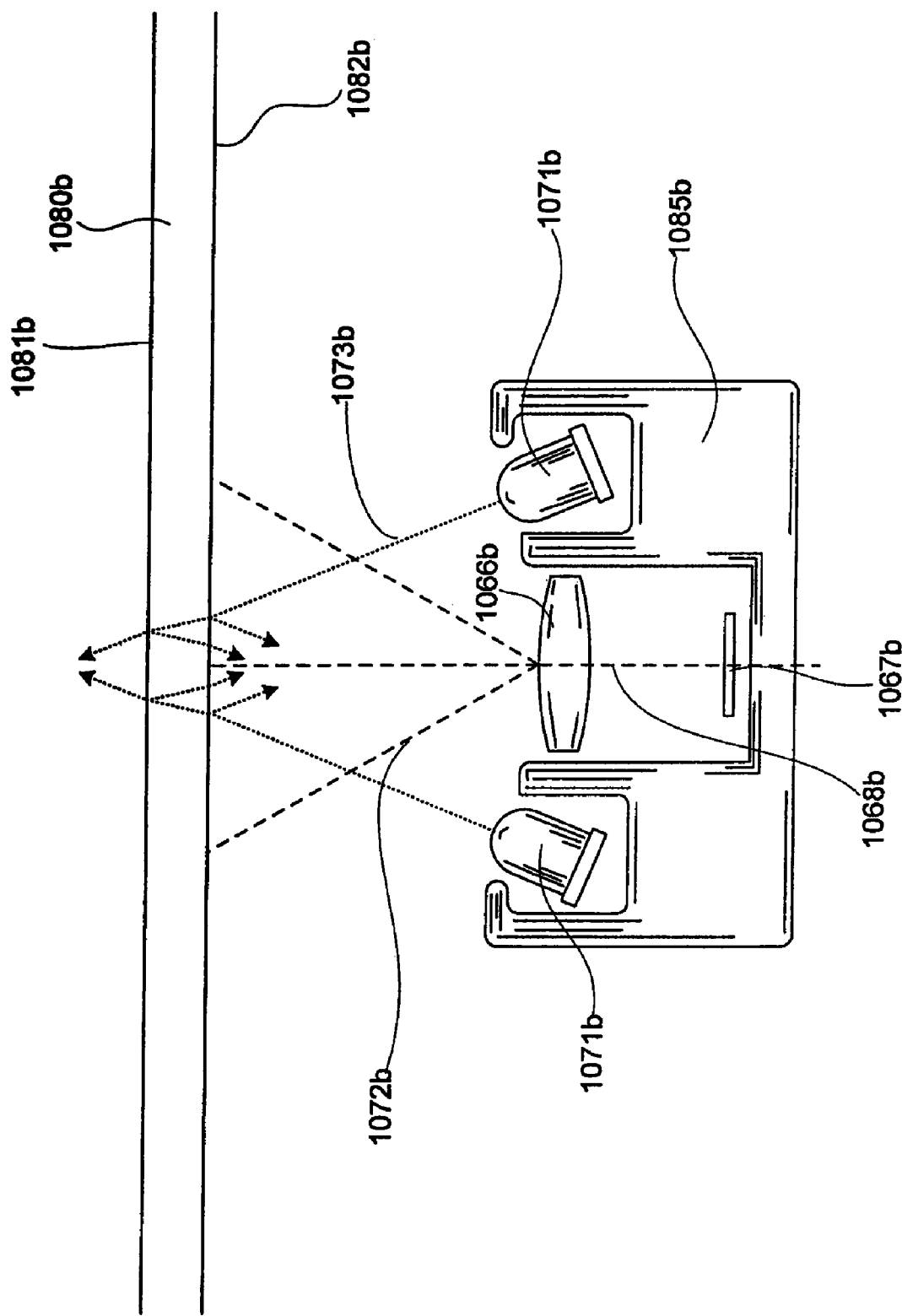
FIG. 10 depicts a profile view of an embodiment of a moisture sensor incorporated in a rearview mirror assembly.

FIG. 10b depicts a profile view of a moisture sensor 1085b proximate a piece of glass 1080b. The piece of glass comprises a first surface 1081b and a second surface 1082d. In at least one embodiment, the moisture sensor is comprises an optical system 1065b having at least one lens 1066b and at least one image sensor 1067b. In at least one embodiment, an optical axis 1068b of the optical system is substantially normal to the piece of glass. In at least one embodiment, a supplemental illumination assembly comprises at least two light sources 1071b.

Figure 10C:
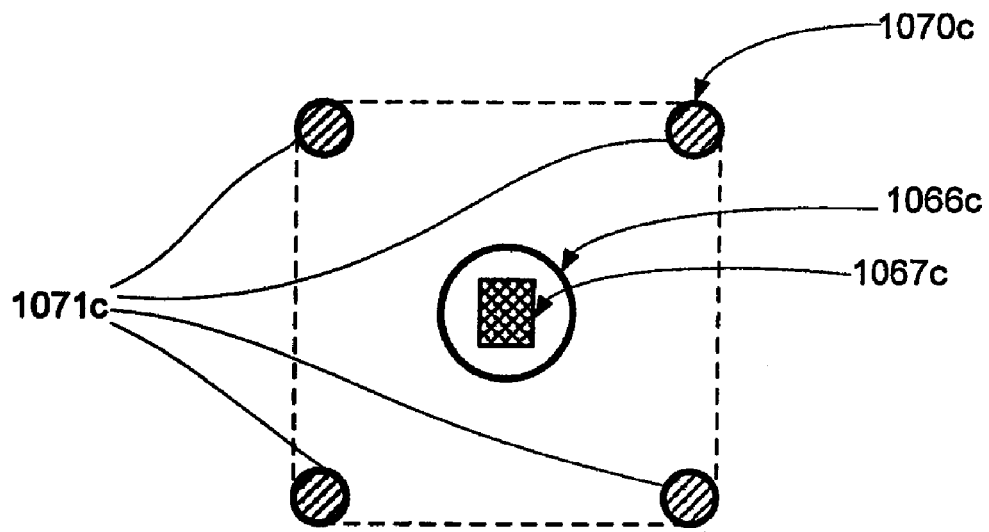
Figure 10D:
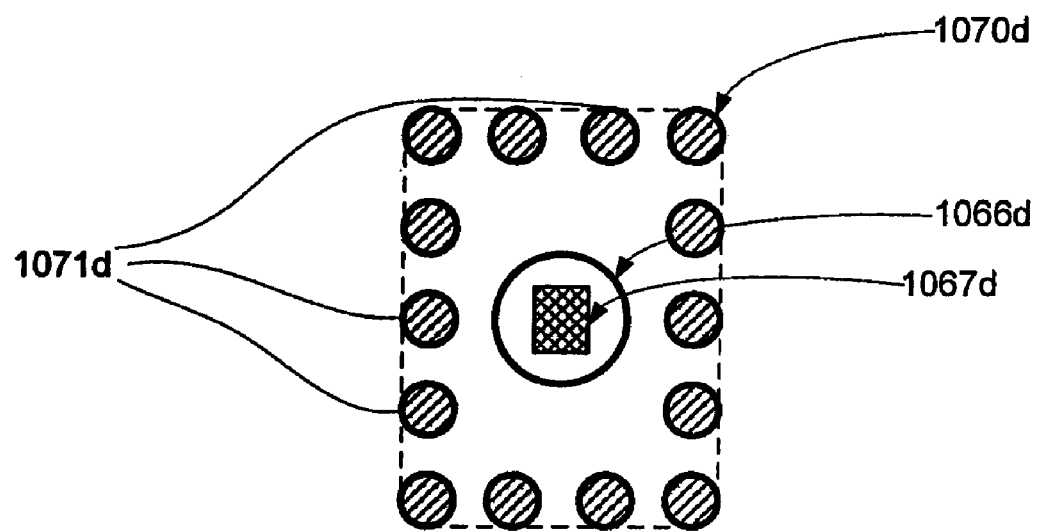

There are multiple configurations that may be used for the supplemental illumination system. A first configuration consists of a single light source flooding the windshield area of interest positioned in proximity of an optical system. The viewing area of windshield is dependent on the light source's angular tilt and the light source viewing angle. When the moisture is present in a typical shape and orientation with respect to the light source each moisture drop will reflect an image of the light source back to the image sensor. An alternate configuration of a supplemental illumination system consists of two light sources preferably placed on the same plane as each other and across from each other with respect to the image sensor. Both light sources flood the viewing area of interest which is dependent on each of the light source's angular tilt, viewing angle, and position with respect to each other. Each moisture drop has the potential to reflect two light source images when the moisture is a particular shape and orientation with respect to the light sources and optical system. With reference now to FIG. 10c, there is shown a plan view of an image sensor 1067c and a lens 1066c proximate a supplemental illumination assembly 1070c. In at least one embodiment, the supplemental illumination assembly comprises four light sources 1071c substantially defining the corners of a square with the image sensor and lens substantially in the center. In another alternate configuration, four light sources preferably positioned on the same plane as each other and flooding the windshield area of interest make up the supplemental illumination system. The orientation of the light sources preferably forms the corners of a square shape surrounding the image sensor. The resulting viewing area of the windshield is dependent on each of the light source's angular alignment and beam width or viewing area. This configuration causes each moisture drop to have the potential to reflect four light sources back to the image sensor and has the potential to produce more information about the shape of the moisture. As depicted in FIG. 10d, an image sensor 1067d and lens 1066d are positioned proximate a supplemental illumination assembly 1070d comprising fourteen light sources 1071d substantially defining a rectangle with the image sensor and lens substantially in the center. In yet another alternate configuration of the supplemental illumination system, there can be a "ring" of closely placed light sources surrounding the image sensor and preferably positioned on the same plane as each other. The viewing area of the windshield is dependent on each of light source's angular tilt and viewing angle. It is preferred that the shape of the ring of light sources reflect the shape of the image sensor (e.g. if the image sensor is square, the ring of light sources preferably defines a square shape).

This configuration has the potential to reflect substantially the entire outer shape of moisture drops present depending on the shape and orientation of the moisture with respect to the light sources. This configuration provides a representation of the shape of the moisture. In another embodiment, the supplemental illumination system could have a lens system that is composed of a light pipe or a plurality of light pipes.

In general, as the number of light sources increases, each moisture drop has a greater potential to reflect multiple light sources and has a greater potential to be detected with size and shape information. Further, more light sources create a more uniform illumination on the windshield detection area of interest. The supplemental illumination system may be positioned between the windshield and an optical system and outside of the field of view of the optical system. Alternatively, the supplemental illumination system may be positioned behind the optical system such that the optical system does not interfere with the projection of the light rays upon the area of the windshield of interest.

Figure 10E:
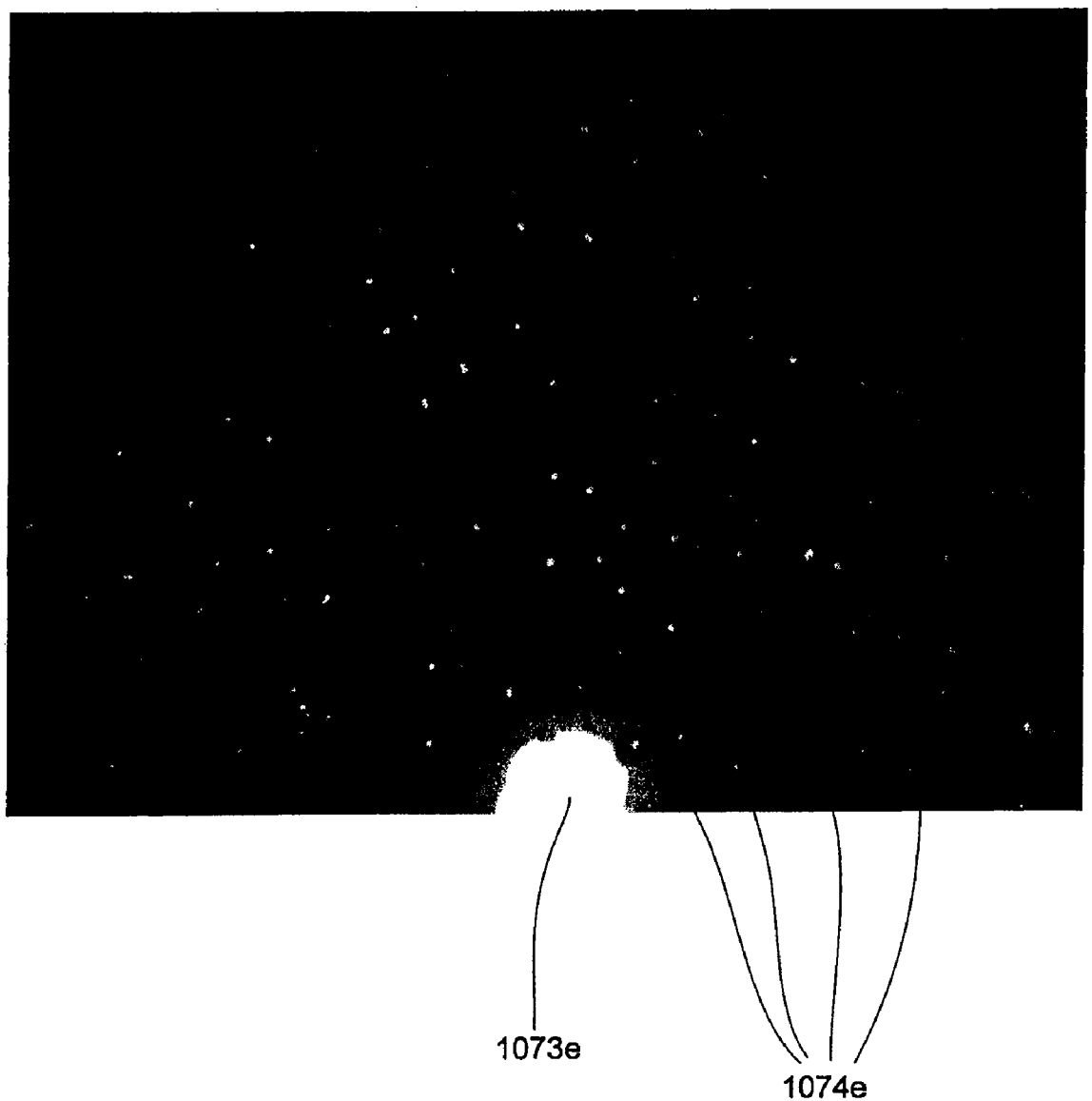

Turning to FIG. 10e, an image of a piece of glass with moisture 1074e upon a surface is depicted. The image was obtained via a moisture sensor in accordance with the present invention while an associated supplemental illumination assembly was activated. The reflection 1073e of a light source within the supplemental illumination assembly is present in the image. In a preferred embodiment, the moisture sensor is configured such that any reflections 1073e are outside the field of view of the image sensor. In embodiments where reflections 1073e are present in the images, associated moisture detection algorithms are configured to anticipate their presents. If light sources in any of the afore mentioned configurations are placed within the radius area of interest of the windshield, the image sensor will see an image of the light sources in the image. When an image of a light source is present in the image sensor it is preferably that this area of the image be ignored during moisture detection.

Figure 11A:
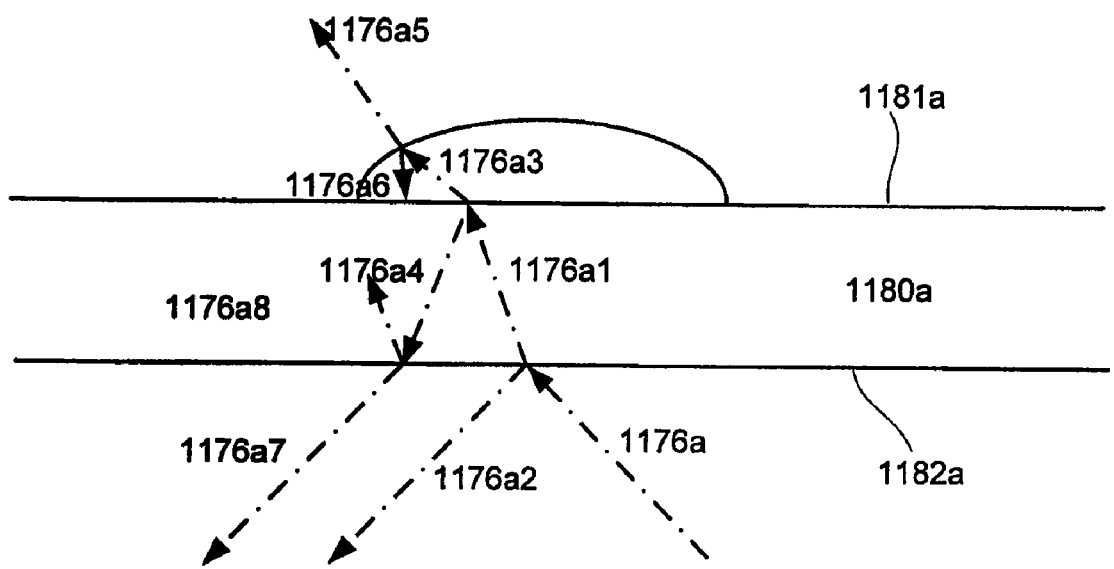
FIG. 11a depicts light ray tracings associated with a piece of substrate with a moisture drop present.
Figure 11B:
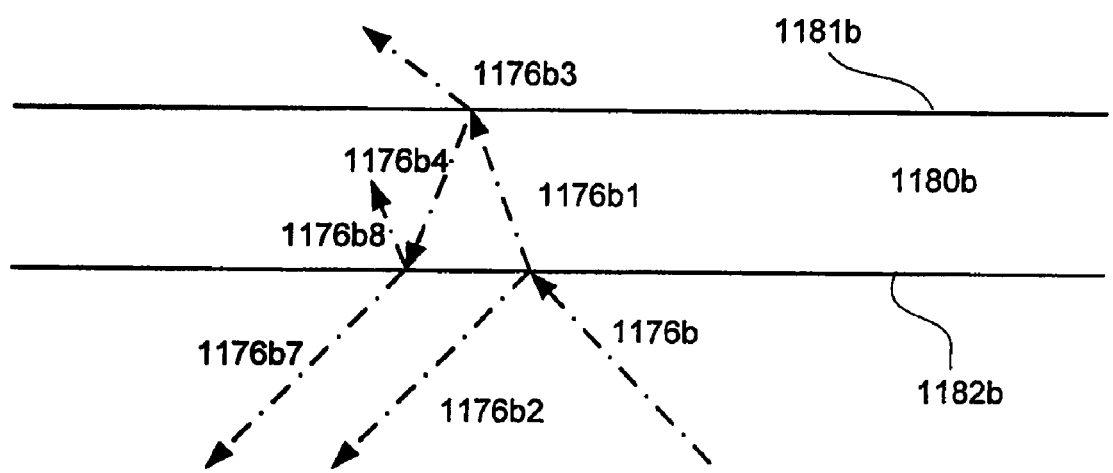
FIG. 11b depicts light ray tracings associated with a piece of substrate without a moisture drop present.

Turning to FIGS. 11a and 11b, one line light ray tracings are depicted to illustrate the effect of moisture on a surface opposite the first incident light ray 1176a, 1176b. It should be understood that the first incident light ray passes from air and incidence a piece of glass 1180a, 1180b. As depicted the glass comprises an outer surface 1181a, 1181b and an inner surface 1182a, 1182b. It should be understood that the glass may comprise additional materials "sandwiched" together as in automotive applications and that additional refraction and, or, reflection may occur depending on the indexes of refraction as described herein. Additionally, it should be understood that imperfections in the substrates will induce signal "noise", contaminants on a reflecting or refracting surface will also induce noise. In instances where it is desirable to detect the presents of moisture on an outer surface, it is herein recognized that reflections and refractions that occur prior to the light ray, or rays, impinging upon the outer surface and reflections and refractions that occur subsequent to the light ray, or rays, impinging upon the outer surface introduce opportunities for induction of noise. Corresponding surfaces may become more, or less, reflective/refractive dependent upon environmental factors such as dust, dirt or the like. Optical characteristics, such as transmissivity, absorption, etc., of various incorporated materials will change over time dependent upon a host of factors, such as sun light, temperature, cleaning agents, etc. Therefore, a general statement from a pure optical design perspective is that having related light sources and, or, light ray receivers optically coupled to the piece of glass such that a primary optical axis of the light sources and a primary optical axis of a receiver are configured such that the outer surface change in reflection/refraction will more accurately reflect the presence or absence of moisture. In at least one embodiment, an optic element may be integrally molded into the windshield such that a receiver, such as an image system, and, or, a light source may be optically coupled thereto with no air gap between the respective device and the outer surface. With further reference to FIGS. 11a and 11b the first incidence light rays 1176a, 1176b are not optically coupled to the glass, therefore, a first reflected ray 1176a2, 1176b2 and a first refracted ray 1176a1, 1176b1 may result depending on the incidence angle. Assuming the first refracted ray 1176a1, 1176b1 is greater than zero, a second reflected ray 1176a3, 1176b3 and a second reflected ray 1176a4, 1176b4 may result partially as a function of the absence or presence of moisture on the outer surface. As a general principal, the presence of moisture will result in the refracted portion 1176a3, 1176b3 increasing and the reflected portion 1176a4, 1176b4 will decrease. It should be appreciated that the presence of bugs, dirt, ice, etc. on the outer surface will impact the reflection/refraction characteristics. As can be seen, the surface of a drop of moisture in contact with air may result in third reflected ray 1176a6 and third reflected ray 1176a5. In at least one embodiment, a receiver is not optically coupled to the piece of glass, therefore, a fourth reflected ray 1176a8, 1176b8 and a fourth refracted ray 1176a7, 1176b7 may result. The signal-to-noise ratio of a moisture sensor may be improved by optically coupling a light source, a light ray receiver or both to the substrate on which moisture is to be detected.

Figure 12A:
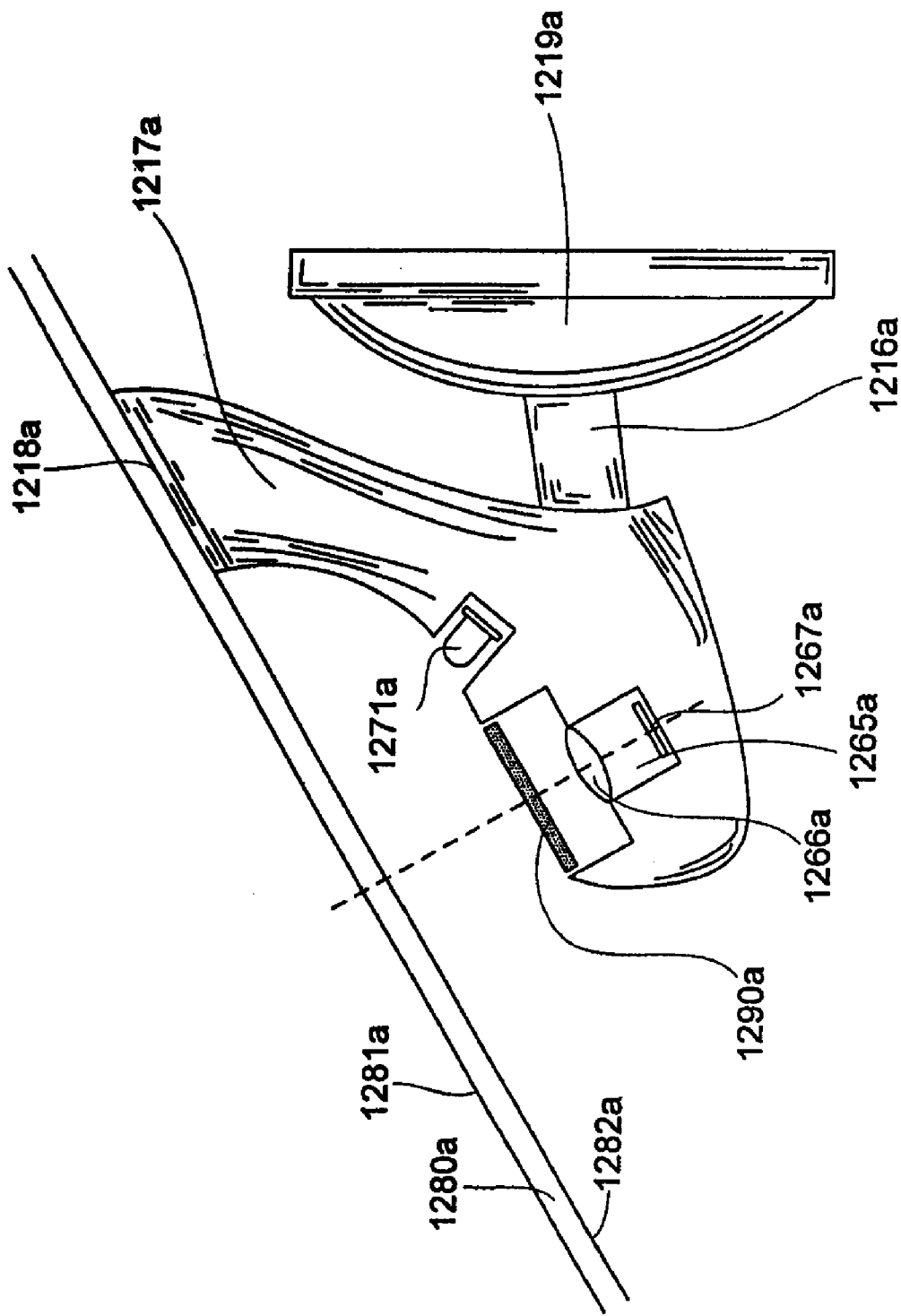
FIG. 12 depicts a profile view of an embodiment of a moisture sensor incorporated in a rearview mirror assembly.

Turning to FIG. 12a there is shown an embodiment of a moisture sensor incorporated into a rearview mirror assembly proximate a windshield 1280a having an outer surface 12801a and an inner surface 1282a. As can be appreciated, the moisture sensor may be structurally configured partially or completely removed from the rearview mirror. In at least one embodiment, the moisture sensor is carried upon a support structure 1217a along with a stem 1216a pivotally attached to a rearview mirror 1218a. The support structure is attached to the windshield via a mount 1218a. In at least one embodiment, the moisture sensor comprises an optical system 1265a having a lens 1266a and an image sensor 1267a, a supplemental illumination assembly comprising at least one light source 1271a and a detection screen 1290a. In at least one embodiment, a detection screen is positioned about 52 mm from windshield and parallel to windshield between image sensor and the area of interest of the windshield. The detection screen may be sized to be 40 mm by 49 mm. It is desirable to have the detection screen size to have a similar geometric size ratio to the image sensor in order for the image sensor to be able to image the entire detection screen. The detection screen size, at least in part, determines the detection area on windshield. The larger the detection screen, the larger the detection area on the windshield. It is desirable for the detection screen to have a diffuse surface and function similar to a rear projection screen. The diffuse surface of the detection screen allows the image sensor to see substantially the entire reflection of the illumination system. The detection screen material may be glass, molded acrylic, or other clear plastics. Using molded acrylic and other clear plastics reduces system cost. In an alternate configuration, the detection screen functions as a visible-cut filter allowing only near-infrared light waves to pass through it while filtering out all other unwanted light noise. In this case, a near-infrared light source that is able to pass through the detection screen is used in the illumination system.

In a preferred embodiment, the light source(s) is(are) positioned proximate an edge of the detection screen, slightly tilted by about 10° from normal to the windshield and toward the detection screen such that light rays reflecting off of the windshield impinge upon the detection screen. Having the light source positioned proximate an edge of the detection screen reduces the total mechanical size of the system. Multiple light sources will cover a larger windshield detection area. When more than one light source is used the light sources should be positioned such that when all light sources are emitting, the windshield area of detection is illuminated as uniformly as possible (minimize "hot spots"). To distribute the light uniformly over all viewing angles of the detection screen, the detection screen could utilize a Lambertian diffuser. An edge detection scheme may be used to detect moisture appearing in the images making use of spatial frequency composition analysis techniques.

Figure 12B:
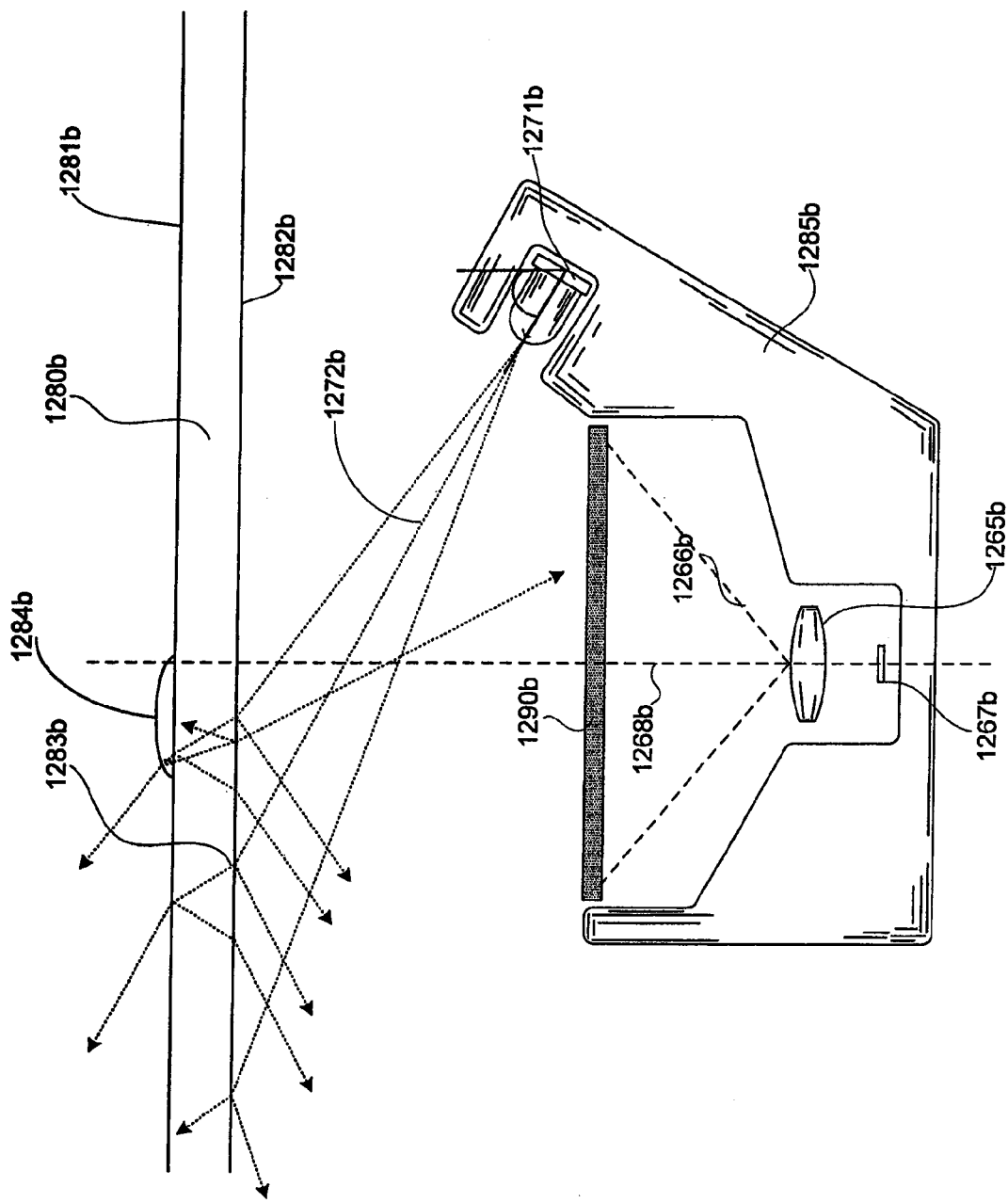
Figure 12C:
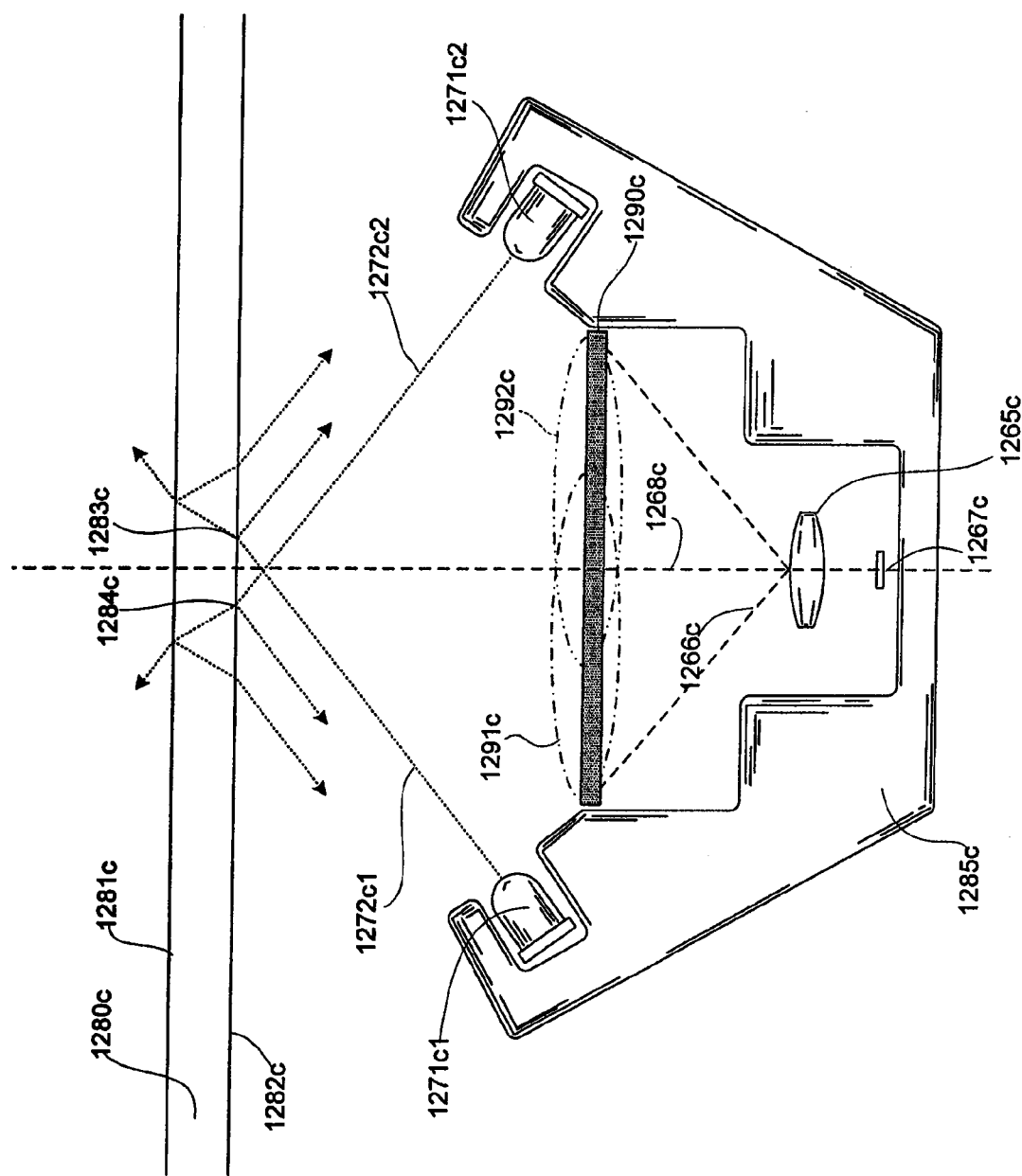

Turning now to FIG. 12b, an embodiment of a moisture sensor 1285b is depicted proximate a substrate 1280b having an outer surface 1281b and an inner surface 1282b. The moisture sensor comprises an optical system 1265b having a lens 1266b, an image sensor 1267b, a primary optical axis 1268b and a detection screen 1290b. In at least one embodiment, a light source 1271b of a supplemental illumination assembly is configured such that substantially all light rays 1272b will reflect off the inner surface at 1283b and not impinge upon the detection screen 1290b. The presence of moisture will result in an increase in light rays impinging upon the detection screen and, thereby, being detectable by the image sensor. In at least one embodiment as depicted in FIGS. 12b and 12c, the light sources are preferably positioned proximate the edge of the detection screen and tilted from normal to the windshield toward the detection screen such that substantially all light reflecting off of the windshield avoids impingement upon the detection screen. By keeping the light sources positioned proximate the edge of the detection screen the total mechanical size of the system is reduced. At least one supplemental illumination system may turn each light source on at the same time. When this is the case it is preferably that the light source's light ray reflection substantially fully avoids the detection screen. Another supplemental illumination system as shown in FIG. 12c turns the light sources on one at a time. When the light sources are positioned such that each light source illuminates a different section of the area of interest of the windshield the only area of the detection screen associated with the area of interest of the windshield is viewed. This eliminates the need to have the light source's light ray reflection fully avoid the detection screen. The presence of moisture will result in an increase in light rays impinging upon the detection screen at 1291c when 1271c1 is turned on and 1292c when 1271c2 is turned on, thereby, being detectable by the image sensor.

With reference now to FIG. 12d, an embodiment of a moisture sensor 1285d is depicted proximate a substrate 1280d having an outer surface 1281d and an inner surface 1282d. The moisture sensor comprises an optical system 1265d having a lens 1266d, an image sensor 1267d, a primary optical axis 1268d and a detection screen 1290d. In at least one embodiment, at least three light sources 1271d1, 1271d2, 1271d3 of a supplemental illumination assembly is configured such that substantially all light rays 1272d1, 1272d2, 1272d3 reflected off the inner surface at 1292d, 1293d, 1294d and not substantially impinge upon the detection screen 1290d. The presence of moisture will result in an increase in light rays impinging upon the detection screen, thereby, being detectable by the image sensor. This configuration increases the detection area on substrate 1280d. In at least one embodiment, the detection area does not have to be directly above the detection screen, but can be offset slightly. Each light source in FIG. 12d should be turned on separately. As shown in FIG.

12*d*, each light source represents its own detection area. In another embodiment, the detection areas can have overlap.

In at least one embodiment, the light source position is configured to have the light sources placed in a row with the first light source positioned next to the detection screen and the remaining light sources extending away from the detection screen as shown in FIG. 12*d*. These configurations have the potential to increase the detection area on the windshield without increasing the mechanical size of the detection screen. The viewing area of interest of the windshield is not necessarily directly above the detection screen.

Figure 12E:
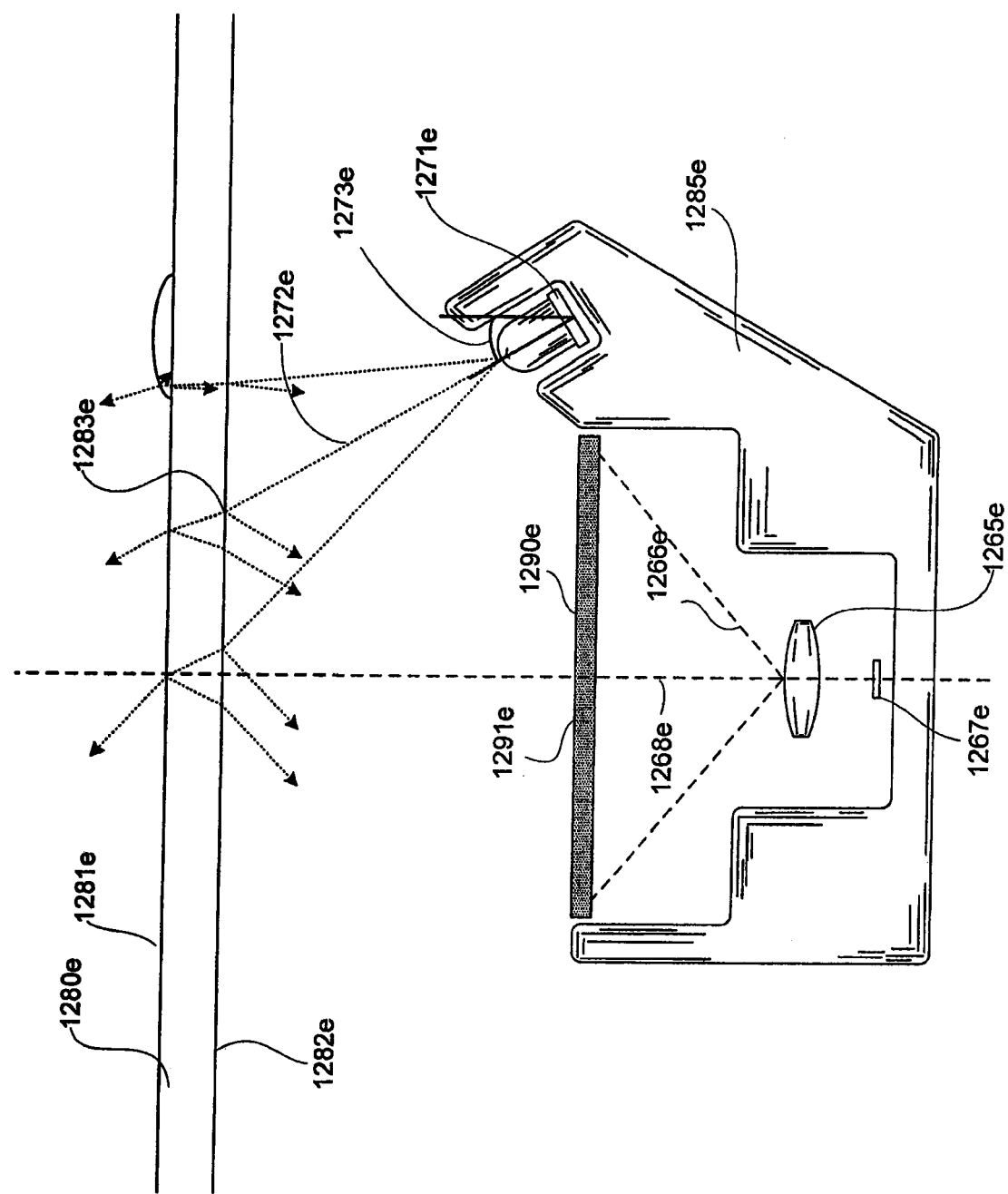
Figure 13:
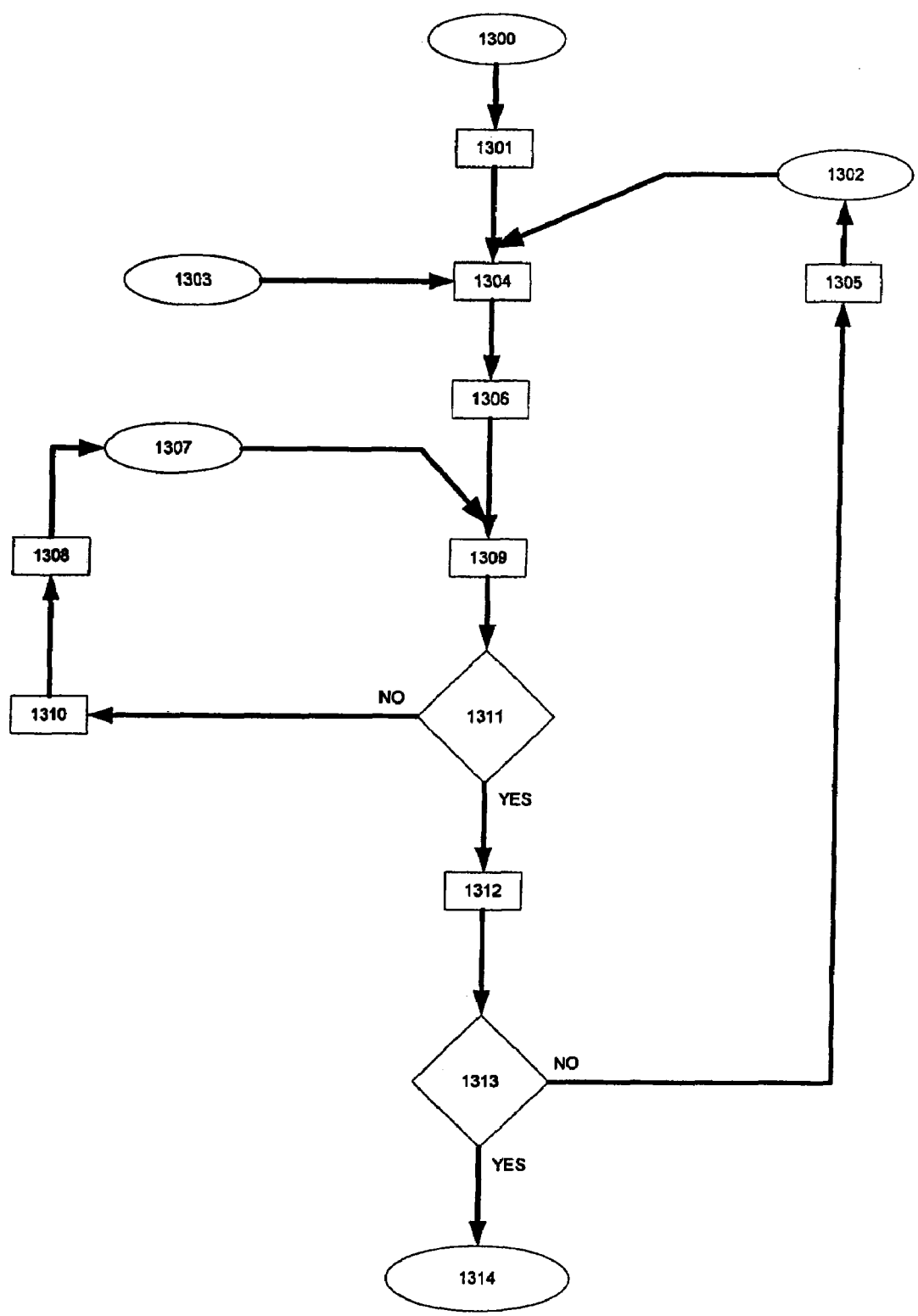
FIG. 13 depicts a flow diagram for an embodiment of a moisture sensor.
Figure 14:
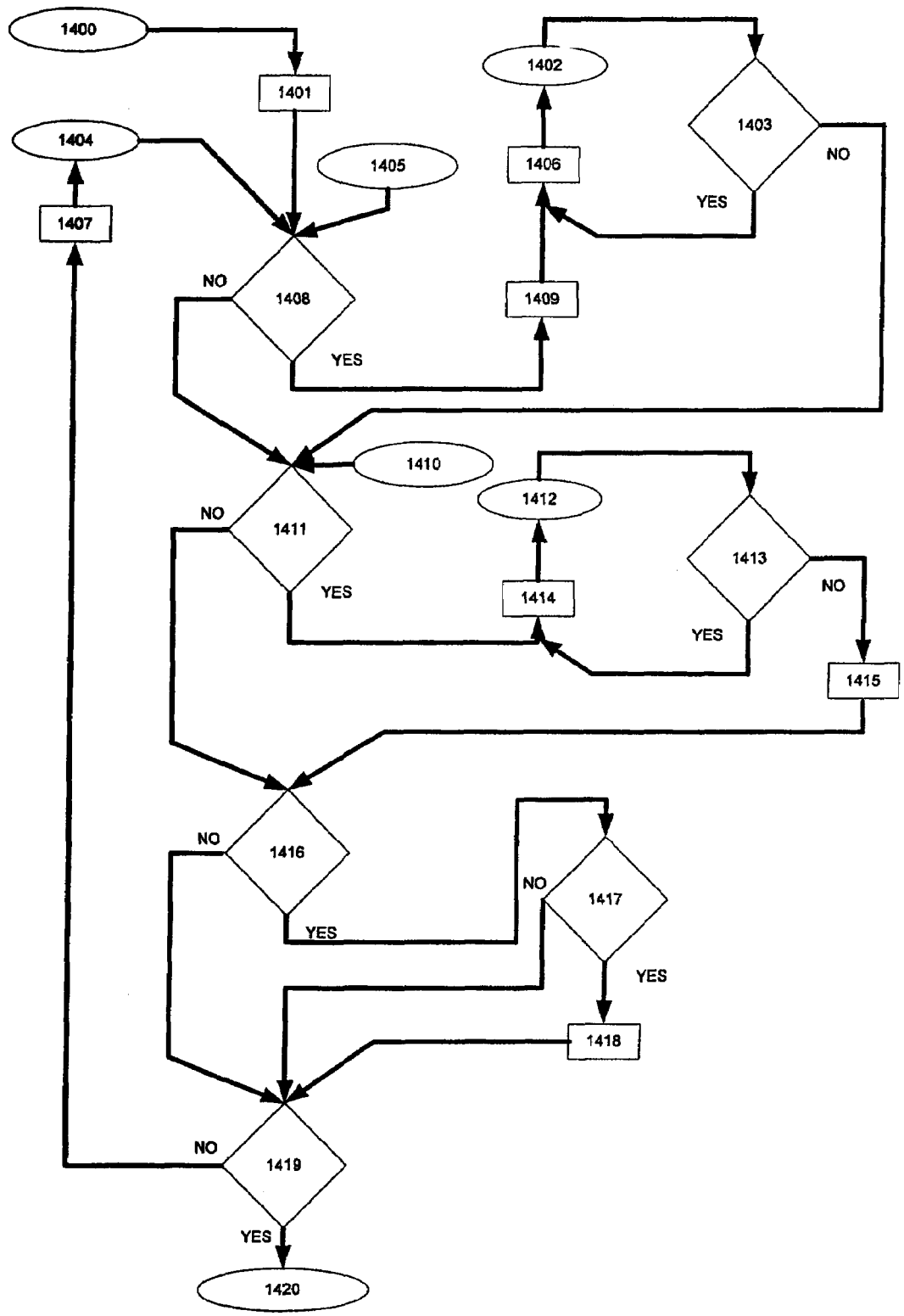
FIG. 14 depicts a flow diagram for an embodiment of a moisture sensor.

Turning to FIG. 12*e* an embodiment of a moisture sensor 1285*e* is depicted proximate a substrate 1280*e* having an outer surface 1281*e* and an inner surface 1282*e*. The moisture sensor comprises an optical system 1265*e* having a lens 1266*e*, an image sensor 1267*e*, a primary optical axis 1268*e* and a detection screen 1290*e*. In at least one embodiment, a first light source 1271*e*1 and a second light source 1271*e*2 of a supplemental illumination assembly is configured such that substantially all light rays 1272*e*1, 1272*e*2 reflected off the inner surface at 1283*e*, 1284*e* will impinge upon the detection screen 1290*e*. *The presence of moisture will result in a decrease of light rays impinging upon the detection screen below the position of where the moisture is present on the windshield resulting in a dark spot on the detection screen in the shape of the moisture, thereby, being detectable by the image sensor.*

In at least one embodiment, the supplemental illumination system comprises a surface and at least one light source. The supplemental illumination system preferably comprises a uniformly illuminated surface. The surface may be a diffuse surface creating uniform illumination. An alternate surface may be a Piano-convex lens. A lens aids in the overall efficiency of the system. The size of the supplemental illumination system, in part, defines the size of the detection area of the windshield. The supplemental illumination systems total size may be approximately 30 mm×40 mm creating approximately a square inch of effective windshield detection area.

In at least on embodiment, a moisture sensor with supplemental illumination that is not optically coupled with the windshield can operate as an internal windshield surface fog detector by comparing an image of the inside of the windshield with the supplemental illumination turned on with an image of the inside of the windshield with the supplemental illumination turned off. If there is internal fog, the entire viewing area of the supplemental illumination will act as a diffuse reflective surface causing the image sensor to image an illuminated diffuse area corresponding to the viewing area of the supplemental illumination.

In at least one embodiment, a moisture detection algorithm includes at least a portion of the steps as depicted in FIGS. 13, 14, 15, 16*a* and 16*b*. When a supplemental illumination system is included it is preferably to acquire an image with the associated light sources de-energized followed by an image with the associated light sources energized. The image associated with the de-energized light sources is subtracted from the image with the light sources energized. The resulting image is then utilized for moisture detection. It should be understood that a single image, with or without, supplemental illumination may be utilized for moisture detection.

In at least one embodiment, a supplemental illumination system comprising means for emitting six narrow stripes of light rays is employed as shown in FIGS. 6*a*, 6*b*, and 6*c*. It should be understood that more or less numbers of stripes may be incorporated, for example, either eight or four.

In at least one embodiment, each narrow light stripe is configured such that the associated reflection off of the windshield impinges upon an image sensor within a group of pixels three rows by one hundred forty-four columns. It should be understood that a moisture detection system may be configured such that the reflections impinge upon more or less rows and, or, columns of pixels.

Once the image to be analyzed is obtained, it is preferably to filter the image. For example, the filter coefficients may be −5, 0, and 5. The coefficients add to zero, causing a filtered image row with no rain drops to be zero. With a negative filter coefficient as the first coefficient, when moisture is present the filtered image row will comprise a negative dip at the first edge of each moisture drop (i.e. a zero crossing) and a positive peak at the second edge. In at least one embodiment, a center row is filtered by convolving a single dimension mask. The filter mask preferably results in a negative slope in the reflection appearing as a negative dip while positive slopes in the reflection appear as positive peaks. A single image row is input at step 1300. An initial pixel row value is set as the current pixel value at step 1301. The desired filter coefficients are input at step 1303. The current pixel value is filtered using the current filter coefficient value at step 1304. The current filtered data value is initially set to zero at step 1306. The current filtered data value is updated at step 1309 by multiplying the current pixel value by the current filter coefficient value and adding the result to the current filtered data value. The next filter coefficient value is set to the current filter coefficient value at step 1310 and the next image pixel row value is set to the current pixel value at step 1308 and the subroutine is continued at 1307 until each filter coefficient is used at step 1311. The next filtered pixel data value output is set to the current filtered data value at step 1312. The current pixel value is set to the next image pixel row value at step 1305 and a subroutine is reentered at step 1302 until each image pixel row value is filtered at step 1313. Once each image pixel row value is filtered the filtered pixel data is output at step 1314. In at least one embodiment, it is preferable to perform row filtering on at least two rows associated with each reflection.

Once a row has been filtered moisture is detected by searching the filtered row for negative dips below a defined threshold and positive peaks above a defined threshold. A moisture drop is detected when a negative dip is followed by a positive peak. The size of the drop corresponds to the distance in pixels between the negative dip and the positive peak. The location of the drop is associated with the positive peak. The filtered pixel data is input at step 1400. The current filtered value count is initially set to zero at step 1401 with the first filtered value. The desired negative threshold value is input at step 1405. When the current filtered value is less than the negative threshold at step 1408 a subroutine is entered at step 1409 with variable pntn equal to the current filtered value count. The next filtered value is set to the current pixel value count plus one at step 1406. This subroutine is continued at step 1402 as long as the current filtered value is less than the negative threshold at step 1403. When the current filtered value is not less than the negative threshold at step 1480 a positive threshold value is input at step 1410. When the current filtered value is greater than the positive threshold value at step 1411 a subroutine is entered at step 1414 with the next filtered value equal to the current pixel value count plus 1. The subroutine is continued at step 1412 as long as the current filtered value is greater than the positive threshold at step 1413. When the current filtered value is not greater than the positive threshold at step 1413, variable pntp is equal to the current filtered value count and the algorithm proceeds to step 1416. When variable pntp and variable pntn are greater than zero the algorithm proceeds to step 1417. When pntn is less than pntn at step 1417 the algorithm proceeds to step 1418 a moisture drop is detected and the size is equal to pntn minus pntp, the location is equal to pntn. The algorithm then proceeds to step 1419 and checks to determine if all filtered values have been analyzed, if not the algorithm loops back to step 1407. When all filtered values have been analyzed the algorithm proceeds to step 1420 and the pre-comparison drop list is complete. In at least one embodiment, a second row of pixels association with a given reflection is then similarly analyzed.

Figure 15:
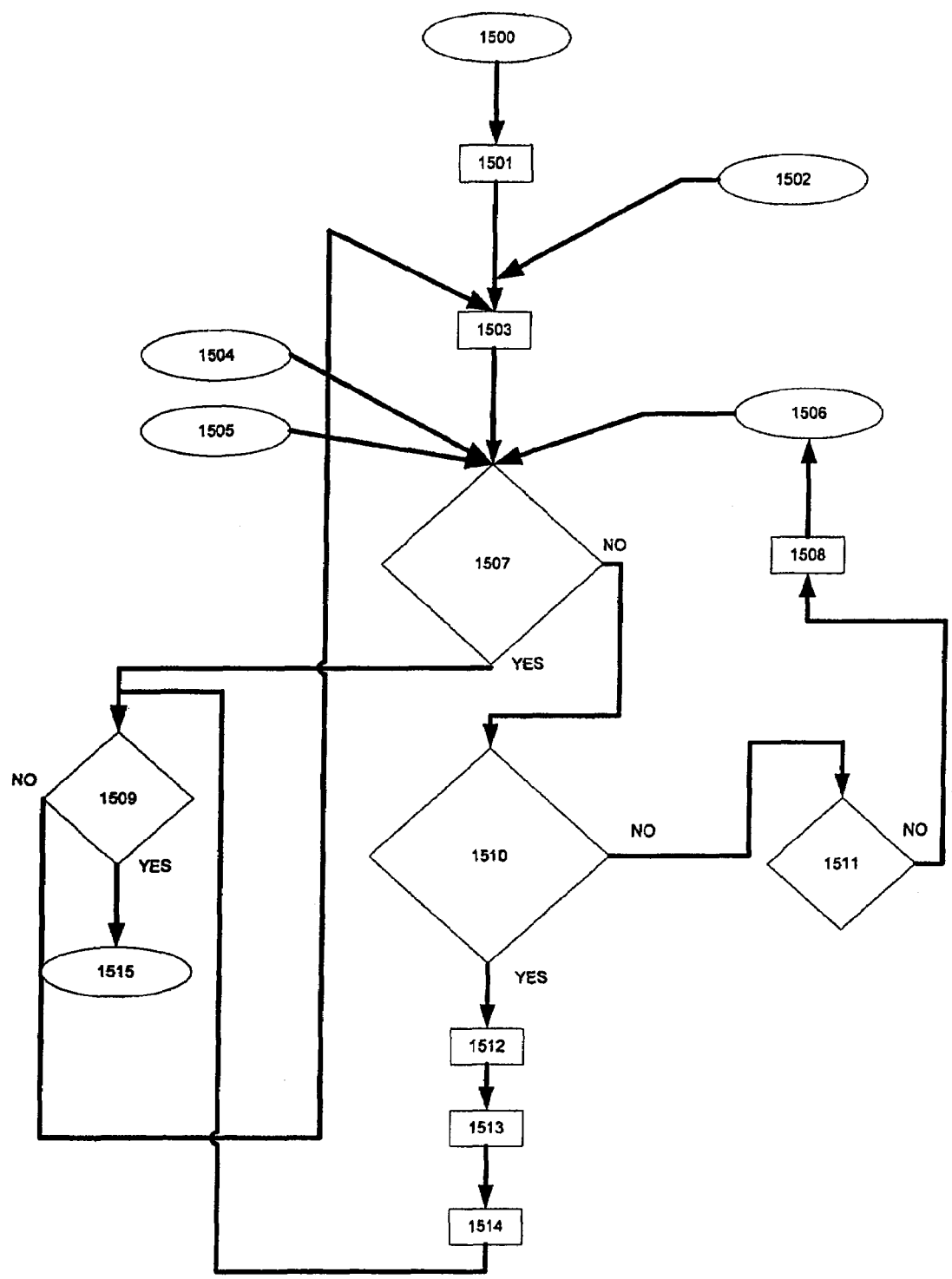
FIG. 15 depicts a flow diagram for an embodiment of a moisture sensor.

A row comparison detection algorithm as depicted in FIG. 15 compares two adjacent rows in a reflection image. If drops from both drop lists are comparable (i.e. within user defined location and, or, size tolerance) the drop is validated and its size and, or, location is recorded. This step in part, tries to eliminate spatial and temporal noise in the associated detection image. For efficiency, in at least one embodiment the function stops searching the second drop list if the location of the second drop list does not fall within tolerance of drop location 1. In at least one embodiment, the location tolerance is +/−2 and the size tolerance is +/−3. In at least one embodiment, the drop is preferably found in both row analyses before being determined to be a valid entry. In step 1500 the pre-comparison drop list 1 is input. At step 1501 the first drop size value is initially set to the drop size 1 and the first drop location value is initially set to the drop location 1. The pre-comparison drop list 2 is input at step 1502. At step 1503 the first drop size value is set to drop size 2 and the first drop location is set to drop location 2. The location tolerance is input at step 1504 and the size tolerance is input at step 1505. If the drop location 2 minus the location tolerance is greater than drop location 1 at step 1507 the algorithm proceeds to step 1509, if not the algorithm proceeds to step 1510. If the drop size 2 is within the size tolerance of drop size 1 and drop location 2 is within the location tolerance of drop location 1 at step 1510 the algorithm proceeds to step 1512, if not the algorithm proceeds to step 1511. If the entire pre-comparison drop list 2 has not been analyzed at step 1511 the algorithm proceeds to step 1508 where the next drop size value is set to drop size 2 and the next drop location value is set to drop location 2 prior to proceeding to a subroutine continuation step 1906. When the algorithm proceeds to step 1512 a one is added to the pre-valid drops and the algorithm proceeds to step 1513 where the pre-valid drop list size byte is set equal the drop size 1. The algorithm proceeds from step 1513 to step 1514 where the pre-valid drop list location byte is set equal to drop location 1. Once the algorithm proceeds to step 1509 a check is performed to see if the entire pre-comparison drop list 1 has been analyzed, if not the algorithm returns to step 1503. If the entire pre-comparison drop list 1 has been analyzed the pre-valid drop list is output at step 1515.

Figure 16A:
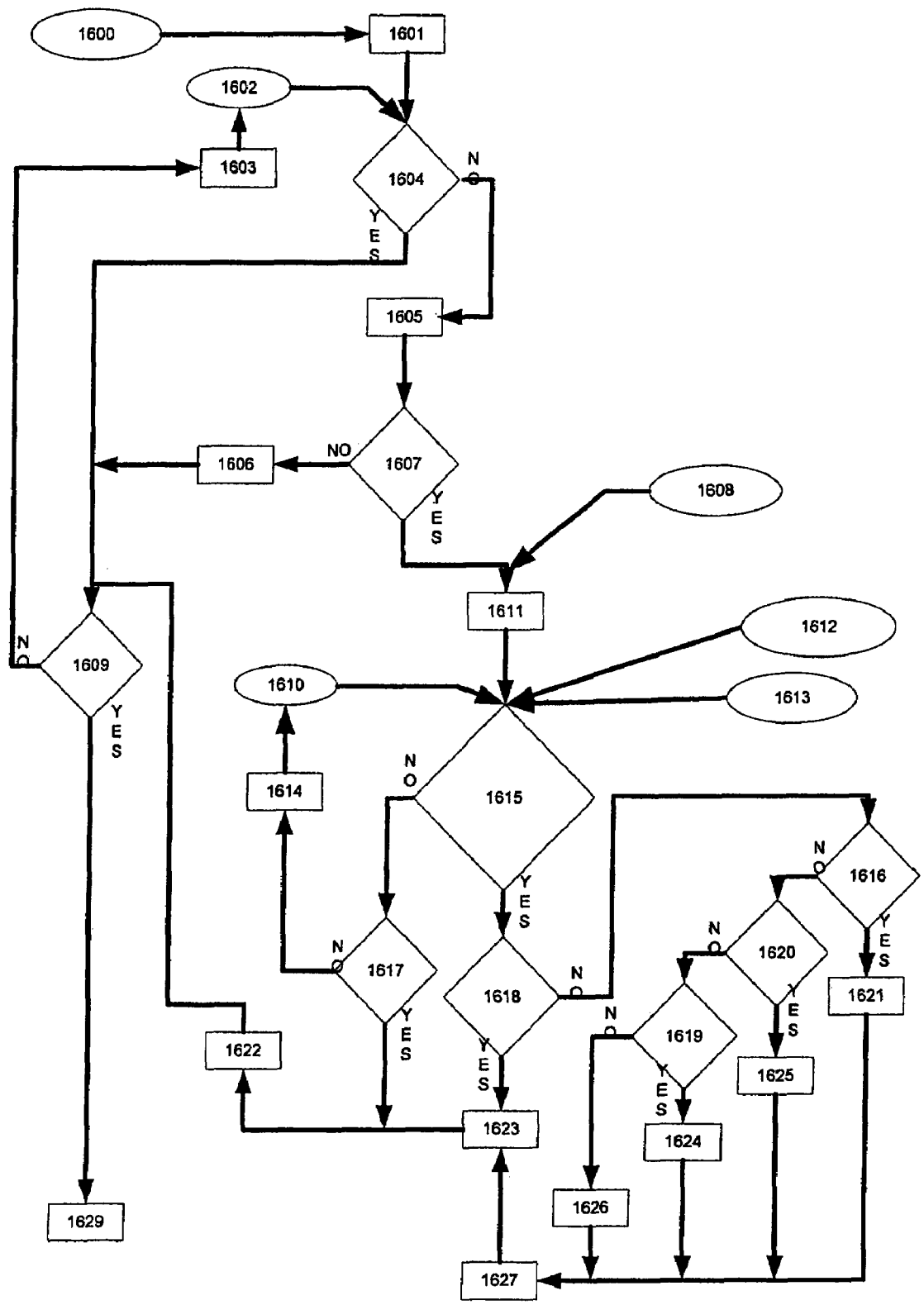
FIG. 16a depicts a flow diagram for an embodiment of a moisture sensor.
Figure 16B:
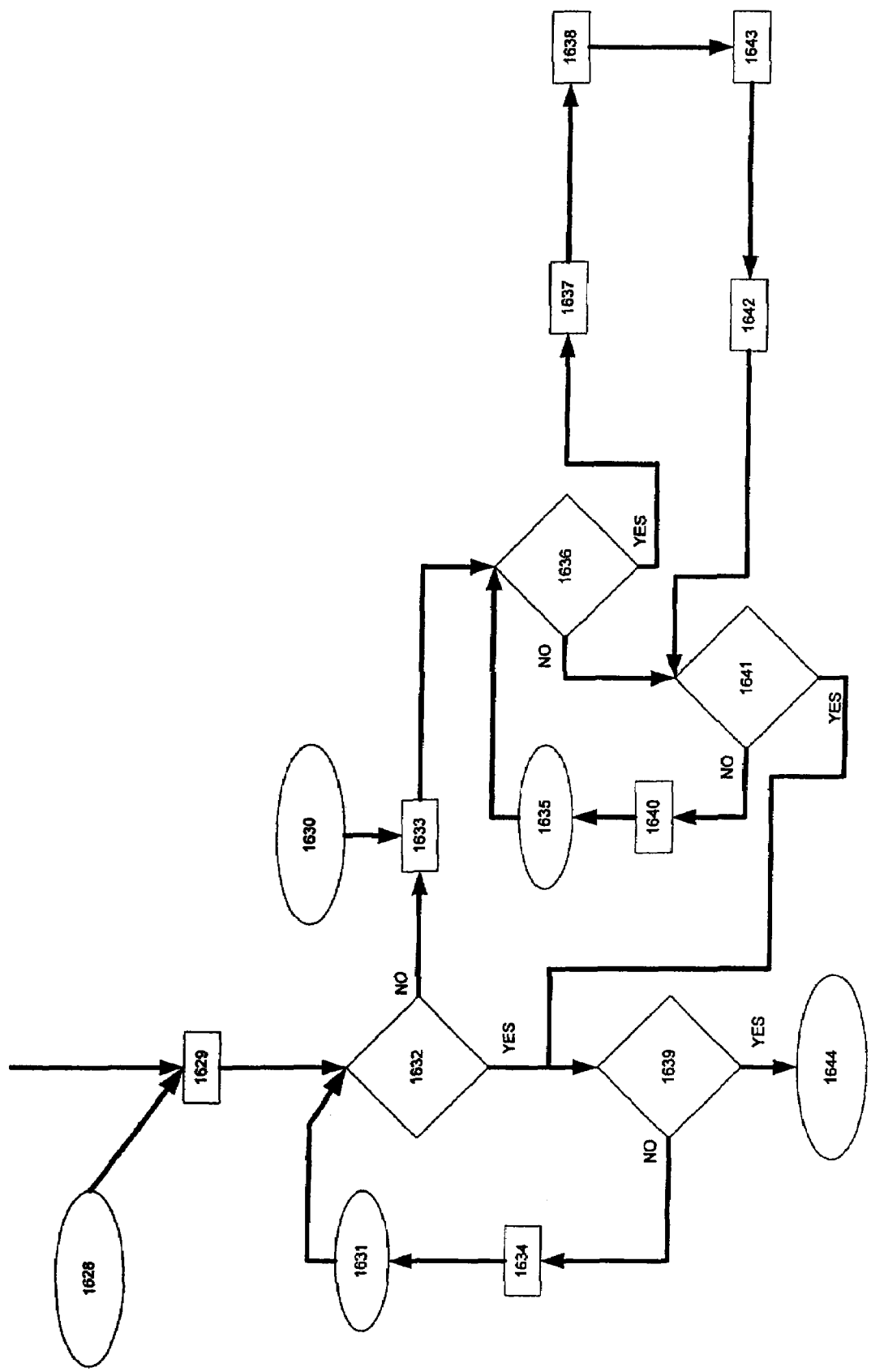
FIG. 16b depicts a flow diagram for an embodiment of a moisture sensor.

As depicted in FIGS. 16*a* and 16*b*, a drop history buffer is input at step 1600. A first history byte is set equal to the current history value at step 1601. A check is made at step 1604 to determine if the current history value is equal to zero, if not the algorithm proceeds to step 1605. When the current history value is equal to zero at step 1604 the algorithm proceeds to step 1609. A check is made at step 1609 to determine whether the entire history buffer has been analyzed, if not the algorithm proceeds to step 1603 where the next history byte is set to the current history buffer value and the algorithm continues through step 1602 back to step 1604. When the algorithm proceeds to step 1605 the history size byte is set to the current size value, the history location byte is set to the current location value and the history miss counter byte is set to the current miss value before proceeding to step 1607. At step 1607 a check is made to see whether the miss value is less than or equal to 10, if not the algorithm proceeds to step 1606 and the current history value is set to zero and the history byte is set to the current history value before returning to step 1609. If the current miss value is less than or equal to 10 at step 1607 a pre-valid drop list is input at step 1608 and the algorithm proceeds to step 1611. At step 1611 a first pre-valid drop list size byte is set to the current detected size and a first pre-valid drop list location byte is set to the current detected location. A history size tolerance is input at step 1612 and a history location tolerance is input at step 1613 before the algorithm proceeds to step 1615. At step 1615 a check is made to determine if the current detected size and current detected location fit within the history size tolerance and the history location tolerance, if not the algorithm proceeds to step 1617. At step 1617 a check is performed to determine if all current detected drops have been analyzed, if not the algorithm proceeds to step 1614 where the next current drop information is used to set the detected size byte to the current detected size and the detected location byte is set to the current detected location before continuing through step 1610 and returning to step 1615. If the current detected size and current detected location fit within the history size tolerance and history location tolerance at step 1615 the algorithm proceeds to step 1618. If it is, the current history valve is eliminated from the drop list and is ignored from now on. This in part, eliminates foreign objects (objects stuck to windshield) from being classified as valid moisture drops once it has been established that they have been present for a substantial period of time. At step 1618 a check is made to determine if the current history value is greater than 40, if not the algorithm proceeds to step 1616. At step 1616 a check is made to determine if the current detected size is small, if so a one is added to the total valid drops at step 1621 before the algorithm proceeds to step 1627. If the current detected size is not small at step 1616 the algorithm proceeds to step 1620. At step 1620 a check is made to determine if the current detected size is medium, if so a one is added to the total valid drops at step 1625 before the algorithm proceeds to step 1627. If the current detected size is not medium at step 1620 the algorithm proceeds to step 1619. At step 1619 a check is made to determine if the current detected size is large, if so a two is added to the total valid drops before proceeding to step 1627. If the current detected size is not large at step 1619 the algorithm proceeds to step 1626 where a three is added to the total valid drops prior to proceeding to step 1627. At step 1627 a one is added to the current history value and the history byte is set to the current history value before proceeding to step 1623. Once the algorithm proceeds to step 1623 the current miss value is set to zero and the missed byte is set to the current missed value before proceeding to step 1622. At step 1622 the current detection size is set equal to zero and the new pre-valid drop list size byte is set to the current detection size before proceeding back to step 1609. If the entire history buffer has been analyzed at step 1609 a new pre-valid drop list is input at step 1628 and the algorithm proceeds to step 1629.

It should be understood that the above detail description is not intending to be in any way limiting of the scope of protection afforded by the appending claims. Each claim and claim limitation shall be construed to include all equivalent structures and functions.

What is claimed is:

1. An apparatus, comprising:
 a target generating means for projecting a predetermined pattern of illumination toward a substantially transparent substrate comprising an interior surface and an exterior surface;

an optical sensing means comprising a first lens and an image sensor having a primary optical axis that is optically aligned with said first lens, such that said optical sensing means is configured to detect reflection of said illumination of said target generating means from said interior surface and to detect reflection of said illumination of said target generating means from said exterior surface such that said interior reflection is separate from said exterior reflection to detect moisture on at least one of said exterior surface and said interior surface based upon said detected reflection and said predetermined pattern of illumination of said target generating means;

a transparent diffuse surface configured to allow said optical sensing means to obtain information about ambient light that has first transmitted through said interior and exterior surfaces of said substantially transparent substrate; and a means for analyzing said interior and said exterior reflection to detect a presence of moisture on at least one surface of said substantially transparent substrate based upon said illumination of said target generating means that is reflected from said interior and exterior surfaces, respectively, and received by said optical sensing means, and said obtained information about ambient light.

2. An apparatus as in claim 1 wherein said target generating means projects a series of lines.

3. An apparatus as in claim 1 wherein said optical sensing means comprises a single row of light sensors.

4. An apparatus as in claim 1 further comprising a means for analyzing at least said exterior reflection to detect a presence of moisture on said exterior surface.

5. An apparatus as in claim 1 further comprising a means for analyzing at least said interior reflection to detect a presence of moisture on said interior surface.

6. An apparatus as in claim 1 further comprising a means for analyzing said exterior reflection to detect an absence of at least a portion of said exterior reflection, wherein an absence of at least a portion of said exterior reflection is indicative of the presence of moisture on said exterior surface.

7. An apparatus as in claim 1 further comprising a detection screen positioned between said optical sensing means and said substantially transparent substrate.

8. An apparatus as in claim 1 further comprising a controller configured to control at least one vehicle equipment.

9. An apparatus as in claim 1 comprising only one optical sensing means configured to receive illumination of said target generating means reflected by both said internal and external surfaces.

* * * * *

UNITED STATES PATENT AND TRADEMARK OFFICE
CERTIFICATE OF CORRECTION

PATENT NO. : 7,718,943 B2
APPLICATION NO. : 11/239191
DATED : May 18, 2010
INVENTOR(S) : Ryan D. Johnson, Joseph S. Stam and Jon H. Bechtel It is certified that error appears in the above-identified patent and that said Letters Patent is hereby corrected as shown below:

Column 1
Line 17, "presents" should be --presence--.

Line 26, "presents" should be --presence--.

Line 61, "presents" should be --presence--.

Column 2
Line 7, "DETAIL" should be --DETAILED--.

Line 15, After "scene" insert --in a--.

Line 27, "break" should be --brake--.

Lines 36 and 37, "functionality. Such" should be --functionality, such--.

Line 40, "bi-xenon, headlights" should be --bi-xenon headlight--.

Column 3
Line 28, "is" should be --and are--.

Column 4
Line 12, "(LEDS)" should be --(LEDs)--.

Line 59, "lose" should be --loss--.

Column 5
Line 17, Delete "to".

Line 28, Delete "to".

Signed and Sealed this

Fourteenth Day of December, 2010

David J. Kappos
*Director of the United States Patent and Trademark Office*

Column 5
Line 29, "presents" should be --presence--.

Column 6
Line 41, "418a" should be --419a--.

Line 50, "498aof" should be --499a of--.

Line 64, "is" should be --and are--.

Column 7
Line 5, "outside windshield" should be --outside the windshield--.

Line 6, "above optics" should be --above the optics--.

Line 42, "is" should be --and are--.

Line 50, "outside windshield" should be --outside the windshield--.

Line 51, "above optics" should be --above the optics--.

Line 66, "with angle" should be --with an angle--.

Column 8
Line 1, "do not" should be --does not--.

Line 39, "form" should be --forms--.

Line 41, "with angle" should be --with an angle--.

Line 43, "intersection each" should be --intersection of each--.

Line 44, "do not" should be --does not--.

Column 9
Line 4, "elements" should be --element--.

Line 6, "form" should be --forms--.

Line 8, "with angle" should be --with an angle--.

Lines 9 and 10, "intersection each" should be --intersection of each--.

Line 11, "do" should be --does--.

Line 42, "image the" should be --image of the--.

Line 54, After "that" delete ",".

Column 10
Line 6, "sources" should be --source--.

Line 38, "pattern 683b first reflection 683b" should be --pattern of the first reflection [683b]--.

Line 49, After "675b" delete ",".

Line 62, After "675c," delete "to".

Column 11
Lines 5 and 6, "0.20 x 400" should be --0.2° x 40°--.

Line 8, "use" should be --used--.

Line 23, "reveling" should be --revealing--.

Column 12
Line 2, "thorough" should be --thoroughly--.

Line 25, "sources" should be --source--.

Line 50, "sources 671g9" should be --source 671g1--.

Line 60, After "embodiment" insert --it--.

Column 13
Lines 16-17, "assembly" should be --assemblies--.

Line 28, "assembly" should be --assemblies--.

Line 29, After "such" delete "at".

Line 38, "718apivotally" should be --719a pivotally--.

Line 55, "lens" should be --lenses--.

Line 59, "Fig. 7band" should be --Fig. 7b and--.

Line 67, "Lens" should be --Lenses--.

Column 14
Line 1, "out" should be --outer--.

Line 37, "generates light" should be --generates a light--.

Line 64, "1018a" should be --1019a--.

Column 15
Line 13, After "sensor" delete "is".

Column 16
Line 31, "presents" should be --presence--.

Line 31, "afore mentioned" should be --aforementioned--.

Line 35, "preferably" should be --preferable--.

Line 51, "presents" should be --presence--.

Column 17
Line 15, "principal" should be --principle--.

Line 32, "12801a" should be --1281a--.

Line 37, "1218a" should be --1219a--.

Column 18
Line 37, "preferably" should be --preferable--.

Line 57, "is" should be --are--.

Line 60, "and" should be --do--.

Column 19
Line 19, "is" should be --are--.

Lines 22-27, "The presence of moisture will result in a decrease of light rays impinging upon the detection screen below the position of where the moisture is present on the windshield resulting in a dark spot on the detection screen in the shape of the moisture, thereby, being detectable by the image sensor" (should not be italicized).

Line 33, "Piano-convex" should be --Plano-convex--.

Line 36, "systems" should be --system's--.

Line 39, "on" should be --one--.

Line 53, "preferably" should be --preferable--.

Column 20
Line 6, "preferably" should be --preferable--.

Column 21
Line 9, "association" should be --associated--.

Column 22
Line 56, "detail" should be --detailed--.